United States Patent
Wittek et al.

(10) Patent No.: US 11,180,698 B2
(45) Date of Patent: *Nov. 23, 2021

(54) LIQUID-CRYSTALLINE MEDIUM AND HIGH-FREQUENCY COMPONENTS COMPRISING SAME

(71) Applicant: Merck Patent GmbH, Darmstadt (DE)

(72) Inventors: Michael Wittek, Erzhausen (DE); Dagmar Klass, Darmstadt (DE); Peer Kirsch, Seeheim-Jugenheim (DE)

(73) Assignee: Merck Patent GmbH, Darmstadt (DE)

( * ) Notice: Subject to any disclaimer, the term of this patent is extended or adjusted under 35 U.S.C. 154(b) by 213 days.

This patent is subject to a terminal disclaimer.

(21) Appl. No.: 16/076,124

(22) PCT Filed: Jan. 20, 2017

(86) PCT No.: PCT/EP2017/000069
§ 371 (c)(1),
(2) Date: Aug. 7, 2018

(87) PCT Pub. No.: WO2017/137145
PCT Pub. Date: Aug. 17, 2017

(65) Prior Publication Data
US 2020/0255737 A1    Aug. 13, 2020

(30) Foreign Application Priority Data
Feb. 8, 2016    (EP) .................................... 16154744

(51) Int. Cl.
| | |
|---|---|
| C09K 19/60 | (2006.01) |
| C09K 19/30 | (2006.01) |
| C09K 19/10 | (2006.01) |
| C09K 19/54 | (2006.01) |
| C09K 19/58 | (2006.01) |
| H01Q 1/38 | (2006.01) |
| H01Q 3/36 | (2006.01) |

(52) U.S. Cl.
CPC .......... *C09K 19/3003* (2013.01); *C09K 19/10* (2013.01); *C09K 19/542* (2013.01); *C09K 19/586* (2013.01); *C09K 19/60* (2013.01); *C09K 19/601* (2013.01); *H01Q 1/38* (2013.01); *H01Q 3/36* (2013.01); *C09K 2019/3016* (2013.01)

(58) Field of Classification Search
CPC ..................................................... C09K 19/60
See application file for complete search history.

(56) References Cited

U.S. PATENT DOCUMENTS

| | | | | |
|---|---|---|---|---|
| 5,888,421 A * | 3/1999 | Toyne | .................... | C09K 19/12 252/299.61 |
| 7,361,288 B2 | 4/2008 | Luessem | | |
| 8,617,420 B2 | 12/2013 | Yamamoto et al. | | |
| 2005/0067605 A1 * | 3/2005 | Lussem | .................... | H01P 1/181 252/299.01 |
| 2006/0202165 A1 | 9/2006 | Ban | | |
| 2006/0243949 A1 * | 11/2006 | Kato | ................. | G02F 1/133512 252/301.21 |
| 2007/0029521 A1 | 2/2007 | Hsieh | | |
| 2010/0258763 A1 * | 10/2010 | Schott | .................. | C09K 19/586 252/299.01 |
| 2013/0038803 A1 * | 2/2013 | Ma | ....................... | H04N 13/341 349/15 |
| 2015/0315473 A1 | 11/2015 | Junge et al. | | |

FOREIGN PATENT DOCUMENTS

| | | |
|---|---|---|
| DE | 102004029429 A1 | 2/2005 |
| DE | 102010025572 A | 1/2012 |
| EP | 1054001 A1 | 11/2000 |
| EP | 1126006 A2 | 8/2001 |
| EP | 2982730 A1 | 2/2016 |

(Continued)

OTHER PUBLICATIONS

International Search Report PCT/EP2017/000069 dated Jul. 19, 2017.

(Continued)

*Primary Examiner* — Chanceity N Robinson
(74) *Attorney, Agent, or Firm* — Millen White Zelano & Branigan

(57) ABSTRACT

The present invention relates to liquid-crystalline media comprising
  one or more pleochroic compounds, and
  one or more compounds selected from the group of compounds of formulae I, II and III,

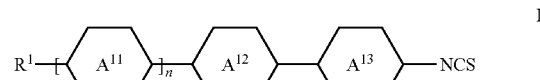

I

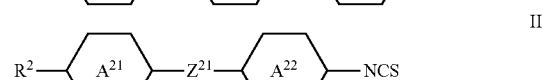

II

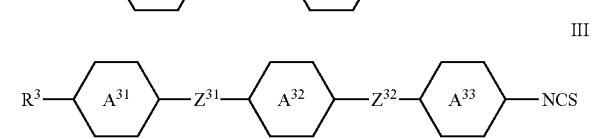

III in which the groups have the meanings as set forth in claim 1,
and to components comprising these media for high-frequency technology, in particular phase shifters and microwave array antennas.

20 Claims, No Drawings

(56) References Cited

FOREIGN PATENT DOCUMENTS

| | | | |
|---|---|---|---|
| JP | 2005120208 A | 5/2005 | |
| JP | 2009057460 A | 3/2009 | |
| WO | 1992016519 A2 | 10/1992 | |
| WO | 2009086911 A1 | 7/2009 | |
| WO | WO-2009086911 A1 * | 7/2009 | ......... C09K 19/2007 |
| WO | 2013034227 A1 | 3/2013 | |
| WO | 2016096084 A1 | 6/2016 | |
| WO | 2016188622 A1 | 12/2016 | |
| WO | WO-2016188622 A1 * | 12/2016 | ............. C09K 19/12 |

OTHER PUBLICATIONS

Dubois: Large microwave birefringence liquid—crystal characterization for phase—shifter applications, Japanese Journal of Applied Physics,2008, 47(5, Pt. 1),3564-3567.

Parka: Proceedings of SPIE—The International Society for Optical Engineering (2000), 4147(Liquid Crystals), 335-339.

Notice of Reasons for Refusal in corresponding Japanese Patent Application No. 2018-541267 dated Mar. 3, 2021 (pp. 1-4).

* cited by examiner

LIQUID-CRYSTALLINE MEDIUM AND HIGH-FREQUENCY COMPONENTS COMPRISING SAME

The present invention relates to liquid-crystalline media and to high-frequency components comprising same, especially microwave components for high-frequency devices, such as devices for shifting the phase of microwaves, in particular for microwave phased-array antennas.

Liquid-crystalline media have been used for some time in electro-optical displays (liquid crystal displays: LCDs) in order to display information.

More recently, liquid-crystalline media have also been proposed for use in components for microwave technology, such as, for example, in DE 10 2004 029 429.1 A and in JP 2005-120208 (A).

As a typical microwave application, the concept of the inverted microstrip line as described by K. C. Gupta, R. Garg, I. Bahl and P. Bhartia: Microstrip Lines and Slotlines, 2$^{nd}$ ed., Artech House, Boston, 1996, is employed, for example, in D. Dolfi, M. Labeyrie, P. Joffre and J. P. Huignard: Liquid Crystal Microwave Phase Shifter. *Electronics Letters*, Vol. 29, No. 10, pp. 926-928, May 1993, N. Martin, N. Tentillier, P. Laurent, B. Splingart, F. Huert, P H. Gelin, C. Legrand: Electrically Microwave Tunable Components Using Liquid Crystals. 32$^{nd}$ European Microwave Conference, pp. 393-396, Milan 2002, or in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002, C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, together with the commercial liquid crystal K15 from Merck KGaA. C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, achieved phase shifter qualities of 12°/dB at 10 GHz with a control voltage of about 40 V therewith. The insertion losses of the LC, i.e. the losses caused only by the polarisation losses in the liquid crystal, were given as approximately 1 to 2 dB at 10 GHz in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002. In addition, it was described that the phase shifter losses are determined primarily by the dielectric LC losses and the losses at the waveguide junctions. T. Kuki, H. Fujikake, H. Kamoda and T. Nomoto: Microwave Variable Delay Line Using a Membrane Impregnated with Liquid Crystal. *IEEE MTT-S Int. Microwave Symp. Dig.* 2002, pp. 363-366, June 2002, and T. Kuki, H. Fujikake, T. Nomoto: Microwave Variable Delay Line Using Dual-Frequency Switching-Mode Liquid Crystal. *IEEE Trans. Microwave Theory Tech.*, Vol. 50, No. 11, pp. 2604-2609, November 2002, also address the use of polymerised LC films and dual-frequency switching-mode liquid crystals in combination with planar phase shifter arrangements.

A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548 describe, inter alia, the properties of the known single liquid-crystalline substance K15 (Merck KGaA, Germany) at a frequency of 9 GHz.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystalline mixture E7 (Merck KGaA, Germany).

DE 10 2004 029 429.1 A describes the use of liquid-crystalline media in microwave technology, inter alia in phase shifters. Therein liquid-crystalline media are investigated with respect to their properties in the corresponding frequency range. In addition, it describes liquid-crystalline media which comprise a small amount of a single compound of the formula

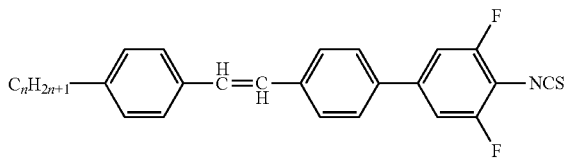

respectively

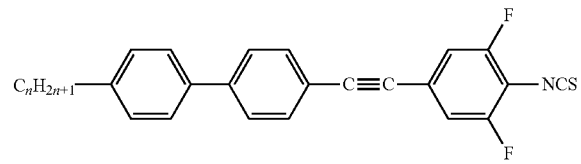

in combination with the well known cyanobiphenyl compound

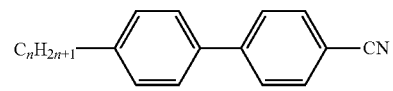

and also media comprising, besides other compounds,

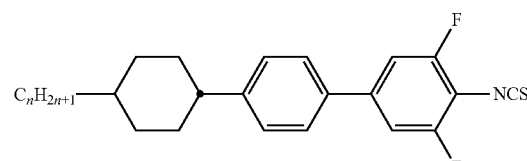

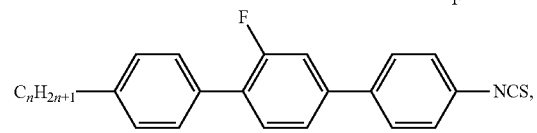

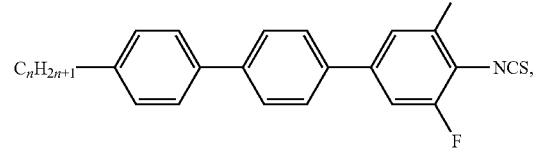

-continued

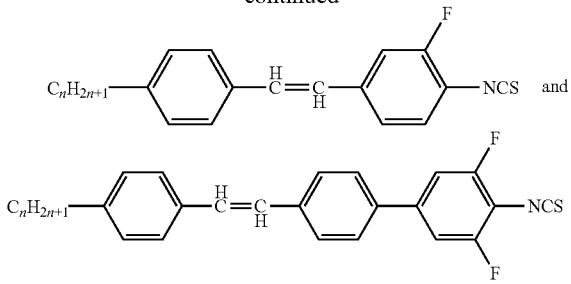

respectively

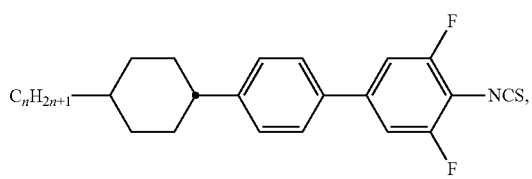

These relatively simple mixtures, however, show limited performance for the application in devices operating in the microwave regime and even in terms of their general physical properties, such as the clearing point and the phase range, and especially their stability against storage at low temperatures and their viscosities, and in particular their rotational viscosity.

Further liquid-crystalline media for microwave applications comprising one or more of these compounds, as well as similar ones, are proposed for microwave applications in DE 10 2010 025 572 A and WO 2013/034227.

It is proposed in e.g. "Influence of dye molecules on the birefringence of liquid crystal mixtures at near infrared frequencies", Simpson, S. H., Richardson, R. M., and Hanna, S., Journal of Chemical Physics, (2007), Vol. 127, Issue (10) pp. 104901-104901-14 to use a dye in a guest-host system to shift the absorption edge closer to the near infrared region in order to increase the (effective) birefringence of liquid crystals.

Moreover, "Liquid crystal dyes with high solubility and large dielectric anisotropy", Wu, Shin-Tson, Margerum, J. David, Ho, Mei-Sing, and Fung, Bing M., Appl. Phys. Lett. (1994), 64 (17) pp. 2191-2193 describes azo dyes of the general formula

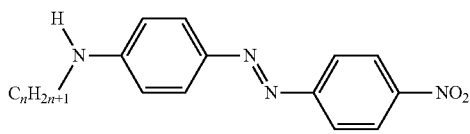

with n ranging from 4 to 14, especially n being 4, 5 and 6, and their behaviour in the near infrared range and proposes, amongst other uses, to use them as "dopants" for nonpolar, high birefringent LCs for IR and millimetre wave modulators.

Polymer stabilization of liquid-crystalline media as well as doping by chiral dopants has been proposed for various reasons for several types of display applications.

However, liquid-crystalline compositions typically used so far have inadequate or insufficient material properties, such as disadvantageously high losses and/or inadequate phase shifts. Known devices for high frequency-technology comprising liquid-crystalline media still lack sufficient stability and in particular fast response.

Thus, there is a need in the art for novel liquid-crystalline media having advantageous and improved properties, which in high frequency-technology applications can mean particular, hitherto rather unusual and uncommon properties or combinations of properties.

An object of the present invention is to provide suitable liquid-crystalline media with reduced dielectric loss in the microwave region and improved material quality, wherein a figure of merit, $\eta$, relates a high tunability with a concomitant low dielectric loss. It is a further object to provide liquid-crystalline media which exhibit improved response times, in particular for applications in devices using planar structures such as e.g. phase shifters and leaky antennas, while at the same time providing further benefits such as broad and stable nematic phase ranges, improved low-temperature behaviour and an improvement in the operating properties at low temperatures and also in the shelf life. Further objects of the present invention are immediately evident to the person skilled in the art from the following detailed description.

The object is solved by the subject-matter defined in the independent claims, while preferred embodiments are set forth in the respective dependent claims and are further described below.

The present invention in particular provides the following items including main aspects, preferred embodiments and particular features, which respectively alone and in combination contribute to solving the above object and eventually provide additional advantages.

A first aspect of the present invention provides a liquid-crystalline medium, comprising
(i) one or more pleochroic compounds,
(ii) one or more compounds selected from the group of compounds of formulae I, II and III

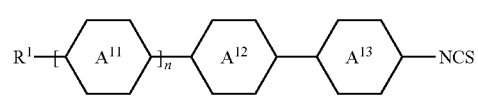

in which
$R^1$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
n denotes 0 or 1, and

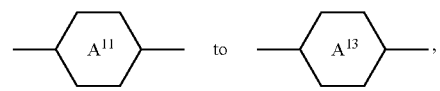

independently of one another, denote

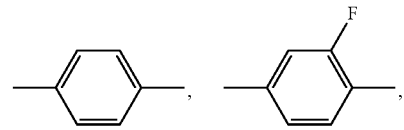

-continued

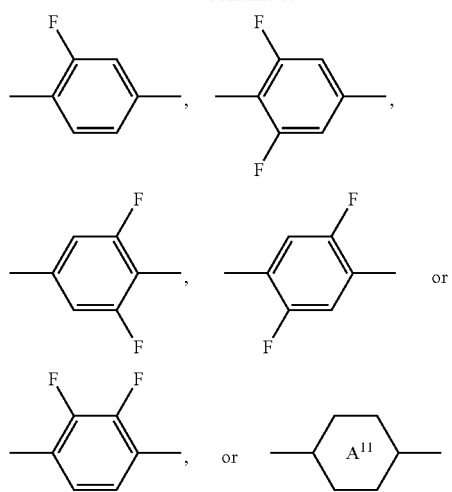

alternatively denotes

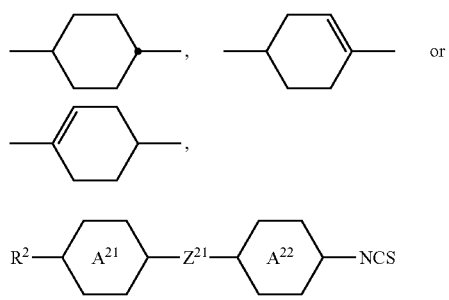

II

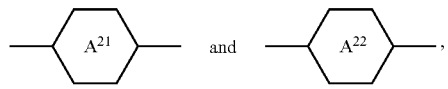

in which
R² denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, Z²¹ denotes trans-CH=CH—, trans-CF=CF— or —C≡C—, and

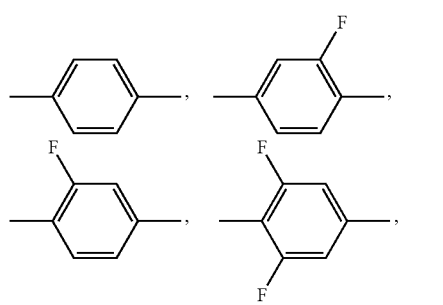

independently of one another, denote

-continued

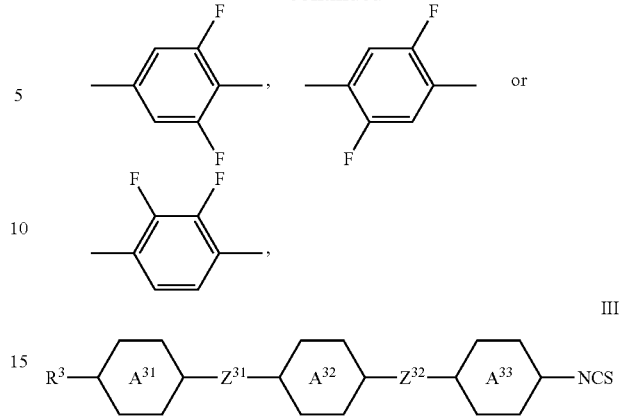

III

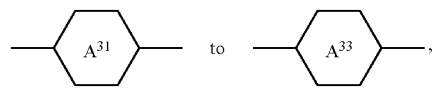

in which
R³ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, one of Z³¹ and Z³² denotes trans-CH=CH—, trans-CF=CF— or —C≡C—, and the other one denotes trans-CH=CH—, trans-CF=CF— or a single bond, and

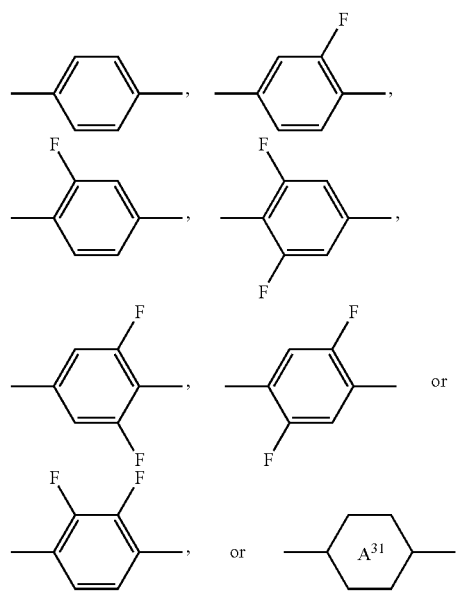

independently of one another, denote

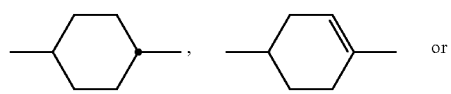

alternatively denotes

-continued

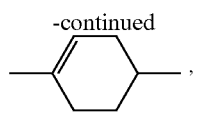

and optionally (iii) one or more polymerisable compounds.

Preferably, the one or more pleochroic compounds are mesogenic compounds. Moreover, the optionally provided one or more polymerisable compounds are mesogenic compounds.

It has surprisingly been found that by providing the liquid-crystalline media according to the invention which comprise a combination of one or more pleochroic compounds and one or more compounds selected from the group of compounds of formulae I, II and III as set forth above it is possible to obtain media having a suitably fast switching time, a suitable nematic phase range and an improved or at least suitable dielectric loss.

In the present invention it was advantageously recognized that by using one, two or more pleochroic additives, in particular dichroic dyes, in media containing one or more compounds selected from the group of compounds of formulae I, II and III significant benefits in terms of the tunability of the liquid-crystal medium can be provided.

Such pleochroic additives exhibit electromagnetic absorption spectra which differ depending on the orientation of the propagation of the light relative to the average direction of the long molecular axis of the mesogenic hosts. The latter direction is called the director. Especially in case where these additives show an absorption in the visible spectrum of the electromagnetic radiation or in the adjacent UV or near IR regions, they are typically called pleochroic dyes. Preferably, the pleochroic dyes provided in the media according to the present invention are dichroic dyes, i.e. they exhibit a different spectrum for two different directions of the orientation of their director relative to the light propagation, i.e. parallel and perpendicular to it. The ratio of their respective absorption values is called the dielectric ratio. This is dependent on the order parameter of the mesogenic host and on the relative degree of the orientation of the respective additives in the host. Thus, preferably compounds with an elongated structure, similar to a mesogenic core and/or mesogenic groups and/or typical end groups present in liquid crystalline compounds are used according to the present application.

A further advantage of the use of pleochroic dyes has been found especially in case one or more fluorescent dyes are used. Preferably, either all or most dyes used may be fluorescent dyes or only one or two of them. Considering that the liquid crystalline media are employed in cavities for most applications in the microwave regime there exists a possibility of an undesired leakage of the material. Such an incident may be conveniently detected by the colour of the dye present in the material. In this case a fluorescent dye has the advantage of being particularly easily detectable under special illumination, in particular with UV irradiation. But also non-fluorescent dyes may be beneficially used in some cases.

Preferably, the liquid-crystalline medium according to the invention comprises one or more pleochroic dyes selected from the group of azo dyes and thiadiazol dyes.

Another aspect of the invention relates to a composite system which comprises the liquid-crystalline medium according to the invention and a polymer obtained or obtainable from the polymerisation of one or more polymerisable compound(s).

Preferably, a polymer stabilized system is obtainable or respectively obtained by polymerisation of one or more compounds of the formula P as defined herein alone or in combination with one or more further polymerisable compounds from a respective mixture, which optionally and more preferably further comprises a polymerisation initiator.

It has been found that by using polymerisable compound(s), in particular reactive mesogen(s), a stabilised liquid-crystalline phase which has a broad temperature range and an improved, faster switching time, good tunability and acceptable loss can be obtained.

Further aspects of the invention relate to the use of the liquid-crystalline media and the composite systems according to the invention in components or devices for high frequency technology, in particular to components suitable for operation in the microwave range, preferably a phase shifter or a LC based antenna element operable in the microwave region, and microwave antenna arrays.

It was advantageously found that the use of one or more pleochroic compounds can provide significant benefits in terms of the tunability of the liquid-crystal medium comprising one or more compounds selected from the group of compounds of formulae I, II and III as set forth above, which in turn can be favourable for the use in the above components and devices.

The term "liquid crystal", "mesomorphic compound" or "mesogenic compound", also shortly referred to as "mesogen", means a compound which under suitable conditions of temperature, pressure and concentration can exist as a mesophase (nematic, smectic, etc.) or in particular as a LC phase. Non-amphiphilic mesogenic compounds comprise for example one or more calamitic, banana-shaped or discotic mesogenic groups.

The term "mesogenic group" means in this context a group with the ability to induce liquid crystal (LC) phase behaviour. The mesogenic compounds according to the invention do not necessarily have to exhibit an LC phase themselves. It is also possible that they show LC phase behaviour only in mixtures with other compounds. For the sake of simplicity, the term "liquid crystal" is used hereinafter for both mesogenic and LC materials.

The term "chiral" in general is used to describe an object that is non-superimposable on its mirror image. "Achiral" (non-chiral) objects are objects that are identical to their mirror image. The terms chiral nematic and cholesteric are used synonymously in this application, unless explicitly stated otherwise.

The wavelength of light referred to in this application is 550 nm, unless explicitly specified otherwise.

The cell gap of the cells preferably is in the range from 1 µm to 20 µm, in particular within the range from 2.0 µm to 10 µm.

Without limiting the present invention thereby, in the following the invention is illustrated by the detailed description of the aspects, embodiments and particular features, and particular embodiments are described in more detail.

It has surprisingly been found that by the combined provision of one or more pleochroic compounds and one or more compounds selected from the group of compounds of formulae I, II and III as set forth above in a liquid-crystalline media can be obtained with favourable characteristics, including suitably fast switching time, a suitable nematic phase range and an improved or at least suitable dielectric loss.

The pleochroic additives used according to the present invention are preferably dichroic dyes, and they preferably exhibit a large dichroic ratio.

That means that their sprectral properties significantly differ for observation along the director and perpendicular to it.

The concentration of the pleochroic compound, in particular the dichroic dye and respectively the total concentration of the dichroic dyes in the LC medium are preferably in the range from 0.1% or more to 15% or less, more preferably from 0.5% or more to 10% or less, and most preferably from 1.0% or more to 8% or less.

Preferred dyes are selected from the group of azo dyes and thiadiazol dyes. The above preferred concentration ranges apply in particular to these preferred dichroic dyes.

The azo dyes used according to the present invention preferably comprise one or two diazo groups linked to aromatic rings. They are more preferably selected from the group of formulae A and D, preferably of formula A

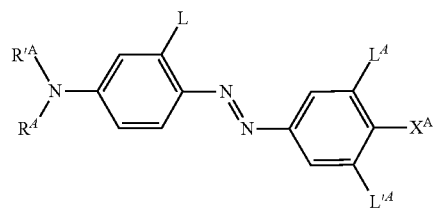

A

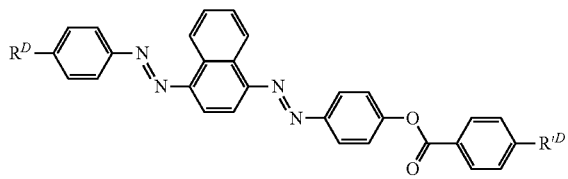

D wherein $X^A$ is a polar group, preferably selected from F, Cl, CN, CF$_3$, OCF$_3$, SF$_5$ or SF$_4$CF$_3$, more preferably Cl, CF$_3$, SF$_5$ or SF$_4$CF$_3$, and most preferably Cl or CF$_3$, $L^A$, $L'^A$ and $L''^A$ are independently of each other H, F, Cl or CN, preferably H, F or Cl, and most preferably H or F, $R^A$ and $R'^A$ are independently of each other alkyl having 1 to 6 C atoms, preferably 1 to 3 C atoms, and most preferably 1 C atom, or alkenyl having 2 to 6 C atoms, preferably 2 or 3 C atoms, and $R^D$ and $R'^D$ are independently of each other alkyl having 1 to 6 C atoms, preferably 2 to 5 C atoms, and most preferably 4 or 5 C atoms, or alkenyl having 2 to 6 C atoms, preferably 3, 4 or 5 C atoms.

The thiadiazol dyes used according to the present invention are preferably dibenzothiadiazoles, more preferably selected from formula T

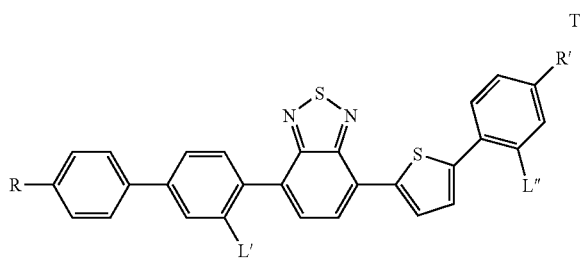

T wherein

R and R' are independently of each other alkoxy having 1 to 6 C atoms, preferably 2 to 5 C atoms, and most preferably 4 or 5 C atoms, and L' and L" are independently of each other H, F or Cl, preferably F.

According to the invention optionally one or more polymerisable compounds are provided in the liquid-crystalline media. According to a preferred embodiment one or more polymerisable compounds are present in the liquid-crystalline media of the invention.

Preferably, the liquid-crystalline medium according to the invention comprises one or more compounds of formula P

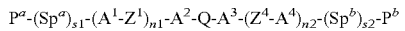

P wherein $P^a$, $P^b$ each, independently of one another, are a polymerisable group, $Sp^a$, $Sp^b$ each, independently of one another, denote a spacer group, s1, s2 each, independently of one another, denote 0 or 1, n1, n2 each, independently of one another, denote 0 or 1, Q denotes a single bond, —CF$_2$O—, —OCF$_2$—, —CH$_2$O—, —OCH$_2$—, —(CO)O—, —O(CO)—, —(CH$_2$)$_4$—, —CH$_2$—CH$_2$—, —CF$_2$—CF$_2$—, —CF$_2$—CH$_2$—, —CH$_2$—CF$_2$—, —CH═CH—, —CF═CF—, —CF═CH—, —CH═CF—, —(CH$_2$)$_3$O—, —O(CH$_2$)$_3$—, —C≡C—, —O—, —CH$_2$—, —(CH$_2$)$_3$—, —CF$_2$—, preferably —CF$_2$O—, $Z^1$, $Z^4$ denote, independently of one another, a single bond, —CF$_2$O—, —OCF$_2$—, —CH$_2$O—, —OCH$_2$—, —(CO)O—, —O(CO)—, —(CH$_2$)$_4$—, —CH$_2$—CH$_2$—, —CF$_2$—CF$_2$—, —CF$_2$—CH$_2$—, —CH$_2$—CF$_2$—, —CH═CH—, —CF═CF—, —CF═CH—, —CH═CF—, —(CH$_2$)$_3$O—, —O(CH$_2$)$_3$—, —C≡C—, —O—, —CH$_2$—, —(CH$_2$)$_3$—, —CF$_2$—, wherein $Z^1$ and Q or respectively $Z^4$ and Q do not simultaneously denote a group selected from —CF$_2$O— and —OCF$_2$—, $A^1$, $A^2$, $A^3$, $A^4$ each, independently of one another, denote a diradical group selected from the following groups:
a) the group consisting of trans-1,4-cyclohexylene, 1,4-cyclohexenylene and 1,4'-bicyclohexylene, in which, in addition, one or more non-adjacent CH$_2$ groups may be replaced by —O— and/or —S— and in which, in addition, one or more H atoms may be replaced by F,
b) the group consisting of 1,4-phenylene and 1,3-phenylene, in which, in addition, one or two CH groups may be replaced by N and in which, in addition, one or more H atoms may be replaced by L,
c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which, in addition, may be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

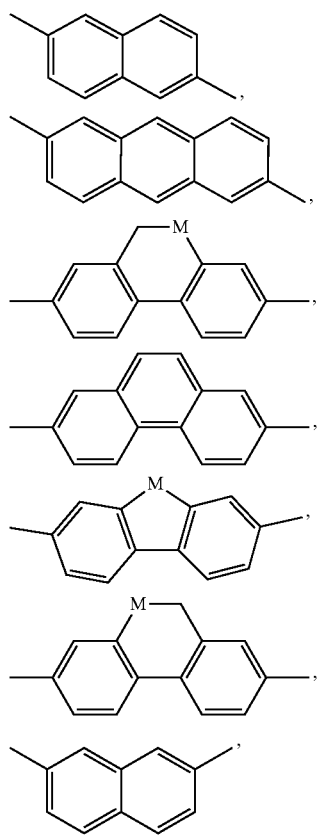

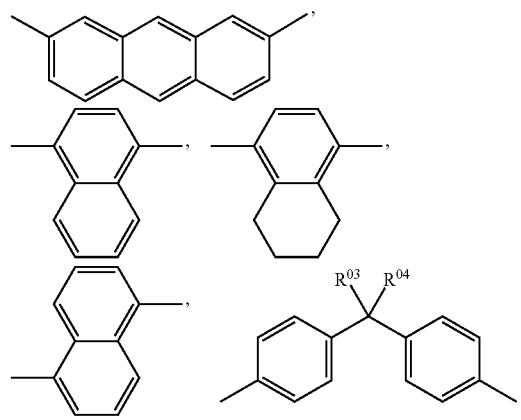

wherein, in addition, one or more H atoms in these radicals may be replaced by L, and/or one or more double bonds may be replaced by single bonds, and/or one or more CH groups may be replaced by N, or $A^3$ alternatively may be a single bond, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, $R^{03}$, $R^{04}$ each, independently of one another, denote H, F or straight-chain or branched alkyl having 1 to 12 C atoms, in which, in addition, one or more H atoms may be replaced by F, M denotes —O—, —S—, —$CH_2$—, —$CHY^1$— or —$CY^1Y^2$—, and $Y^1$ and $Y^2$ each, independently of one another, have one of the meanings indicated above for $R^{03}$, or denote Cl or CN, and one of the groups $Y^1$ and $Y^2$ alternatively denotes —$OCF_3$, preferably H, F, Cl, CN or $CF_3$.

Optionally a polymerisation initiator is further comprised, wherein preferably one or more polymerisation initiators are present in the LC media.

Polymerisable compounds of formula P preferably used according to the present invention are selected from the group consisting of the following formulae:

P1-1

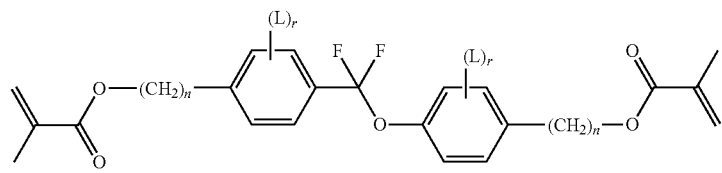

P1-2

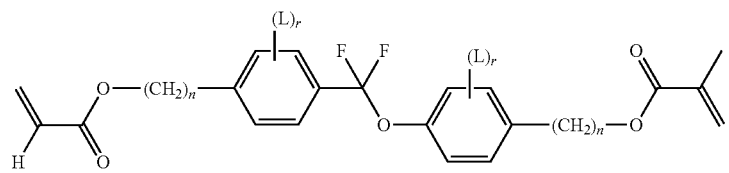

-continued
P1-3
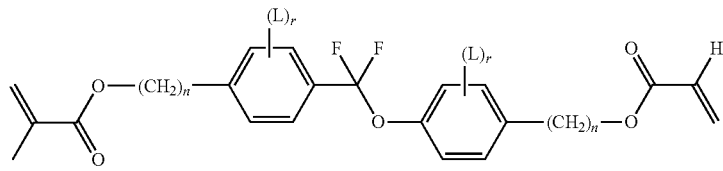
P1-4
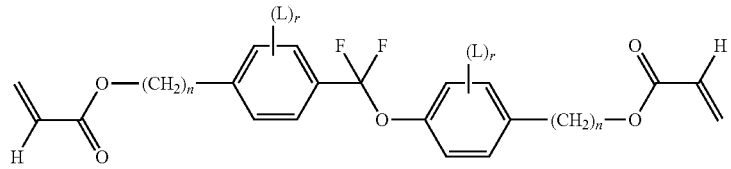
P2-1
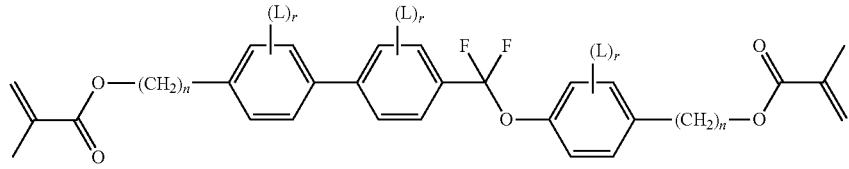
P2-2
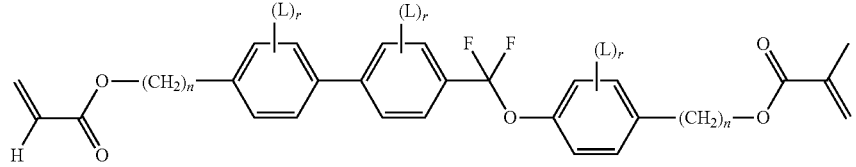
P2-3
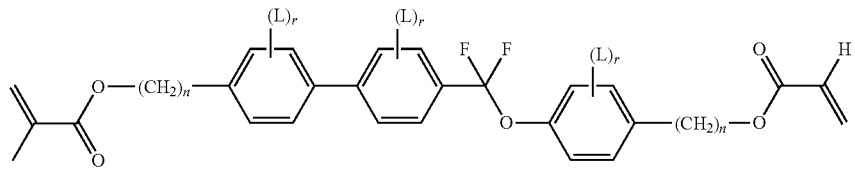
P2-4
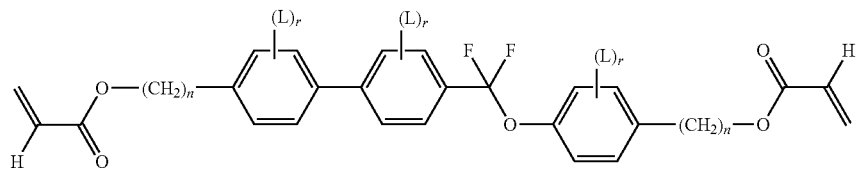
P3-1
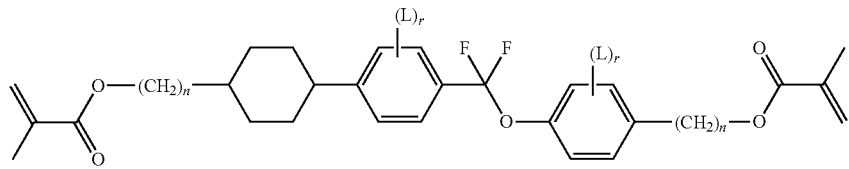
P3-2
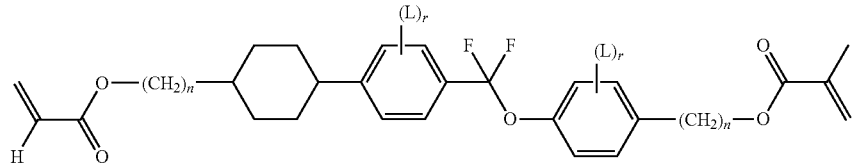
P3-3
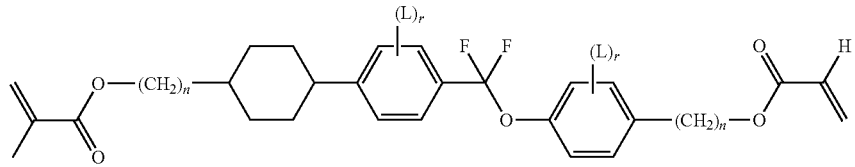

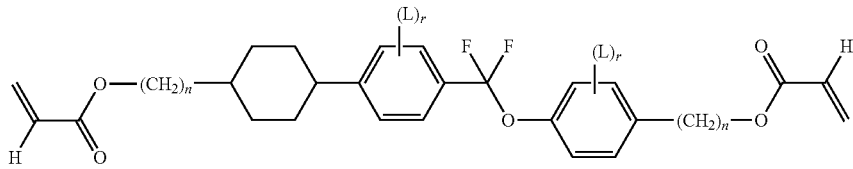
P3-4
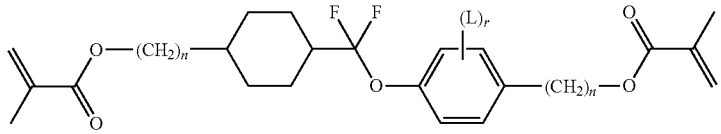
P4-1
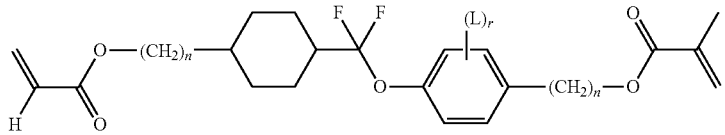
P4-2
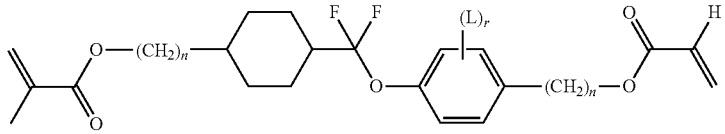
P4-3
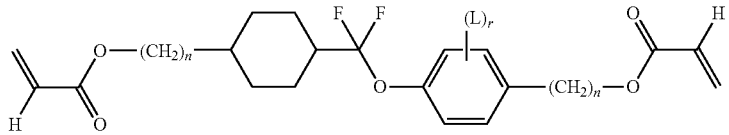
P4-4
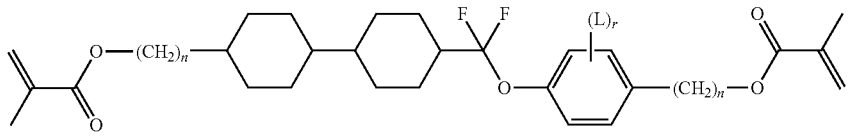
P5-1
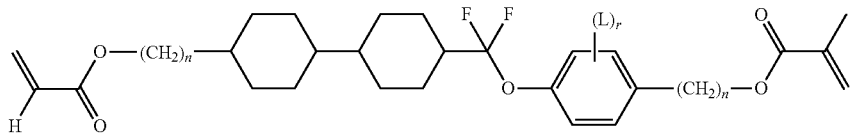
P5-2
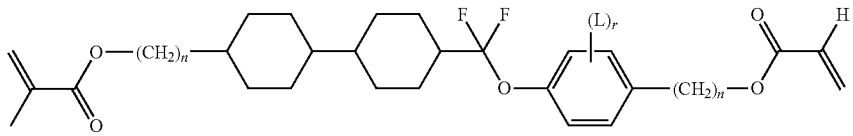
P5-3
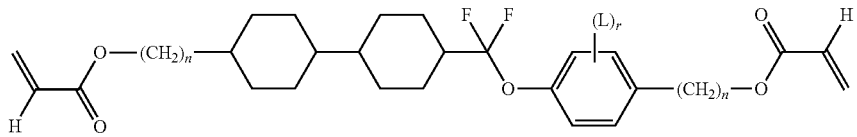
P5-4
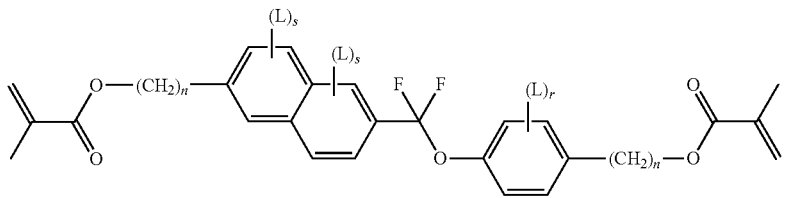
P6-1

-continued
P6-2
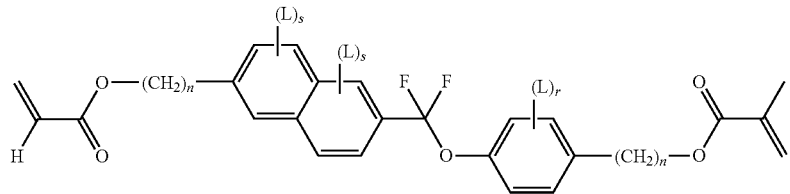
P6-3
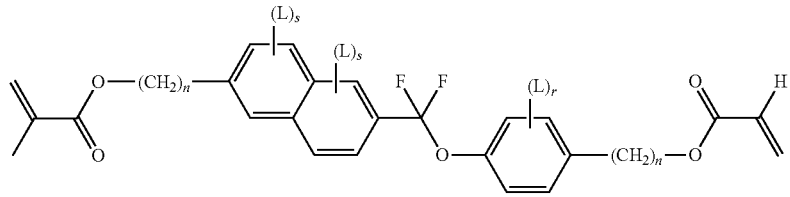
P6-4
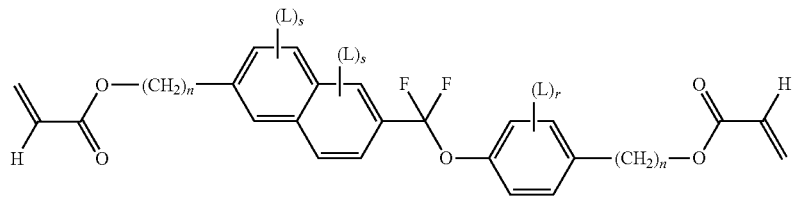
P7-1
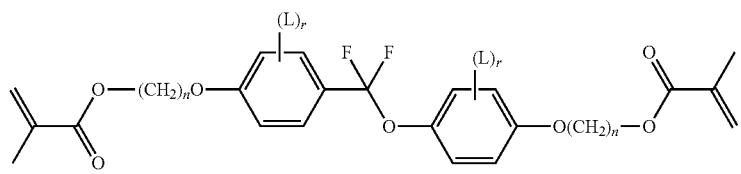
P7-2
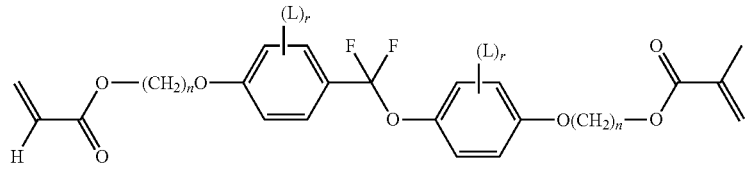
P7-3
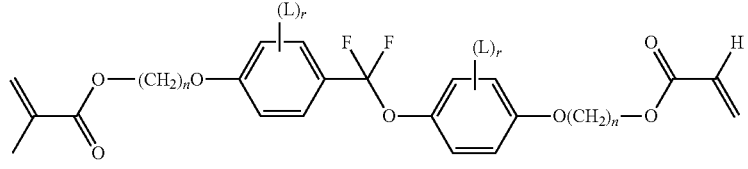
P7-4
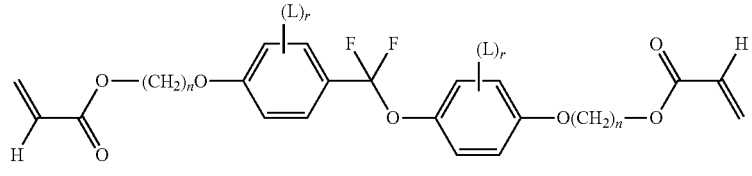
P8-1
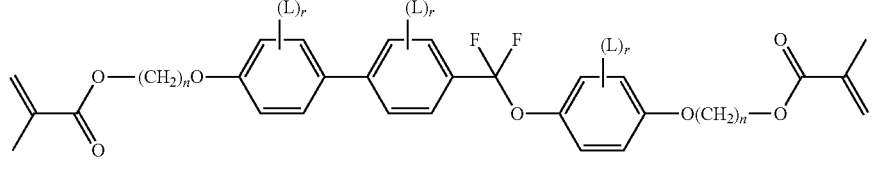

-continued
P8-2
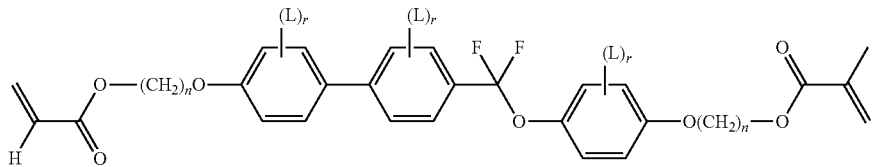
P8-3
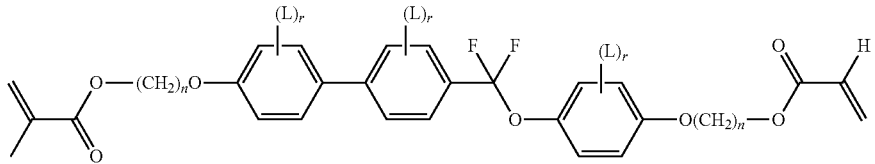
P8-4
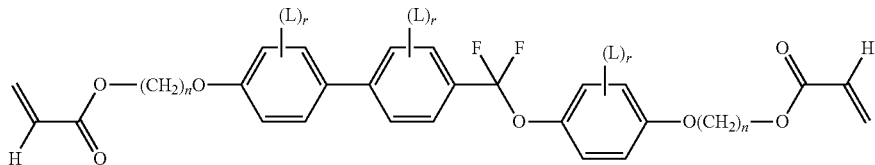
P9-1
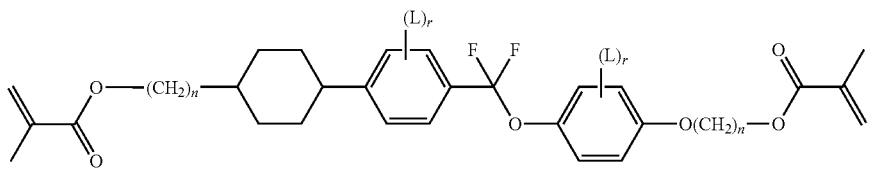
P9-2
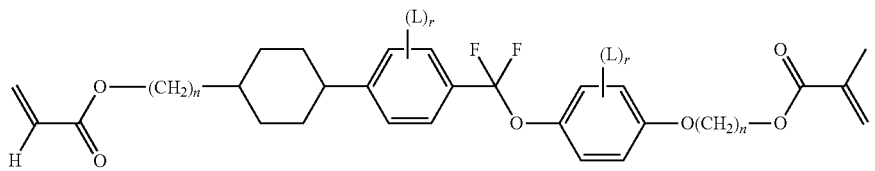
P9-3
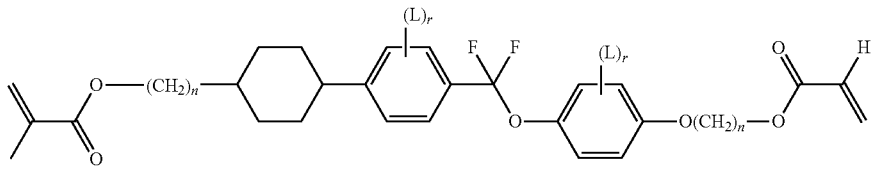
P9-4
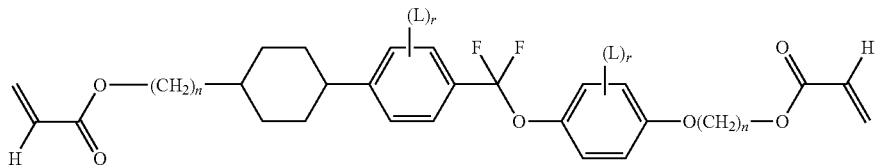
P10-1
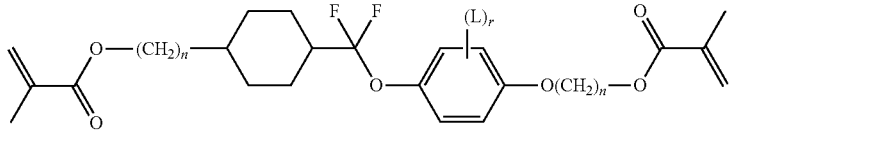
P10-2
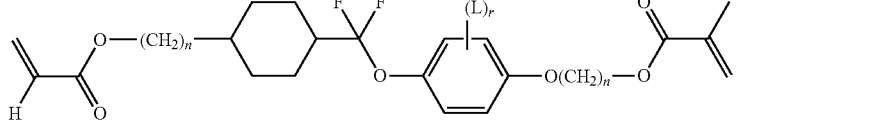

-continued
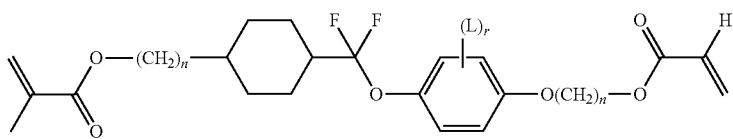
P10-3
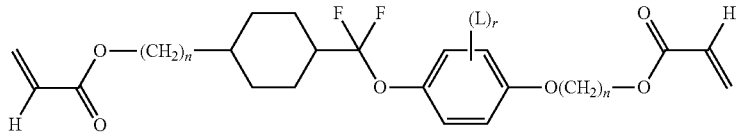
P10-4
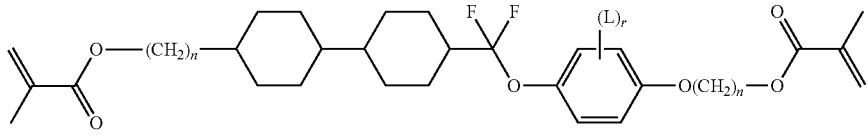
P11-1
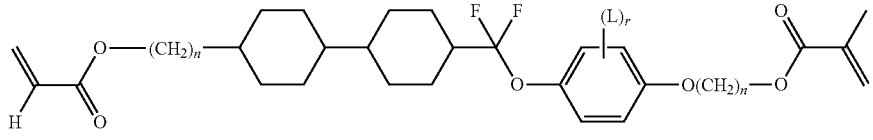
P11-2
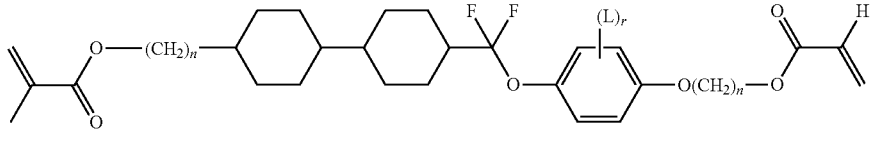
P11-3
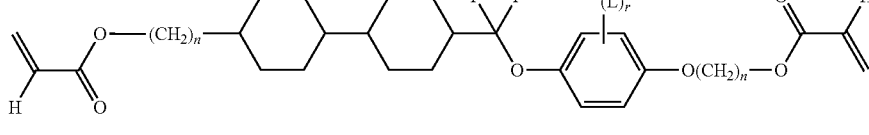
P11-4
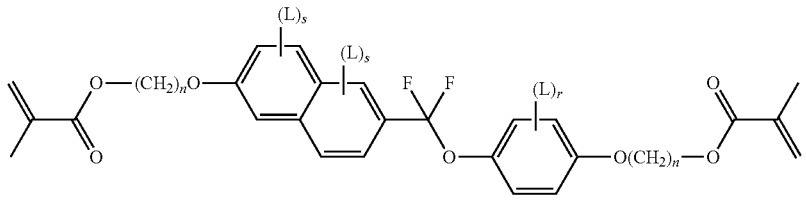
P12-1
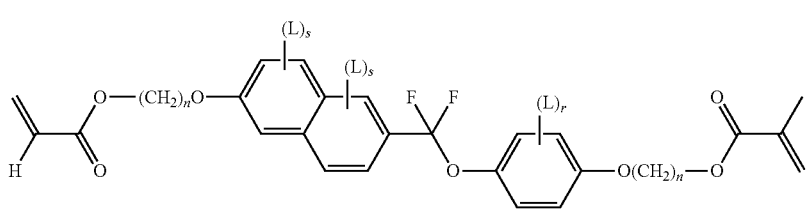
P12-2
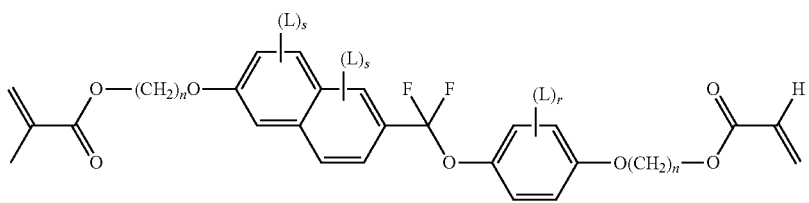
P12-3

P12-4

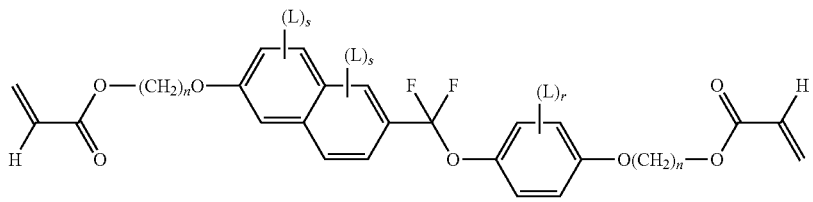

wherein L in each occurrence, identically or differently, has one of the meanings indicated above and below, r denotes 0, 1, 2, 3 or 4, s denotes 0, 1, 2 or 3, and n denotes an integer between 1 and 24, preferably between 1 and 12, more preferably between 2 and 8, and in which in case a radical is not indicated at the end of a single or double bond it is a terminal $CH_3$ or $CH_2$ group.

In the formulae P1-1 to P12-4,

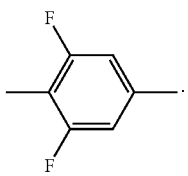

preferably denotes a group selected from the group consisting of the following formulae:

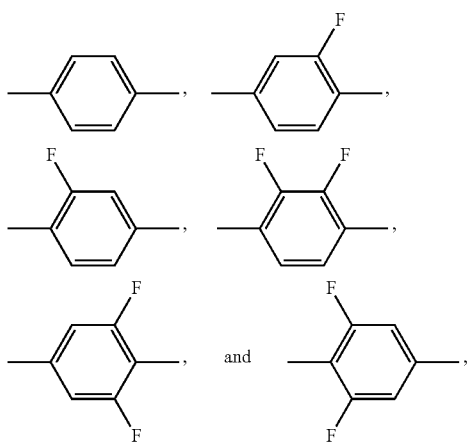

particularly preferably selected from

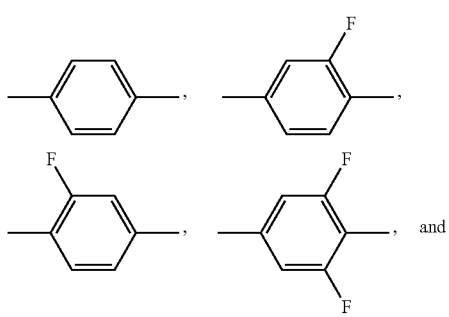

In formula P the moiety $A^2$-Q-$A^3$ preferably denotes a group of the formula

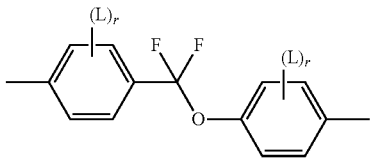

in which at least one of the rings is substituted by at least one group with L being F, and wherein r is in each case independently 0, 1, 2, 3 or 4, preferably 0, 1 or 2.

$P^a$ and $P^b$ in the compounds of formula P and the sub-formulae thereof preferably denote respectively and independently acrylate or methacrylate, furthermore fluoroacrylate.

$Sp^a$ and $Sp^b$ in the compounds of formula P and the sub-formulae thereof preferably denote a radical selected from the group consisting of —$(CH_2)_{p1}$—, —$(CH_2)_{p1}$—O—, —$(CH_2)_{p1}$—O—CO— and —$(CH_2)_{p1}$—O—CO—O— and mirror images thereof, in which p1 denotes an integer from 1 to 12, preferably from 1 to 6, particularly preferably 1, 2 or 3, wherein these groups are linked to $P^a$ or $P^b$ in such a way that O atoms are not directly adjacent.

Compounds of formula P are particularly preferred in which the radicals $P^a$ and $P^b$ are selected from the group consisting of vinyloxy, acrylate, methacrylate, fluoroacrylate, chloroacrylate, oxetane and epoxide groups, preferably are acrylate or methacrylate groups, and/or in which the radicals $Sp^a$ and $Sp^b$ are selected from the group consisting of —$(CH_2)_{p1}$—, —$(CH_2)_{p1}$—O—, —$(CH_2)_{p1}$—O—CO— and —$(CH_2)_{p1}$—O—CO—O— and mirror images thereof, in which p1 denotes an integer from 1 to 12, preferably from 1 to 6, particularly preferably 1, 2 or 3, and wherein these radicals are linked to $P^a$ or $P^b$ in such a way that O atoms are not directly adjacent.

Compounds of formula P used according to a preferred embodiment of the present invention are those comprising exactly two rings, i.e. wherein n1=n2=0, which more preferably are 6-membered rings. Particularly preferred are compounds selected from the group of compounds of the following formulae:
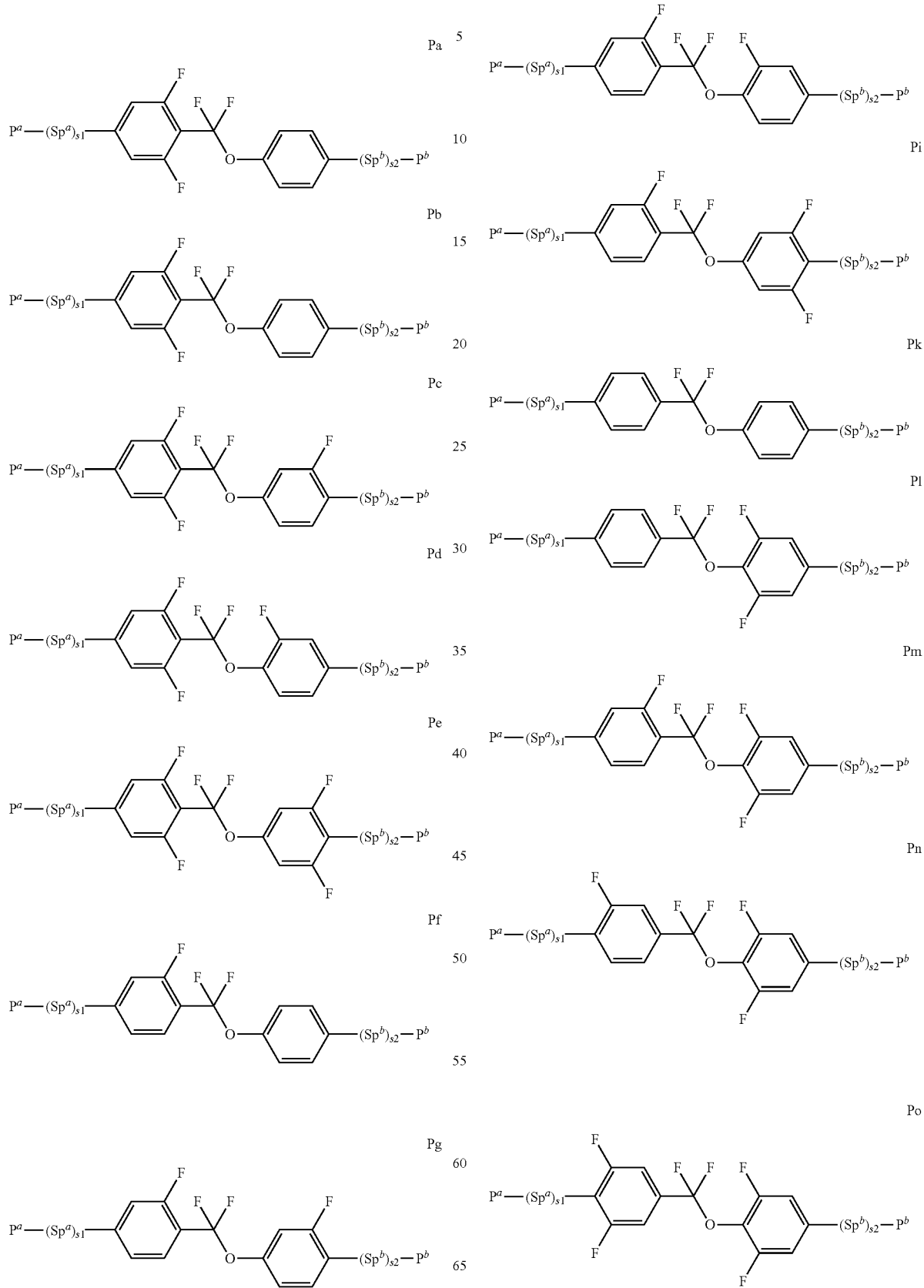

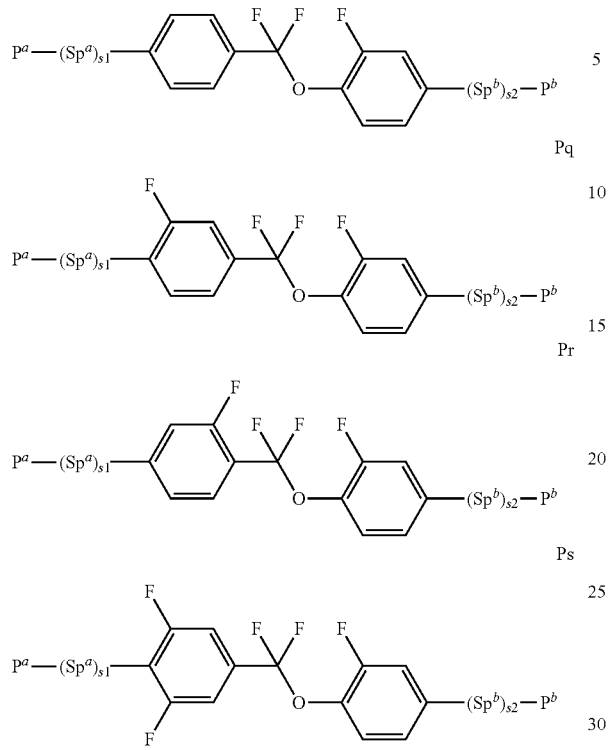

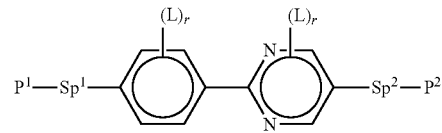

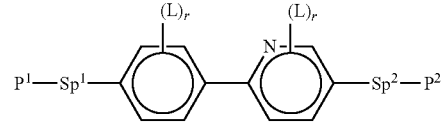

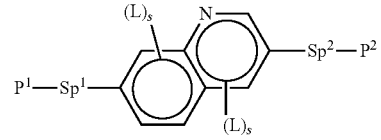

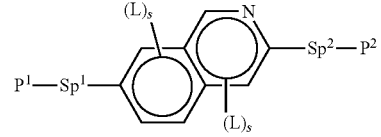

wherein $P^a$, $P^b$, $Sp^a$, $Sp^b$, s1 and s2 are as defined under formula P above, and preferably $Sp^a$ and $Sp^b$ respectively and independently are alkylene $-(CH_2)_n-$, wherein n preferably is 3, 4, 5, 6 or 7, and $P^a$ and $P^b$ in the above formulae respectively and independently preferably are a methacrylate or acrylate moiety. Particularly preferred is the use of compounds selected from the group of formulae Pa, Pb, Pc, Pd, Pe, Pf, Pg, Ph and Pi, and in particular the compounds of formula Pa.

Suitable and preferred co-monomers for use in polymer precursors for polymer stabilised devices according to the present invention are selected, for example, from the following formulae:

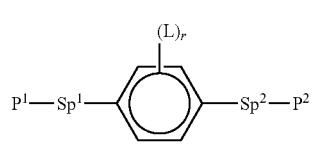

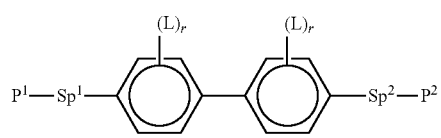

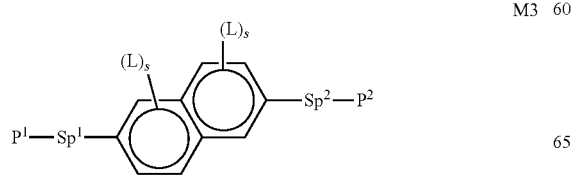

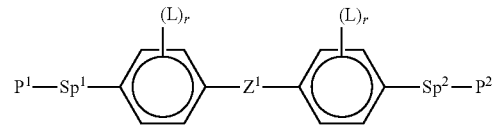

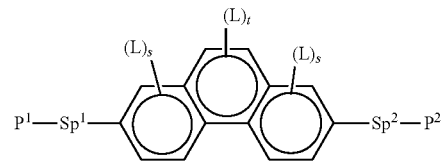

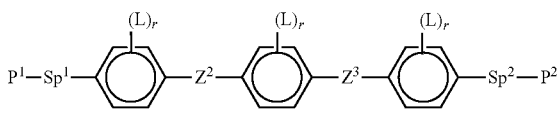

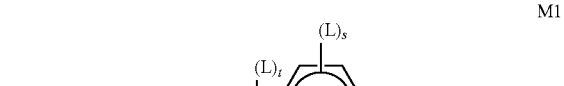

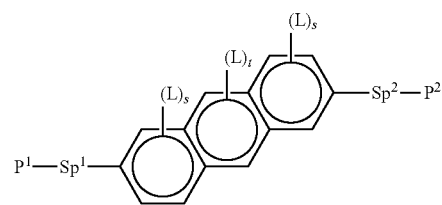

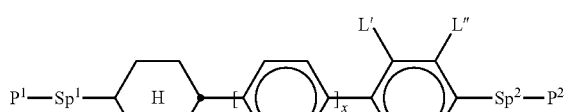

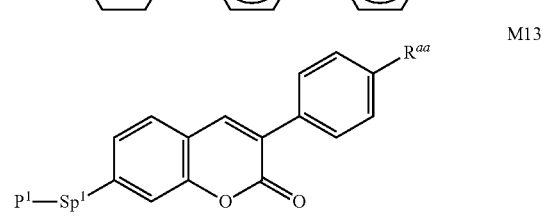

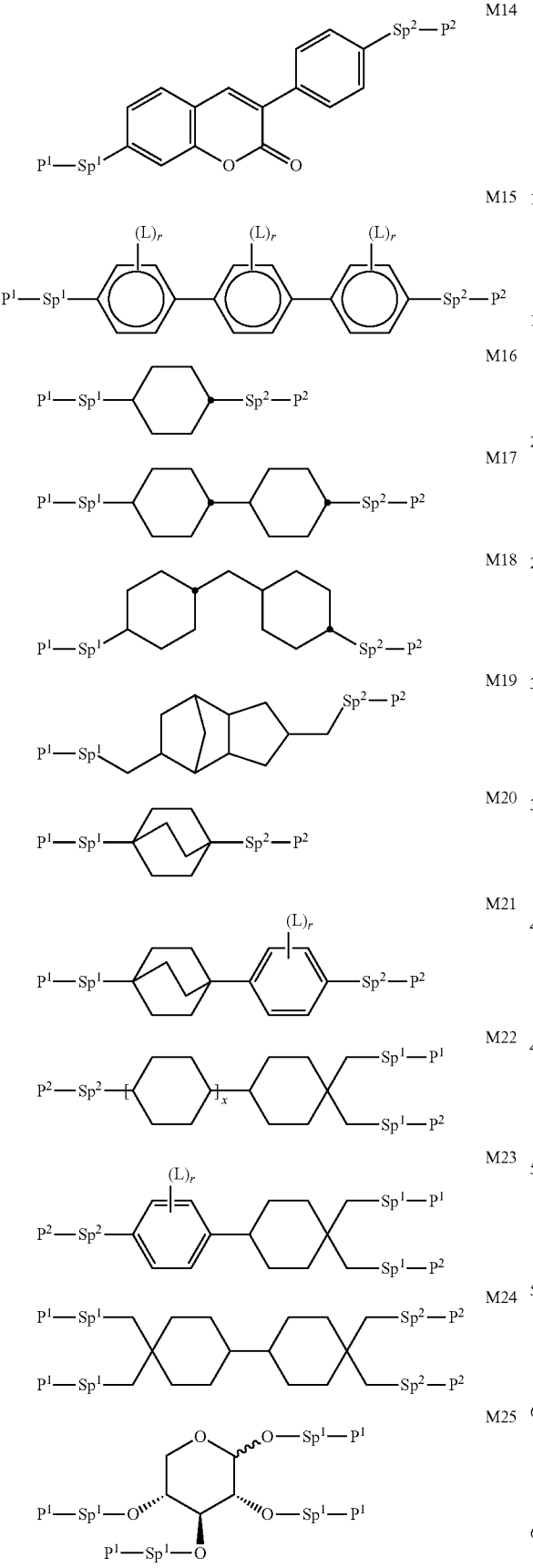

wherein the respective groups have the following meanings:
$P^1$ and $P^2$ each, independently of one another, denotes a polymerisable group, preferably having one of the meanings given above or below for $P^a$, particularly preferably an acrylate, methacrylate, fluoroacrylate, oxetane, vinyloxy or epoxy group, $Sp^1$ and $Sp^2$ each, independently of one another, denotes a single bond or a spacer group, preferably having one of the meanings given above or below for $Sp^a$, particularly preferably —$(CH_2)_{p1}$—, —$(CH_2)_{p1}$—O—, —$(CH_2)_{p1}$—CO—O—, —$(CH_2)_{p1}$—O—CO— or —$(CH_2)_{p1}$—O—CO—O—, wherein p1 is an integer from 1 to 12, and wherein the groups mentioned last are linked to the adjacent ring via the O-atom, and, wherein alternatively also one or more of $P^1$-$Sp^1$- and $P^2$-$Sp^2$- may be $R^{aa}$, provided that at least one of $P^1$-$Sp^1$- and $P^2$-$Sp^2$- present in the compound is not $R^{aa}$, $R^{aa}$ denotes H, F, Cl, CN or linear or branched alkyl having 1 to 25 C atoms, wherein one or more non-adjacent —$CH_2$— groups, independently of each another, may be replaced by —C($R^0$)=C($R^{00}$)—, —C≡C—, —N($R^0$)—, —O—, —S—, —CO—, —CO—O—, —O—CO—, —O—CO—O— in such a way that neither O nor S atoms are directly linked to one another, and wherein also one or more H atoms may be replaced by F, Cl, CN or $P^1$-$Sp^1$-, particularly preferably linear or branched, optionally single- or polyfluorinated, alkyl, alkoxy, alkenyl, alkinyl, alkylcarbonyl, alkoxycarbonyl, or alkylcarbonyloxy having 1 to 12 C atoms, wherein the alkenyl and alkinyl groups have at least two and the branched groups have at least three C atoms, $R^0$, $R^{00}$ each, at each occurrence independently of one another, denotes H or alkyl having 1 to 12 C atoms, $Z^1$ denotes —O—, —CO—, —C($R^y R^z$)—, or —$CF_2 CF_2$—, $Z^2$ and $Z^3$ each, independently of one another, denotes —CO—O—, —O—CO—, —$CH_2$O—, —O$CH_2$—, —$CF_2$O—, —O$CF_2$—, or —$(CH_2)_n$—, wherein n is 2, 3 or 4, $R^y$ and $R^z$ each, independently of one another, denotes H, F, $CH_3$ or $CF_3$, L at each occurrence independently of one another, denotes F, Cl, CN, SCN, $SF_5$ or linear or branched, optionally mono- or poly-fluorinated, alkyl, alkoxy, alkenyl, alkinyl, alkylcarbonyl, alkoxycarbonyl, alkylcarbonyloxy or alkoxycarbonyloxy having up to 12 C-atoms, preferably F, L' and L" each, independently of one another, denote H, F or Cl, r denotes 0, 1, 2, 3 or 4, s denotes 0, 1, 2 or 3, t denotes 0, 1 or 2, and x denotes 0 or 1.

Suitable and preferred co-monomers for use in devices according to the present application are for example selected from the group of mono-reactive compounds, which are present in the precursor of the polymer stabilised systems in a concentration in the range from 1 to 9 wt.-%, particularly preferred from 4 to 7 wt.-%. Preferred mono-reactive compounds are the compounds of formulae M1 to M29, wherein one or more of $P^1$-$Sp^1$- and $P^2$-$Sp^2$- are $R^{aa}$, such that the compounds have a single reactive group only.

Particularly preferred mono-reactive compounds are the compounds of the following formulae

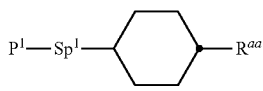

M16-A

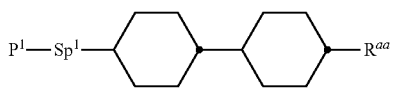

M17-A wherein $P^1$, $Sp^1$ and $R^{aa}$ have the respective meanings given above, and $P^1$ preferably is acrylate ($CH_2$=CH—CO—O—) or methacrylate ($CH_2$=C($CH_3$)—CO—O—).

Amongst these compounds, the compounds of formula

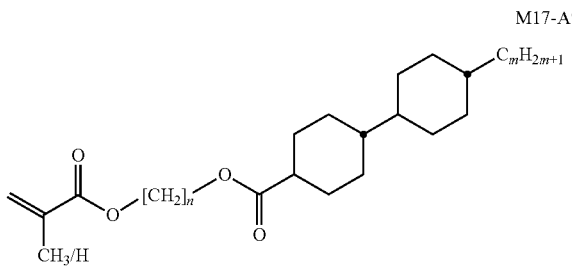

M17-A' wherein n is an integer, preferably an even integer, in the range from 1 to 16, preferably from 2 to 8, m is an integer in the range from 1 to 15, preferably from 2 to 7, are particularly preferred.

Particular preference is given to an LC medium, an LC device, preferably for high-frequency technology, in particular for a phase shifter or a microwave antenna, e.g. a leaky antenna, a process or the use as described above and below, in which the LC medium or the polymerisable or polymerised component present therein comprises one or more compounds of the following formula:

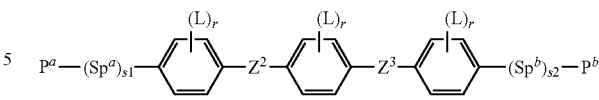

M10-A in which $P^a$, $P^b$, $Sp^a$, $Sp^b$, s1, s2 and L have the meanings indicated above and below, r denotes 0, 1, 2, 3 or 4, and $Z^2$ and $Z^3$ each, independently of one another, denote —$CF_2$—O— or —O—$CF_2$—, preferably $Z^2$ is —$CF_2$—O— and $Z^3$ is —O—$CF_2$— or vice versa or $Z^2$ is —CO—O— and $Z^3$ is —O—CO— or vice versa, and most preferably $Z^2$ is —$CF_2$—O— and $Z^3$ is —O—$CF_2$— or $Z^2$ is —CO—O— and $Z^3$ is —O—CO—.

In an embodiment it is preferable to use reactive mesogens having a cyclohexylene core instead of a core comprising one or more 1,4-phenylenes. This can be advantageous in terms of stability against UV irradiation in general and in particular against UV irradiation used during polymerisation. The resultant polymer stabilised phase, i.e. the composite system, can have an improved or a suitably high voltage holding ratio (VHR).

Furthermore, it has been found that by using cyclohexylene reactive mesogens in combination with a liquid crystalline host comprising fluorophenyl liquid crystalline compounds, this host can be effectively stabilised by the reactive mesogens to give a high VHR, which is particularly beneficial for the use in advanced devices.

In an embodiment the liquid-crystalline medium according to the invention comprises one or more compounds of formula I as set forth above. In another embodiment the liquid-crystalline medium according to the invention comprises one or more compounds of formula II as set forth above. In a further embodiment the liquid-crystalline medium according to the invention comprises one or more compounds of formula III as set forth above.

More preferably however the liquid-crystalline media according to the present invention comprise one or more compounds of formula I and
one or more compounds of formula II or one or more compounds of formula I and
one or more compounds of formula III or one or more compounds of formula II and
one or more compounds of formula III or, most preferably, one or more compounds of formula I and
one or more compounds of formula II and
one or more compounds of formula III.

Additionally the liquid-crystalline media used according to the present invention in a particular embodiment preferably comprise one or more compounds of formula IV,

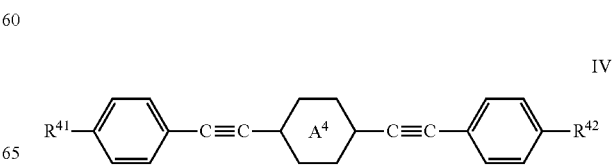

IV in which

denotes,

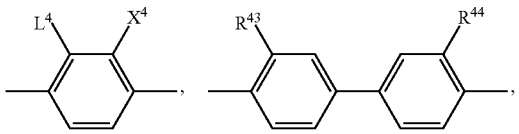

preferably

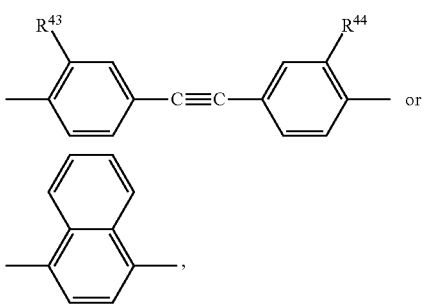

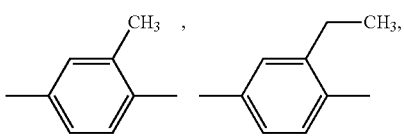

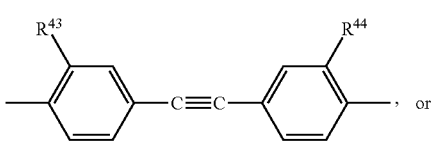

-continued

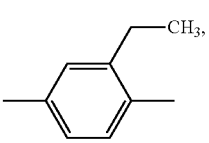

particularly preferably

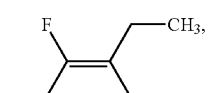

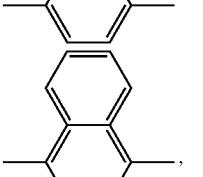

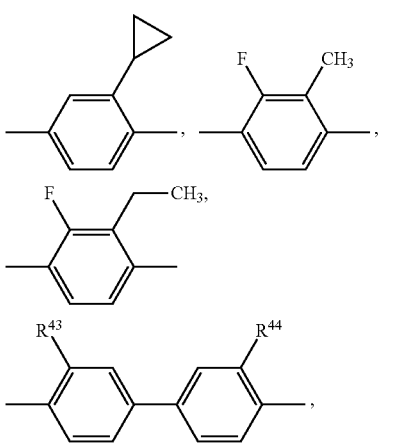

L⁴ denotes alkyl having 1 to 6 C atoms, cycloalkyl having 3 to 6 C atoms or cycloalkenyl having 4 to 6 C atoms, preferably $CH_3$, $C_2H_5$, n-$C_3H_7$(—$(CH_2)_2CH_3$), i-$C_3H_7$ (—$CH(CH_3)_2$), cyclopropyl, cyclobutyl, cyclohexyl, cyclopent-1-enyl or cyclohex-1-enyl, and particularly preferably $CH_3$, $C_2H_5$, cyclopropyl or cyclobutyl, X⁴ denotes H, alkyl having 1 to 3 C atoms or halogen, preferably H, F or Cl, and more preferably H or F and most preferably F, $R^{41}$ to $R^{44}$ independently of one another denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcyclo-alkenylalkyl, each having up to 15 C atoms, and alternatively one of $R^{43}$ and $R^{44}$ or both also denote H, preferably $R^{41}$ and $R^{42}$ independently of one another denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms, particularly preferably $R^{41}$ denotes unfluorinated alkyl having 1 to 7 C atoms or unfluorinated alkenyl, unfluorinated alkenyloxy or unfluorinated alkoxyalkyl, each having 2 to 7 C atoms, and particularly preferably $R^{42}$ denotes unfluorinated alkyl or unfluorinated alkoxy, each having 1 to 7 C atoms, and preferably $R^{43}$ and $R^{44}$ denote H, unfluorinated alkyl having 1 to 5 C atoms, unfluorinated cycloalkyl or cycloalkenyl having 3 to 7 C atoms, unfluorinated alkylcyclohexyl or unfluorinated cyclohexylalkyl, each having 4 to 12 C atoms, or unfluorinated alkylcyclohexylalkyl having 5 to 15 C atoms, more preferably cyclopropyl, cyclobutyl or cyclohexyl, and even more preferably at least one of $R^{43}$ and $R^{44}$ denotes n-alkyl, particularly preferably methyl, ethyl or n-propyl, and the other denotes H or n-alkyl, particularly preferably H, methyl, ethyl or n-propyl.

Preferably, the liquid crystal media contain one or more chiral dopants, preferably having an absolute value of the helical twisting power (HTP) of 20 $\mu m^{-1}$ or more, more preferably of 40 $\mu m^{-1}$ or more, even more preferably in the range of 60 $\mu m^{-1}$ or more, and most preferably in the range of 80 $\mu m^{-1}$ or more to 260 $\mu m^{-1}$ or less.

Therefore, in a preferred embodiment a chiral component consisting of one or more chiral compounds may additionally be present in the mesogenic media according to the present invention. The chiral compounds of this chiral component used, in case present, preferably have a high absolute value of the HTP. They are also referred to as chiral dopants since they are generally added in relatively low concentrations to mesogenic base mixtures. They preferably have good solubility in the achiral component. They do not impair the mesogenic or liquid-crystalline properties of the mesogenic medium, or only do so to a small extent, so long as the cholesteric pitch has small values which are much smaller than the wavelength of the light. If the cholesteric pitch is in the order of the wavelength of the light, however, they induce a blue phase having a completely different structure to that of the cholesteric phase. If two or more chiral compounds are employed, they may have the same or opposite direction of rotation and the same or opposite temperature dependence of the twist.

Particular preference is given to chiral compounds having an HTP of 20 $\mu m^{-1}$ or more, in particular of 40 $\mu m^{-1}$ or more, particularly preferably of 70 $\mu m^{-1}$ or more, in the commercial liquid-crystal mixture MLC-6828 from Merck KGaA.

In a preferred embodiment of the present invention, the chiral component consists of two or more chiral compounds which all have the same sign of the HTP.

The temperature dependence of the HTP of the individual compounds may be high or low. The temperature dependence of the pitch of the medium can be compensated by mixing compounds having different temperature dependence of the HTP in corresponding ratios.

For the optically active component, a multiplicity of chiral dopants, some of which are commercially available, is available to the person skilled in the art, such as, for example, cholesteryl nonanoate, R/S-811, R/S-1011, R/S-2011, R/S-3011, R/S-4011, B(OC)2C*H—C-3 or CB15 (all Merck KGaA, Darmstadt).

Particularly suitable chiral dopants are compounds which contain one or more chiral radicals and one or more mesogenic groups, or one or more aromatic or alicyclic groups which form a mesogenic group with the chiral radical.

Suitable chiral radicals are, for example, chiral branched hydrocarbon radicals, chiral ethanediols, binaphthols or dioxolanes, furthermore mono- or polyvalent chiral radicals selected from the group consisting of sugar derivatives, sugar alcohols, sugar acids, lactic acids, chiral substituted glycols, steroid derivatives, terpene derivatives, amino acids or sequences of a few, preferably 1-5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide, isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or propylene glycols, wherein one or more $CH_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE 43 42 280, EP 01 038 941 and DE 195 41 820.

Chiral compounds preferably used according to the present invention are selected from the group consisting of the formulae shown below.

Particular preference is given to dopants selected from the group consisting of compounds of the following formulae A-I to A-III:

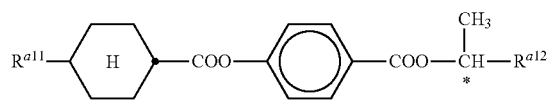

A-I

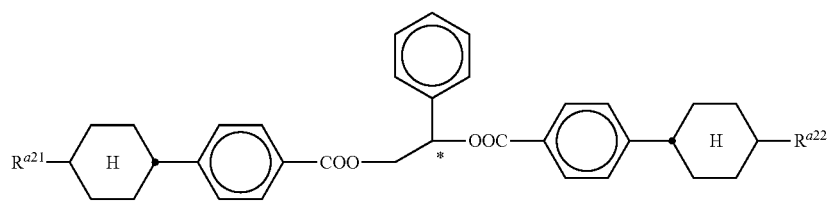

A-II

-continued

A-III

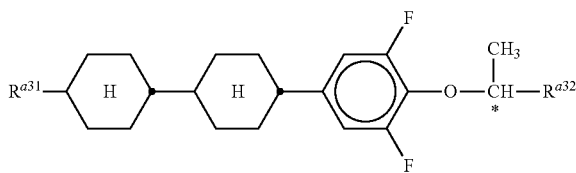

in which $R^{a11}$ and $R^{a12}$, independently of one another, are alkyl, oxaalkyl or alkenyl having from 2 to 9 C atoms, preferably up to 7 C atoms, and $R^{a11}$ is alternatively methyl or alkoxy having from 1 to 9 C atoms, preferably both are alkyl, preferably n-alkyl, $R^{a21}$ and $R^{a22}$, independently of one another, are alkyl or alkoxy having from 1 to 9 C atoms, preferably up to 7 C atoms, oxaalkyl, alkenyl or alkenyloxy having from 2 to 9 C atoms, preferably up to 7 C atoms, preferably both are alkyl, preferably n-alkyl, $R^{a31}$ and $R^{a32}$, independently of one another, are alkyl, oxaalkyl or alkenyl having from 2 to 9 C atoms, preferably up to 7 C atoms, and $R^{a11}$ is alternatively methyl or alkoxy having from 1 to 9 C atoms, preferably both are alkyl, preferably n-alkyl.

Particular preference is given to dopants selected from the group consisting of the compounds of the following formulae:

A-I-1

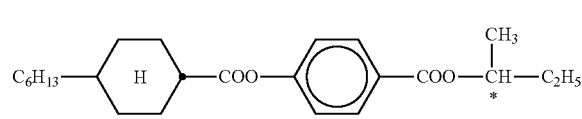

A-II-1

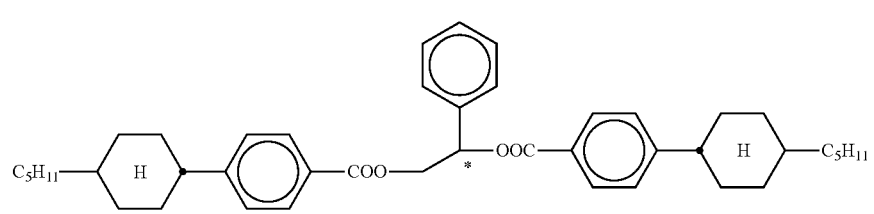

A-III-1

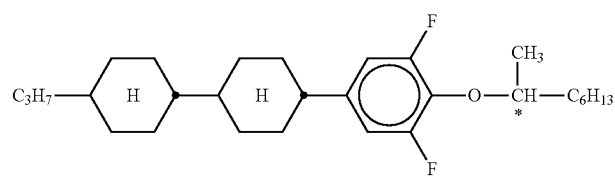

Further preferred dopants are derivatives of the isosorbide, isomannitol or isoiditol of the following formula A-IV:

A-IV

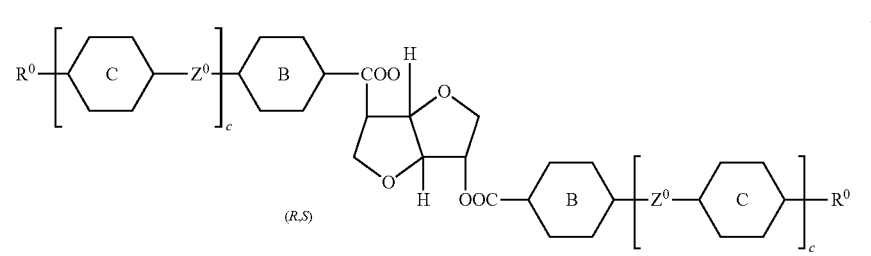

wherein the group is

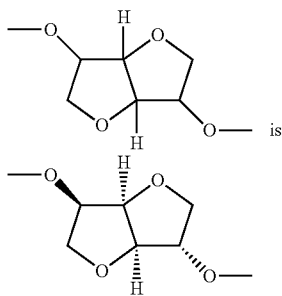

(dianhydrosorbitol),

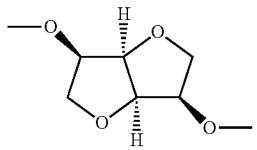

(dianhydromannitol), or

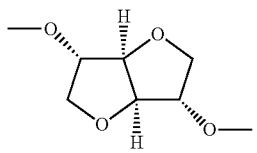

(dianhydroiditol),
preferably dianhydrosorbitol,
and chiral ethanediols, such as, for example, diphenylethanediol (hydrobenzoin), in particular mesogenic hydrobenzoin derivatives of the following formula A-V:

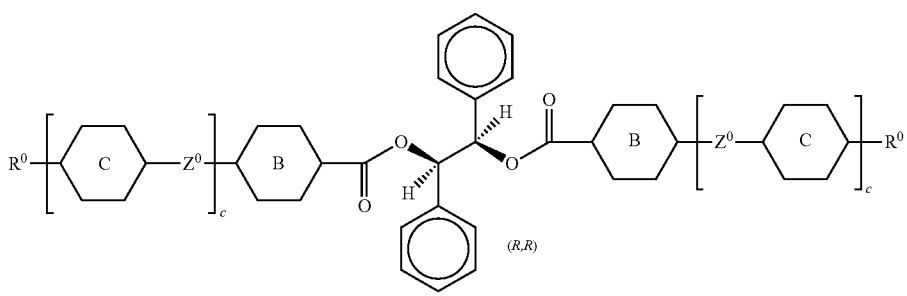

including the (R,S), (S,R), (R,R) and (S,S) enantiomers, which are not shown,
wherein

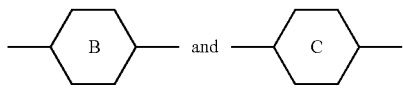

are each, independently of one another, 1,4-phenylene, which may also be mono-, di- or trisubstituted by L, or 1,4-cyclohexylene,
L is H, F, Cl, CN or optionally halogenated alkyl, alkoxy, alkylcarbonyl, alkoxycarbonyl or alkoxycarbonyloxy having 1-7 C atoms,
c is 0 or 1,
$Z^0$ is —COO—, —OCO—, —CH$_2$CH$_2$— or a single bond, and
$R^0$ is alkyl, alkoxy, alkylcarbonyl, alkoxycarbonyl or alkylcarbonyloxy having 1-12 C atoms.

The compounds of the formula A-IV are described in WO 98/00428. The compounds of the formula A-V are described in GB-A-2,328,207.

Very particularly preferred dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

Particular preference is given to chiral compounds of the formula A-VI

A-VI

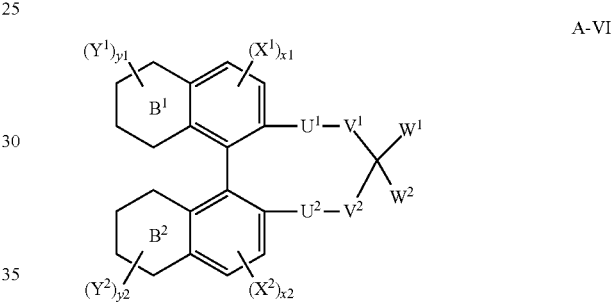

wherein
$X^1$, $X^2$, $Y^1$ and $Y^2$ are each, independently of one another, F, Cl, Br, I, CN, SCN, SF$_5$, straight-chain or branched alkyl having from 1 to 25 C atoms, which may be monosubstituted or polysubstituted by F, Cl, Br, I or CN and in which, in addition, one or more non-adjacent CH$_2$ groups may each, independently of one another, be replaced by —O—, —S—, —NH—, —NR$^0$—, —CO—, —COO—, —OCO—, —OCOO—, —S—CO—, —CO—S—, —CH=CH— or —C≡C— in such a way that O and/or S atoms are not bonded directly to one another, a polymerisable group or cycloalkyl or aryl having up to 20 C atoms, which may optionally be monosubstituted or polysubstituted by halogen, preferably F, or by a polymerisable group, $x^1$ and $x^2$ are each, independently of one another, 0, 1 or 2, $y^1$ and $y^2$ are each, independently of one another, 0, 1, 2, 3 or 4, $B^1$ and $B^2$ are each, independently of one another, an aromatic or partially or fully saturated aliphatic six-membered ring in which one or more CH groups may be replaced by N atoms and one or more non-adjacent $CH_2$ groups may be replaced by O and/or S, $W^1$ and $W^2$ are each, independently of one another, —$Z^1$-$A^1$-$(Z^2-A^2)_m$-R, and one of the two is alternatively $R^1$ or $A^3$, wherein both are not simultaneously H, or

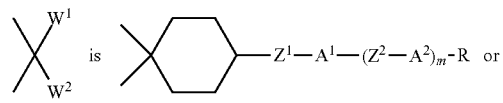

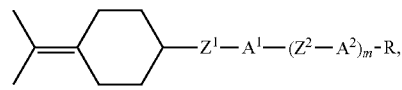

$U^1$ and $U^2$ are each, independently of one another, $CH_2$, O, S, CO or CS, $V^1$ and $V^2$ are each, independently of one another, $(CH_2)_n$, in which from one to four non-adjacent $CH_2$ groups may be replaced by O and/or S, and one of $V^1$ and $V^2$ and, in the case where

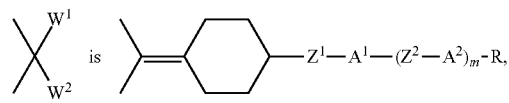

both are a single bond, $Z^1$ and $Z^2$ are each, independently of one another, —O—, —S—, —CO—, —COO—, —OCO—, —O—COO—, —CO—NR$^0$—, —NR$^0$—CO—, —O—CH$_2$—, —CH$_2$—O—, —S—CH$_2$—, —CH$_2$—S—, —CF$_2$—O—, —O—CF$_2$—, —CF$_2$—S—, —S—CF$_2$—, —CH$_2$—CH$_2$—, —CF$_2$—CH$_2$—, —CH$_2$—CF$_2$—, —CF$_2$—CF$_2$—, —CH═N—, —N═CH—, —N═N—, —CH═CH—, —CF═CH—, —CH═CF—, —CF═CF—, —C≡C—, a combination of two of these groups, where no two O and/or S and/or N atoms are bonded directly to one another, preferably —CH═CH—COO—, or —COO—CH═CH—, or a single bond, $A^1$, $A^2$ and $A^3$ are each, independently of one another, 1,4-phenylene, in which one or two non-adjacent CH groups may be replaced by N, 1,4-cyclohexylene, in which one or two non-adjacent $CH_2$ groups may be replaced by O and/or S, 1,3-dioxolane-4,5-diyl, 1,4-cyclohexenylene, 1,4-bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where each of these groups may be monosubstituted or polysubstituted by L, and in addition $A^1$ is a single bond, L is a halogen atom, preferably F, CN, $NO_2$, alkyl, alkoxy, alkylcarbonyl, alkoxycarbonyl or alkoxycarbonyloxy having 1-7 carbon atoms, in which one or more H atoms may be replaced by F or Cl, m is in each case, independently, 0, 1, 2 or 3, and R and $R^1$ are each, independently of one another, H, F, Cl, Br, I, CN, SCN, $SF_5$, straight-chain or branched alkyl having from 1 or 3 to 25 C atoms respectively, which may optionally be monosubstituted or polysubstituted by F, Cl, Br, I or CN, and in which one or more non-adjacent $CH_2$ groups may be replaced by —O—, —S—, —NH—, —NR$^0$—, —CO—, —COO—, —OCO—, —O—COO—, —S—CO—, —CO—S—, —CH═CH— or —C≡C—, where no two O and/or S atoms are bonded directly to one another, or a polymerisable group.

Particular preference is given to chiral binaphthyl derivatives of the formula A-VI-1

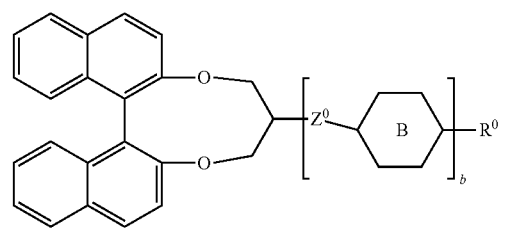

A-VI-1 in particular those selected from the following formulae A-VI-1a to A-VI-1c:

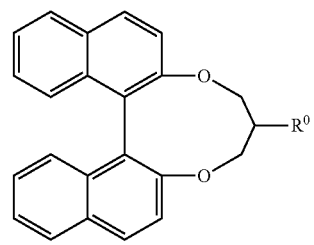

A-VI-1a

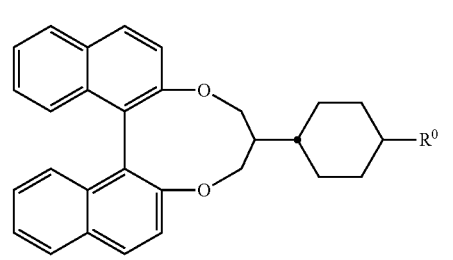

A-VI-1b

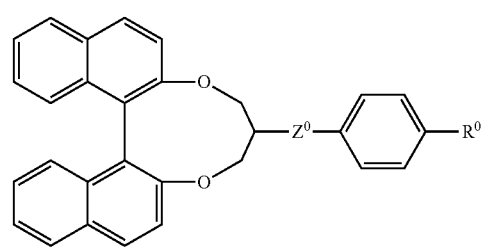

A-VI-1c in which ring B and $Z^0$ are as defined for the formula A-IV, and $R^0$ is as defined for formula A-iV or H or alkyl having from 1 to 4 C atoms, and b is 0, 1 or 2, and $Z^0$ is, in particular, —OCO— or a single bond.

Particular p reference is furthermore given to chiral binaphthyl derivatives of the formula A-VI-2

A-VI-2

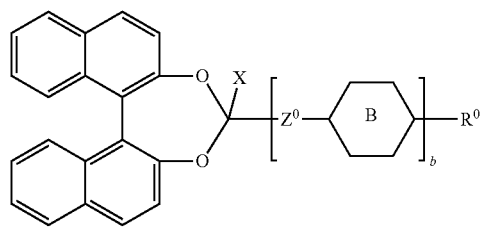

in particular those selected from the following formulae A-VI-2a to A-VI-2f:

A-VI-2a

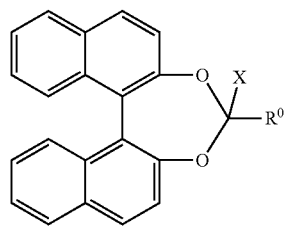

A-VI-2b

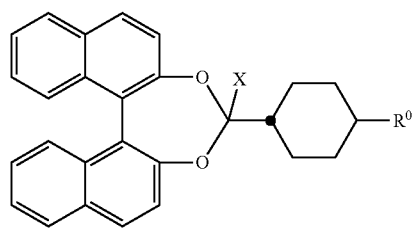

A-VI-2c

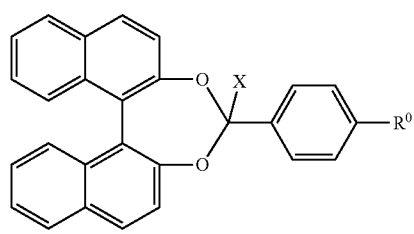

A-VI-2d

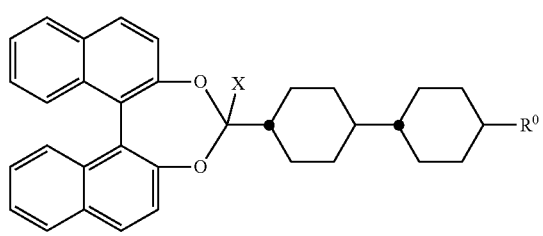

A-VI-2e

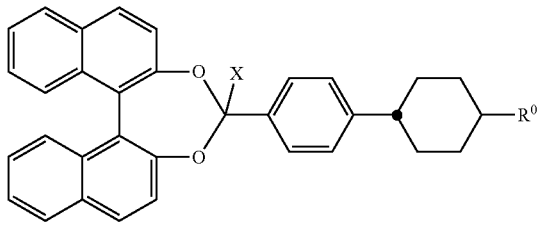

A-VI-2f

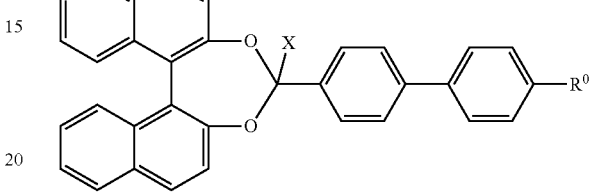

wherein $R^0$ is as defined for the formula A-VI, and X is H, F, Cl, CN or $R^0$, preferably F.

The concentration of the chiral dopant, respectively the total concentration of the chiral dopants in the LC medium are preferably in the range from 0.05% or more to 5% or less, more preferably from 0.1% or more to 1% or less, and most preferably from 0.2% or more to 0.8% or less. These preferred concentration ranges apply in particular to the chiral dopant S-2011, respectively to its enantiomeric form R-2011 (both from Merck KGaA) and for chiral dopants having the same or a similar HTP. For Chiral dopants having either a higher or a lower absolute value of the HTP compared to S-2011 these preferred concentrations can be decreased, respectively increased proportionally according to the ratio of their HTP values relatively to that of S-2011.

The liquid-crystalline media in accordance with the present application preferably comprise in total 5% to 70%, more preferably 5% to 60% and particularly preferably 30% to 50% of compounds of formula I.

The liquid-crystalline media in accordance with the present application preferably comprise in total 20% to 80%, more preferably 30% to 70% and particularly preferably 35% to 65% of compounds of formula II.

The liquid-crystalline media in accordance with the present application preferably comprise in total 5% to 45%, more preferably 10% to 40% and particularly preferably 15% to 35% of compounds of formula III.

In a preferred embodiment of the present invention, in which the liquid-crystalline media comprise in each case one or more compounds of formulae I, II and III, the concentration of the compounds of formula I is preferably 45% to 100%, preferably 50% to 100% and particularly preferably 55% to 100%.

The concentration of the compounds of formula II is preferably 1% to 20%, more preferably 2% to 15% and particularly preferably 3% to 10%, and the concentration of the compounds of formula III is preferably 1% to 30%, more preferably 5% to 25% and particularly preferably 5% to 20%.

In a further preferred embodiment of the present invention, in which the liquid-crystalline media comprise in each case one or more compounds of the formulae I, II and III, the concentration of the compounds of formula I is preferably 15% to 40%, more preferably 20% to 35% and particularly preferably 25% to 30%, the concentration of the compounds of formula II is preferably 10% to 35%, more preferably 15% to 30% and particularly preferably 20% to 25%, and the concentration of the compounds of formula III is preferably 25% to 50%, more preferably 30% to 45% and particularly preferably 35% to 40%.

In a preferred embodiment of the present invention, in which the liquid-crystalline media comprise in each case one or more compounds of the formulae I and II, but at most 5% and preferably no compounds of formula III, the concentration of the compounds of formula I is preferably 10% to 50%, more preferably 20% to 40% and particularly preferably 25% to 35%, the concentration of the compounds of formula II is preferably 40% to 70%, more preferably 50% to 65% and particularly preferably 55% to 60%, and the concentration of the compounds of formula III is preferably 1% to 4%, more preferably 1% to 3% and particularly preferably 0%.

The liquid-crystalline media in accordance with the present application particularly preferably comprise in total 50% to 80%, more preferably 55% to 75% and particularly preferably 57% to 70% of compounds of formula I-1 as defined below and/or in total 5% to 70%, preferably 6% to 50% and particularly preferably 8% to 20% of compounds selected from the group of the compounds of the formulae I-2 and I-3 as defined below, most preferably compounds of both formula I-2 and formula I-3.

The liquid-crystalline media in accordance with the present application likewise preferably comprise in total 5% to 60%, preferably 10% to 50% and particularly preferably 7% to 20% of compounds of formula II.

In the case of the use of a single homologous compound, these limits correspond to the concentration of this homologue, which is preferably 2% to 20%, particularly preferably 1% to 15%. In the case of the use of two or more homologues, the concentration of the individual homologues is likewise particularly preferably in each case 1% to 15%.

The compounds of the formulae I to III in each case include dielectrically positive compounds having a dielectric anisotropy of greater than 3, dielectrically neutral compounds having a dielectric anisotropy of less than 3 and greater than −1.5, and dielectrically negative compounds having a dielectric anisotropy of −1.5 or less.

In a preferred embodiment of the present invention the liquid-crystalline medium comprises one or more compounds of formula I selected from the group of the compounds of the formulae I-1 and I-2 as set forth below, preferably simultaneously one or more compounds of formula I-1 and one or more compounds of formula I-2. Optionally, and preferably according to an embodiment, one or more compounds of formula I-3 as set forth below are further comprised. In a particularly preferred embodiment, the compounds of formula I predominantly consist, more preferably essentially consist and most preferably completely consist of one or more compounds selected from the compounds of the formulae I-1, I-2 and I-3:

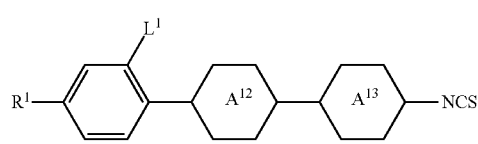

I-1

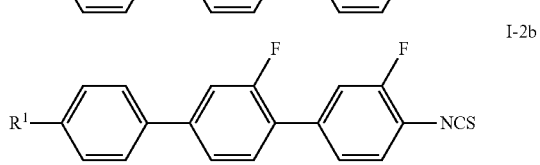

I-2

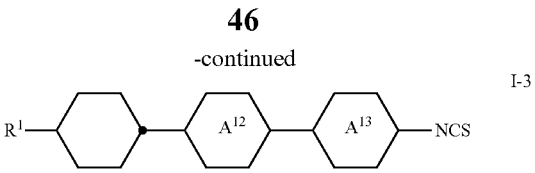

I-3 in which
L$^1$ is H or F, preferably H
and the other groups have the respective meanings indicated above for formula I and preferably
R$^1$ denotes unfluorinated alkyl having 1 to 7 C atoms or unfluorinated alkenyl having 2 to 7 C atoms.

The media according to the invention preferably comprise one or more compounds of formula I-1, which are more preferably selected from the group of the compounds of the formulae I-1a to I-1c, even more preferably of formula I-1c, wherein more preferably the compounds of formula I-1 predominantly consist, even more preferably essentially consist and particularly preferably completely consist thereof:

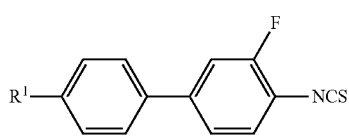

I-1a

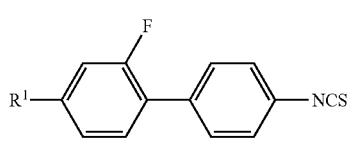

I-1b

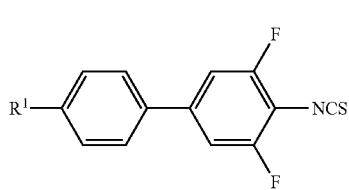

I-1c in which the groups have the respective meanings indicated above for formula I-1 and in which preferably
R$^1$ denotes unfluorinated alkyl or unfluorinated alkenyl.

The media preferably comprise one or more compounds of formula I-2, which are more preferably selected from the group of the compounds of the formulae I-2a to I-2d, even more preferably of formula I-2d, wherein preferably the compounds of formula I-2 predominantly consist, even more preferably essentially consist and particularly preferably completely consist thereof:

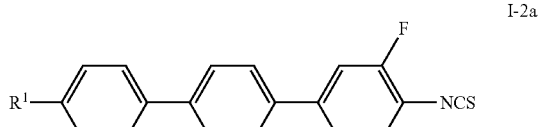

I-2a

I-2b

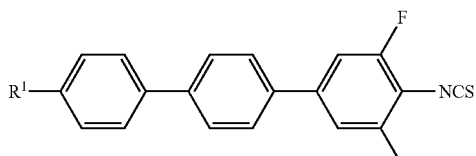
I-2c

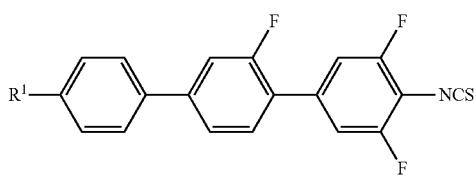
I-2d in which the groups have the respective meanings indicated above for formula I-2 and in which preferably $R^1$ denotes unfluorinated alkyl or unfluorinated alkenyl.

The media preferably comprise one or more compounds of formula I-3, which are more preferably selected from the group of the compounds of the formulae I-3a to I-3d, even more preferably of formula I-3c, wherein preferably the compounds of formula I-3 predominantly consist, even more preferably essentially consist and particularly preferably completely consist thereof:

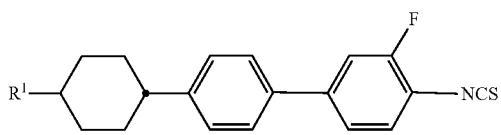

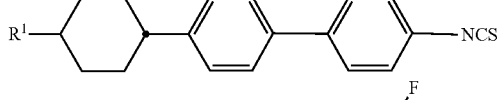

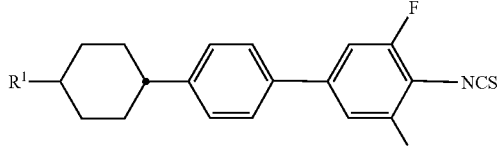

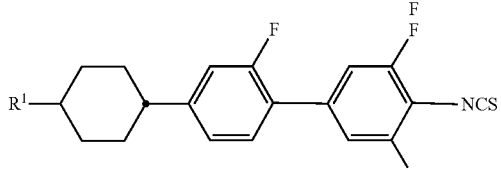

in which the groups have the respective meanings indicated above for formula I-3 and in which preferably $R^1$ denotes unfluorinated alkyl or unfluorinated alkenyl.

The media according to the invention preferably comprise one or more compounds of formula II, which are more preferably selected from the group of the compounds of the formulae II-1 to II-3, even more preferably selected from the group of the compounds of the formulae II-1 and II-2, wherein preferably the compounds of formula II predominantly consist, even more preferably essentially consist and particularly preferably completely consist thereof:

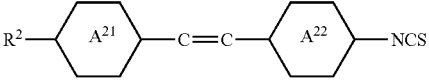
II-1

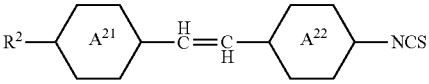
II-2

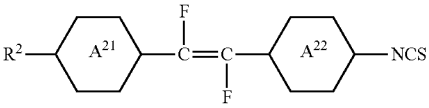
II-3 in which the groups have the meanings given under formula II above and preferably $R^2$ denotes H, unfluorinated alkyl or alkoxy having 1 to 7 C atoms or unfluorinated alkenyl having 2 to 7 C atoms, and one of

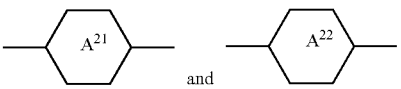
and denotes

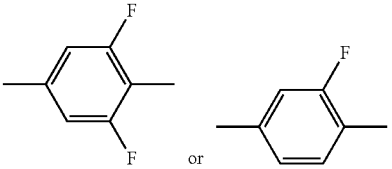
or and the other, independently denotes

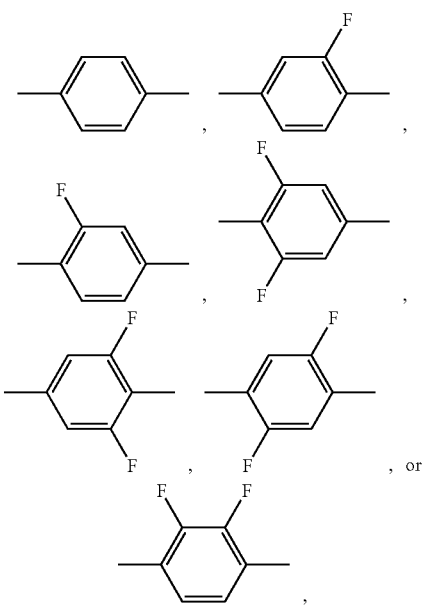
, or preferably

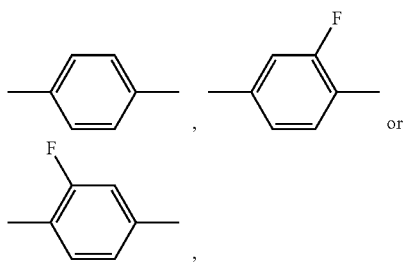

most preferably

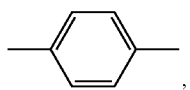

and preferably

R² denotes $C_nH_{2n+1}$ or $CH_2=CH—(CH_2)_z$, n denotes an integer in the range from 0 to 15, preferably in the range from 1 to 7, and particularly preferably 1 to 5, and z denotes 0, 1, 2, 3 or 4, preferably 0 or 2.

The media preferably comprise one or more compounds of formula II-1, which are more preferably selected from the group of the compounds of the formulae II-1a to II-1e, even more preferably selected from the group of the compounds of the formulae II-1a and II-1b, particularly preferably of formula II-1b, wherein preferably the compounds of formula II-1 predominantly consist, even more preferably essentially consist and particularly preferably completely consist thereof:

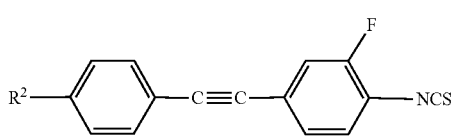 II-1a

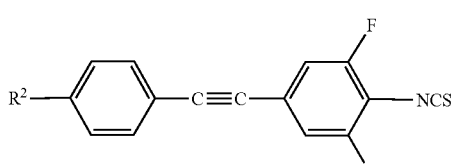 II-1b

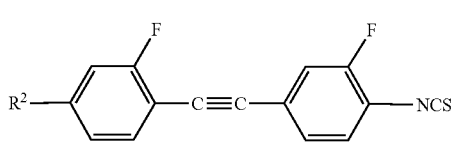 II-1c

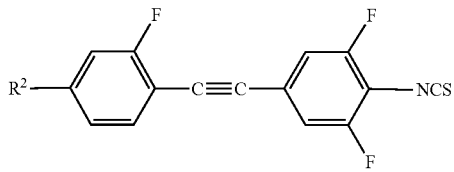 II-1d

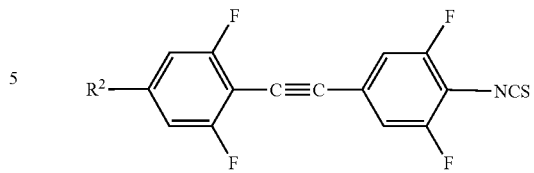 II-1e in which

R² has the meaning indicated above, and preferably denotes $C_nH_{2n+1}$ or $CH_2=CH—(CH_2)_z$, n independently of one another, denotes an integer in the range from 0 to 15, preferably in the range from 1 to 7, and particularly preferably 1 to 5, and z denotes 0, 1, 2, 3 or 4, preferably 0 or 2.

The media preferably comprise one or more compounds of formula II-2, which are more preferably selected from the group of the compounds of the formulae II-2a and II-2b, even more preferably simultaneously one or more compounds of formula II-2a and one or more compounds of formula II-2b, wherein preferably these compounds of formula II-2 predominantly consist, even more preferably essentially consist and particularly preferably completely consist thereof:

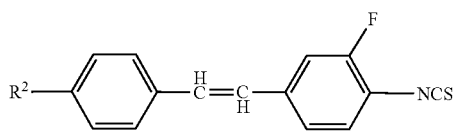 II-2a

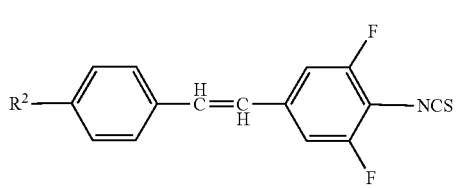 II-2b in which

R² has the meaning indicated above, and preferably denotes $C_nH_{2n+1}$ or $CH_2=CH—(CH_2)_z$, n denotes an integer in the range from 0 to 15, preferably in the range from 1 to 7, and particularly preferably 1 to 5, and z denotes 0, 1, 2, 3 or 4, preferably 0 or 2.

The media preferably comprise one or more compounds of formula II-3, which are more preferably selected from the group of the compounds of formulae II-3a to II-3c, even more preferably selected from the group of the compounds of formulae II-3a and II-3b, particularly preferably simultaneously one or more compounds of formula II-3a and one or more compounds of formula II-3b, wherein preferably the compounds of formula II-3 predominantly consist, even more preferably essentially consist and very particularly preferably completely consist thereof:

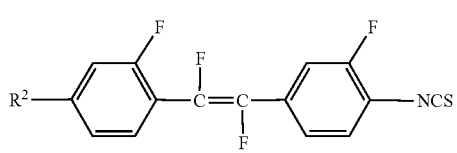 II-3a

-continued

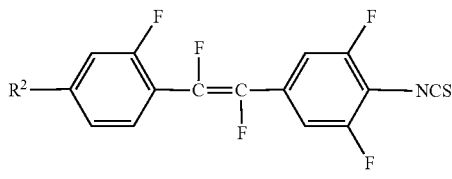
II-3b

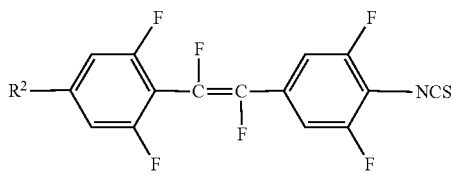
II-3c in which
R² has the meaning indicated above, and preferably denotes $C_nH_{2n+1}$ or $CH_2=CH-(CH_2)_z$,
n denotes an integer in the range from 0 to 15, preferably in the range from 1 to 7, and particularly preferably 1 to 5, and
z denotes 0, 1, 2, 3 or 4, preferably 0 or 2.

The media preferably comprise one or more compounds of formula III, which are more preferably selected from the group of the compounds of the formulae III-1 to III-6, wherein even more preferably the compounds are selected from the group of the compounds of the formulae III-1, III-2, III-3 and III-4, particularly preferably of formula III-1, wherein preferably the compounds of formula III predominantly consist, even more preferably essentially consist and very particularly preferably completely consist thereof:

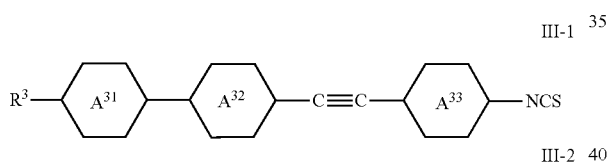
III-1

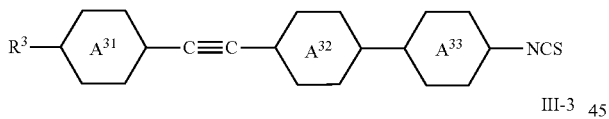
III-2

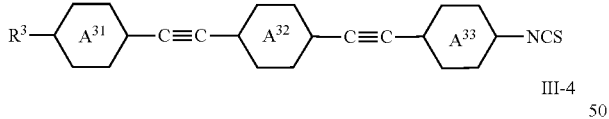
III-3

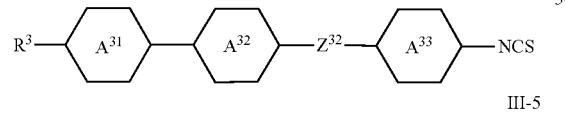
III-4

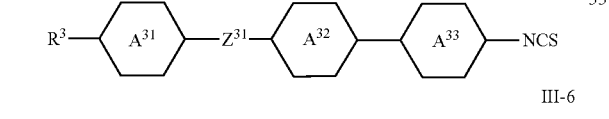
III-5

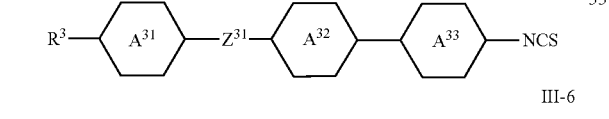
III-6 in which
$Z^{31}$ and $Z^{32}$ independently of one another denote trans-CH=CH— or trans-CF=CF—, preferably trans-CH=CH—, wherein in formula III-6 alternatively one of $Z^{31}$ and $Z^{32}$ may denote —C≡C— and the other groups have the meaning given above under formula III, and preferably R³ denotes H, unfluorinated alkyl or alkoxy having 1 to 7 C atoms or unfluorinated alkenyl having 2 to 7 C atoms,
and one of

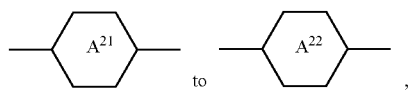

to preferably

denotes

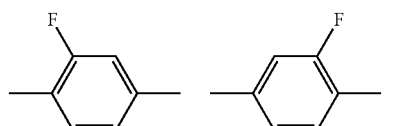

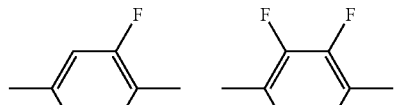

or preferably

or and the others, independently of one another, denote

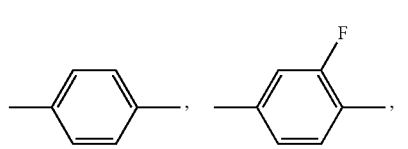

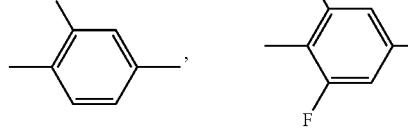

-continued

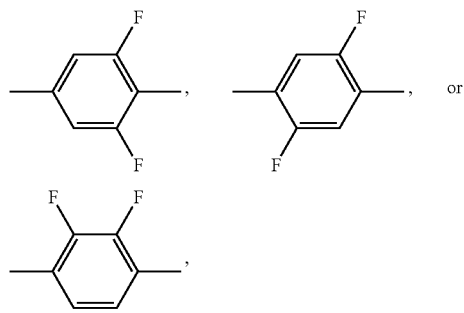

preferably

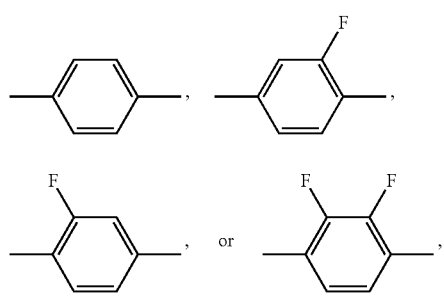

more preferably

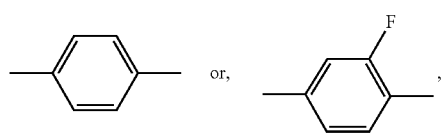

and preferably $R^3$ denotes $C_nH_{2n+1}$ or $CH_2$=CH—$(CH_2)_z$, n denotes an integer in the range from 0 to 15, preferably in the range from 1 to 7, and particularly preferably 1 to 5, and z denotes 0, 1, 2, 3 or 4, preferably 0 or 2.

The media preferably comprise one or more compounds of formula III-1, which are more preferably selected from the group of the compounds of the formulae III-1a to III-1d, even more preferably selected from the group of the compounds of the formulae III-1a and III-1b, particularly preferably of formula III-1b, wherein preferably the compounds of formula III-1 predominantly consist, even more preferably essentially consist and particularly preferably completely consist thereof:

III-1a

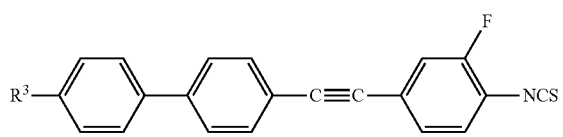

III-1b

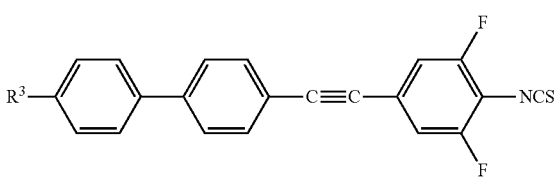

III-1c

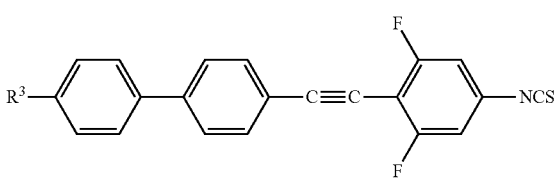

III-1d

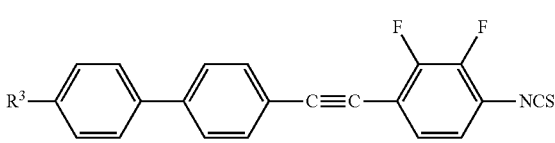

in which $R^3$ has the meaning indicated above, and preferably denotes $C_nH_{2n+1}$ or $CH_2$=CH—$(CH_2)_z$, n denotes an integer in the range from 0 to 15, preferably in the range from 1 to 7, and particularly preferably 1 to 5, and z denotes 0, 1, 2, 3 or 4, preferably 0 or 2.

The media preferably comprise one or more compounds of formula III-2, which are more preferably compounds of formula III-2a:

III-2a

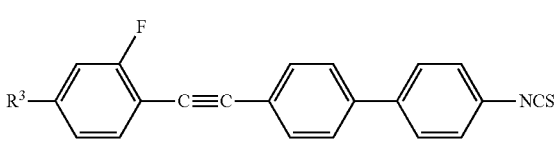

in which $R^3$ has the meaning indicated above, and preferably denotes $C_nH_{2n+1}$ or $CH_2$=CH—$(CH_2)_z$, n denotes an integer in the range from 0 to 15, preferably in the range from 1 to 7, and particularly preferably 1 to 5, and z denotes 0, 1, 2, 3 or 4, preferably 0 or 2.

The media preferably comprise one or more compounds of formula III-3 and/or one or more compounds of formula III-4.

The media preferably comprise one or more compounds of formula III-5, which are more preferably compounds of formula III-5a:

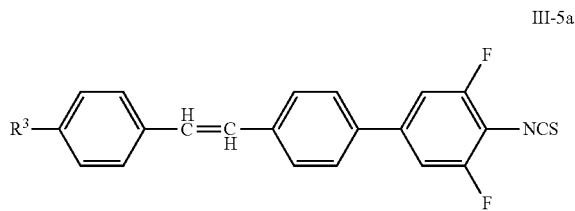

III-5a wherein
R³ has the meaning indicated above for formula III-5, and preferably denotes $C_nH_{2n+1}$, in which
n denotes an integer in the range from 0 to 7, preferably in the range from 1 to 5.

Further preferred compounds of formula III are the compounds of the following formulae:

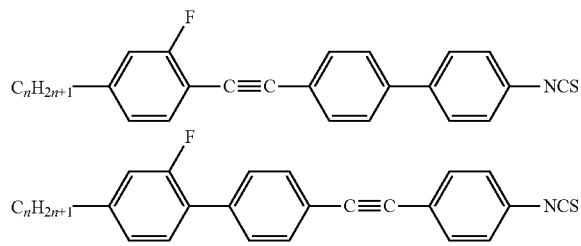

in which
n denotes an integer in the range from 0 to 7, preferably in the range from 1 to 5.

In a further aspect according to the invention there is provided a composite system comprising a liquid-crystalline medium which comprises one or more pleochroic compounds and one or more compounds selected from the group of compounds of formulae I, II and III as set forth above, and in addition a polymer obtained or obtainable from the polymerisation of the polymerisable compound(s) as set forth above.

Suitable and preferred polymerisation methods are, for example, thermally induced polymerisation or photo polymerisation, preferably photopolymerisation, in particular UV photopolymerisation. One or more initiators can optionally also be added. Suitable conditions for the polymerisation and suitable types and amounts of initiators are known to the person skilled in the art and are described in the literature. Suitable for free-radical polymerisation are, for example, and preferably, the commercially available photoinitiators Irgacure®184, Irgacure®369, Irgacure®651, in particular Irgacure®784, in particular Irgacure®819, Irgacure®907 or Irgacure®1300 (all from BASF) or Darocure®1173 (from Ciba AG). In case an initiator is employed, its proportion is preferably 0.001% to 5% by weight, more preferably 0.001% to 1% by weight.

The polymerisable compounds according to the invention are also suitable for polymerisation without an initiator, which can be accompanied by considerable advantages, such as, for example, lower material costs and in particular less contamination of the LC medium by possible residual amounts of the initiator or degradation products thereof. The polymerisation can thus also be carried out without the addition of an initiator. In a preferred embodiment, the LC medium thus comprises no polymerisation initiator.

The polymerisable component or the LC medium may also comprise one or more stabilisers in order to prevent undesired spontaneous polymerisation of the reactive mesogens (RMs), for example during storage or transport. Suitable types and amounts of stabilisers are known to the person skilled in the art and are described in the literature. Particularly suitable are, for example, the commercially available stabilisers from the Irganox® series (from Ciba AG), such as, for example, Irganox® 1076. In case stabilisers are employed, their proportion, based on the total amount of the mixture of LCs including the RMs or the polymerisable component, is preferably in the range from 10 ppm to 10,000 ppm, more preferably in the range from 50 ppm to 2,000 ppm, most preferably 0.2% or about 0.2%.

Preferably, the mixtures are characterised as described below before the polymerisation. The reactive components are then polymerised by irradiation once, e.g. 180 s, and the resultant media are re-characterised.

The polymerisation of the media preferably is carried out by irradiation with a UV lamp, e.g. Dymax, Bluewave 200, 365 nm interference filter, having an effective power of about 3.0 mW/cm² for 180 seconds. The polymerisation is carried out directly in the test cell/antenna device. To minimize UV induced host degradation a suitable long pass filter is beneficially applied, for example Schott GG395 or GG410.

The polymerisation is preferably carried out at room temperature.

The entire irradiation time which results in maximum stabilisation is typically 180 s at the irradiation power indicated. Further polymerisations can be carried out in accordance with an optimised irradiation/temperature programme.

The total concentration of the polymerisable compounds in the medium prior to polymerisation preferably is in the range form 1% to 20%, more preferably from 2% to 15% and, most preferably from 2% to 10%.

In a preferred embodiment of the present invention, the medium comprises one or more dielectrically positive compounds of formula I-1 having a dielectric anisotropy of greater than 3.

The medium preferably comprises one or more dielectrically neutral compounds of formula I-2 having a dielectric anisotropy in the range from more than −1.5 to 3.

In a preferred embodiment of the present invention, the medium comprises one or more compounds of formula II.

In a further preferred embodiment of the present invention, the medium comprises one or more compounds of formula III.

The liquid-crystalline media, preferably the nematic component of the liquid crystalline media used in accordance with the present invention preferably comprise 10% or less, preferably 5% or less, more preferably 2% or less, even more preferably 1% or less, and in particular absolutely no compound having only two or fewer five- and/or six-membered rings.

The definitions of the abbreviations (acronyms) are likewise indicated below in Table D or are evident from Tables A to C.

The liquid-crystalline media in accordance with the present invention preferably comprise, more preferably predominantly consist of, even more preferably essentially consist of and particularly preferably completely consist of compounds selected from the group of the compounds of the formulae I to III.

In a preferred embodiment of the present invention the liquid-crystalline media predominantly consist of, more preferably essentially consist of, and most preferably completely consist of isothiocyanate compounds, preferably selected from the group of the compounds of the formulae I to III.

The liquid-crystalline medium of the invention can be prepared by mixing or blending one or more polymerisable compounds with one or more pleochroic compounds and one or more compounds selected from the group of the compounds of the formulae I, II and III as set forth above, and optionally with one or more further compounds and/or with one or more additives.

The liquid-crystalline medium or the composite system according to the invention can beneficially be used in a component for high-frequency technology.

Another aspect of the invention thus relates to a component for high-frequency technology, which comprises the liquid-crystalline medium or the composite system according to the invention. The component is preferably suitable for operation in the microwave range, and more preferably is a phase shifter or a LC based antenna element operable in the microwave region.

In a further aspect there is provided a microwave antenna array which comprises one or more components according to the invention.

In these components and devices the liquid-crystalline media of the invention comprising one or more pleochroic compounds can be favourably used, in particular by favourably or suitably influencing tunability, in particular microwave tunability, and/or loss parameter, while suitably maintaining or improving the VHR.

In this application, the term "comprise(s)" in connection with compositions means that the entity in question, i.e. the medium or the component, comprises the component or components or compound or compounds indicated, preferably in a total concentration of 10% or more and more preferably 20% or more.

In this connection, the term "predominantly consist(s) of" means that the entity in question comprises 55% or more, preferably 60% or more, and particularly preferably 70% or more of the component or components or compound or compounds indicated.

In this connection, "essentially consist(s) of" means that the entity in question comprises 80% or more, preferably 90% or more and very preferably 95% or more of the component or components or compound or compounds indicated.

In this connection, "completely consist(s) of" means that the entity in question comprises 98% or more, preferably 99% or more, and particularly preferably 100.0% of the component or components or compound or compounds indicated.

Other mesogenic compounds which are not explicitly mentioned above can optionally and advantageously also be used in the media in accordance with the present invention. Such compounds are known to the person skilled in the art.

Preferably, the total concentration of the compounds of formulae I to III in the medium is in the range from 80% or more to 100%, more preferably in the range from 90% or more to 100%, and most preferably in the range from 95% or more to 100%.

Preferably, the total concentration of the compounds of formula I-3, more preferably of the formula I-3c, in the media is in the range from 10% to 45% or less, more preferably from 15% or more to 35% or less, even more preferably from 20% or more to 33% or less and, most preferably from 25% or more to 30% or less.

The liquid-crystalline media in accordance with the present invention preferably have a clearing point of 90° C. or more, more preferably 100° C. or more, even more preferably 120° C. or more, still more preferably 150° C. or more, and particularly preferably 170° C. or more.

The nematic phase of the media in accordance with the invention preferably extends at least from 20° C. or less to 90° C. or more. It is more preferred that the phase extends up to 100° C. or more, more preferably from at least from 0° C. or less to 120° C. or more or even more preferably from at least from −10° C. or less to 140° C. or more, in particular from at least from −20° C. or less to 150° C. or more.

The $\Delta\varepsilon$ of the liquid-crystalline medium in accordance with the invention, at 1 kHz and 20° C., is preferably 1 or more, more preferably 2 or more and particularly preferably 3 or more.

The $\Delta n$ of the liquid-crystalline media in accordance with the present invention, at 589 nm ($Na^D$) and 20° C., is preferably in the range from 0.200 or more to 0.90 or less, more preferably in the range from 0.250 or more to 0.90 or less, even more preferably in the range from 0.300 or more to 0.85 or less, and particularly preferably in the range from 0.350 or more to 0.800 or less.

In a preferred embodiment of the present invention, the $\Delta n$ of the liquid-crystalline media in accordance with the present invention is preferably 0.50 or more, more preferably 0.55 or more.

In accordance with the present invention, the individual compounds of formula I are preferably used in a total concentration of 10% to 70%, more preferably 20% to 60%, even more preferably 30% to 50% and particularly preferably 25% to 45% of the mixture as a whole.

The compounds of formula II are preferably used in a total concentration of 1% to 20%, more preferably 1% to 15%, even more preferably 2% to 15%, and particularly preferably 3% to 10% of the mixture as a whole.

The compounds of formula III are preferably used in a total concentration of 1% to 60%, more preferably 5% to 50%, even more preferably 10% to 45%, and particularly preferably 15% to 40% of the mixture as a whole.

The liquid-crystalline media preferably comprise, more preferably predominantly consist of, and particularly preferably completely consist of in total 50% to 100%, more preferably 70% to 100% and particularly preferably 80% to 100%, and in particular 90% to 100% of the compounds of the formulae I, II and III.

In the present application, the expression dielectrically positive describes compounds or components where $\Delta\varepsilon>3.0$, dielectrically neutral describes those where $-1.5\leq\Delta\varepsilon\leq3.0$ and dielectrically negative describes those where $\Delta\varepsilon<-1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\| - \varepsilon_\perp)$, while $\varepsilon_{ave.}$ is $(\varepsilon_\| + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of $\Delta\varepsilon$ have a cell thickness of approximately 20 μm. The electrode is a circular ITO electrode having an area of 1.13 cm² and a guard ring. The orientation layers are SE-1211 from Nissan Chemicals, Japan, for homeotropic orientation ($\varepsilon_\|$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystalline media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) capillary. The capillary has an internal radius of 180 μm and an external radius of 350 μm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnets is set correspondingly and then rotated correspondingly through 90°.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

The liquid-crystalline media according to the invention preferably have nematic phases in preferred ranges given above. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 μm for at least 100 hours. At high temperatures, the clearing point is measured in capillaries by conventional methods.

Furthermore, the liquid-crystalline media according to the invention are preferably characterised by high optical anisotropy values in the visible range, especially at a wavelength of 589.0 nm (i.e. at the Na"D" line). The birefringence at 589 nm is preferably 0.20 or more, more preferably 0.25 or more, even more preferably 0.30 or more, still more preferably 0.40 or more, and particularly preferably 0.45 or more. In addition, the birefringence is preferably 0.80 or less.

The liquid crystals employed preferably have a positive dielectric anisotropy. This is preferably 2 or more, more preferably 4 or more, even more preferably 6 or more, and particularly preferably 10 or more.

Furthermore, the liquid-crystalline media according to the invention are preferably characterised by high anisotropy values in the microwave range. The birefringence at about 8.3 GHz is, for example, preferably 0.14 or more, more preferably 0.15 or more, even more preferably 0.20 or more, still more preferably 0.25 or more, and particularly preferably 0.30 or more. In addition, the birefringence is preferably 0.80 or less.

The dielectric anisotropy in the microwave range is defined as $$\Delta\varepsilon_r \equiv (\varepsilon_{r,\parallel} - \varepsilon_{r,\perp}).$$

The tuneability ($\tau$) is defined as $$\tau \equiv (\Delta\varepsilon_r / \varepsilon_{r,\parallel}).$$

The material quality ($\eta$) is defined as $$\eta \equiv (\tau / \tan \delta_{\varepsilon_r, max.}), \text{ where}$$

the maximum dielectric loss is $$\tan \delta_{\varepsilon_r, max.} \equiv \max.\{\tan \delta_{\varepsilon_r, \perp}; \tan \delta_{\varepsilon_r, \parallel}\}.$$

The material quality ($\eta$) of the preferred liquid-crystal materials is 6 or more, preferably 8 or more, more preferably 10 or more.

In the corresponding components, the preferred liquid-crystal materials have phase shifter qualities of 15°/dB or more, preferably 20°/dB or more, more preferably 30°/dB or more, even more preferably 40°/dB or more, even more preferably 50°/dB or more, still more particularly preferably 80°/dB or more, and particularly preferably 100°/dB or more.

In some embodiments, however, liquid crystals having a negative value of the dielectric anisotropy can also advantageously be used.

The liquid crystals employed are either individual substances or mixtures. They preferably have a nematic phase.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

Compounds containing a vinyl end group and compounds containing a methyl end group typically have low rotational viscosity.

In the present application, both high-frequency technology and hyper-frequency technology denote applications having frequencies in the range from 1 MHz to 1 THz, preferably from 1 GHz to 500 GHz, more preferably 2 GHz to 300 GHz, particularly preferably from about 5 GHz to 150 GHz.

The liquid-crystalline media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

Preferably the media according to the present invention comprise one or more chiral compounds as chiral dopants in order to adjust their cholesteric pitch. Their total concentration in the media according to the instant invention is preferably in the range 0.05% to 15%, more preferably from 1% to 10% and most preferably from 2% to 6%.

Optionally the media according to the present invention may comprise further liquid crystal compounds in order to adjust the physical properties. Such compounds are known to the expert. Their concentration in the media according to the instant invention is preferably 0% to 30%, more preferably 0.1% to 20% and most preferably 1% to 15%.

The response times are given as rise time ($\tau_{on}$) for the time for the change of the relative tuning, respectively of the relative contrast for the electo-optiocal response, from 0% to 90% ($t_{90}-t_0$), i.e. including the delay time ($t_{10}-t_0$), as decay time ($\tau_{off}$) for the time for the change of the relative tuning, respectively of the relative contrast for the electo-optiocal response, from 100% back to 10% ($t_{100}-t_{10}$) and as the total response time ($\tau_{total} = \tau_{on} + \tau_{off}$), respectively.

The liquid-crystalline media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called premixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.
TABLE A
| Ring elements | |
|---|---|
| C | 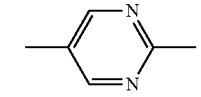 |
| D | 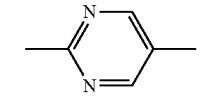 |
| Dl | 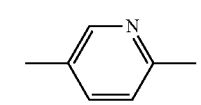 |
| A | 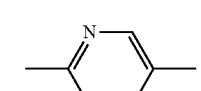 |
| Al | 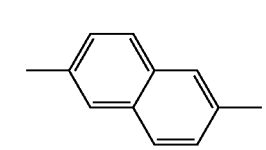 |
| P | 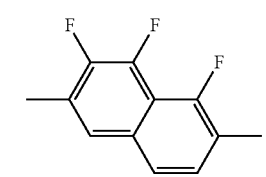 |
| G | 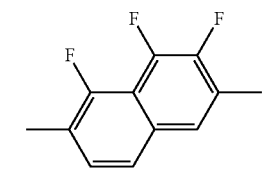 |
| Gl | 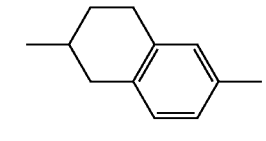 |
| U | 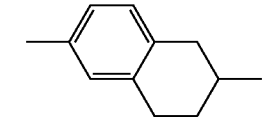 |
| Ul | 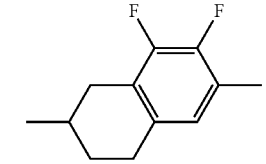 |
| Y | 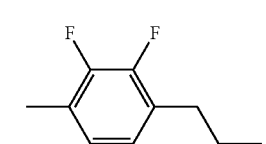 |
TABLE A-continued
| Ring elements | |
|---|---|
| M | |
| Ml | |
| N | |
| Nl | |
| Np | |
| N3f | |
| N3fl | |
| tH | |
| tHl | |
| tH2f | |
| tH2fl | |

TABLE A-continued
| Ring elements | |
|---|---|
| dH | 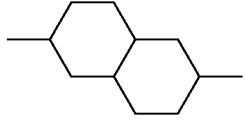 |
| K | 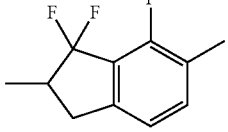 |
| Kl | 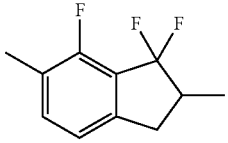 |
| L | 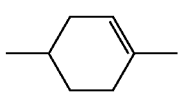 |
| Ll | 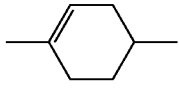 |
| F | 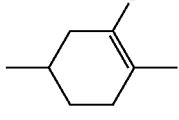 |
| Fl | 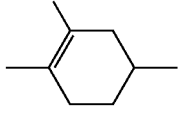 |
| P(o) | 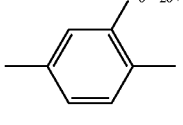 $C_oH_{2o+1}$ |
| Pl(o) | $C_oH_{2o+1}$ 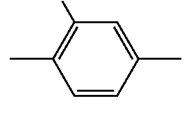 |
| P(i3) | 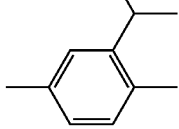 |
| Pl(ic3) | 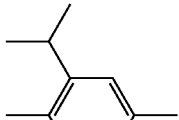 |
TABLE A-continued
| Ring elements | |
|---|---|
| P(t4) | 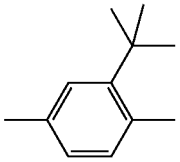 |
| Pl(t4) | 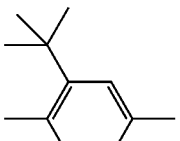 |
| P(c3) | 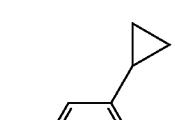 |
| Pl(c3) | 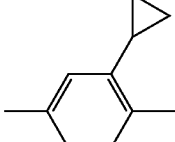 |
| P(c4) | 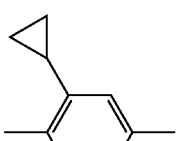 |
| Pl(c4) | 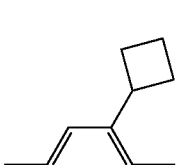 |
| P(c5) | 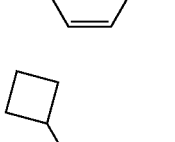 |
| Pl(c5) | 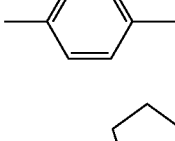 |

TABLE A-continued
| Ring elements | | | Ring elements | |
|---|---|---|---|---|
| P(e5) | 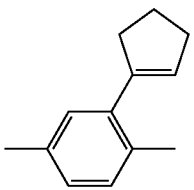 | | Gl(i3) | 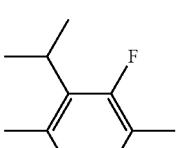 |
| Pl(e5) | 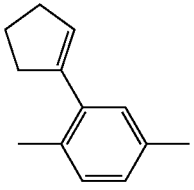 | | G(i3) | 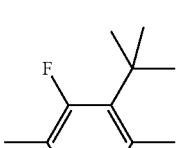 |
| P(c6) | 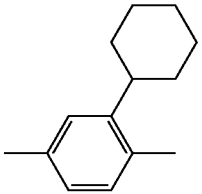 | | Gl(t4) | 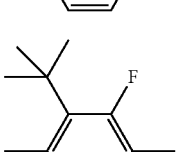 |
| Pl(c6) | 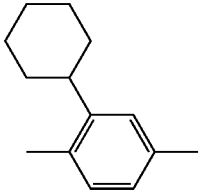 | | G(t4) | 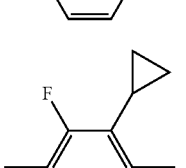 |
| P(e6) | 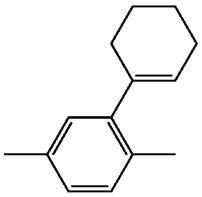 | | Gl(c3) | 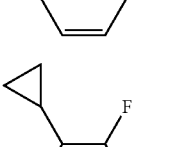 |
| Pl(e6) | 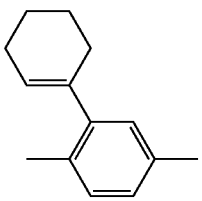 | | G(c3) | 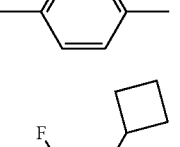 |
| Gl(o) | 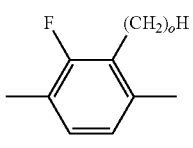 | | Gl(c4) | 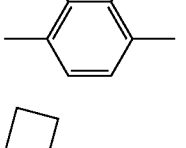 |
| | o ∈ {1;2;3;4;5;6} | | G(c4) | 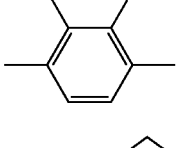 |
| G(o) | 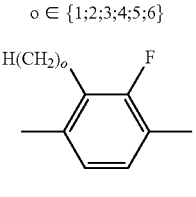 | | Gl(c5) | 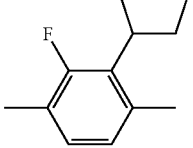 |
| | o ∈ {1;2;3;4;5;6} | | | |

TABLE A-continued

Ring elements

| Code | Structure |
|---|---|
| G(c5) | cyclopentyl-substituted fluoro-dimethylbenzene |
| Gl(e5) | cyclopentenyl-substituted fluoro-dimethylbenzene |
| G(e5) | cyclopentenyl-substituted fluoro-dimethylbenzene (isomer) |
| Gl(c6) | cyclohexyl-substituted fluoro-dimethylbenzene |
| G(c6) | cyclohexyl-substituted fluoro-dimethylbenzene (isomer) |
| Gl(e6) | cyclohexenyl-substituted fluoro-dimethylbenzene |
| G(e6) | cyclohexenyl-substituted fluoro-dimethylbenzene (isomer) |
| N(1,4) | 1,4-dimethylnaphthalene |

TABLE B

Linking groups

| | | | |
|---|---|---|---|
| E | —$CH_2CH_2$— | Z | —CO—O— |
| V | —CH=CH— | ZI | —O—CO— |
| X | —CF=CH— | O | —$CH_2$—O— |
| XI | —CH=CF— | OI | —O—$CH_2$— |
| B | —CF=CF— | Q | —$CF_2$—O— |
| T | —C≡C— | QI | —O—$CF_2$— |
| W | —$CF_2CF_2$— | | |

TABLE C

End groups

| Left-hand side | | Right-hand side Used alone | |
|---|---|---|---|
| —n— | $C_nH_{2n+1}$— | —n | —$C_nH_{2n+1}$ |
| —nO— | $C_nH_{2n+1}$—O— | —nO | —O—$C_nH_{2n+1}$ |
| —V— | $CH_2$=CH— | —V | —CH=$CH_2$ |
| —nV— | $C_nH_{2n+1}$—CH=CH— | —nV | —$C_nH_{2n}$—CH=$CH_2$ |
| —Vn— | $CH_2$=CH—$C_nH_{2n+1}$— | —Vn | —CH=CH—$C_nH_{2n+1}$ |
| —nVm— | $C_nH_{2n+1}$—CH=CH—$C_mH_{2m}$— | —nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | $CFH_2$— | —M | —$CFH_2$ |
| —D— | $CF_2H$— | —D | —$CF_2H$ |
| —T— | $CF_3$— | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —FXO— | $CF_2$=CH—O— | —OXF | —O—CH=$CF_2$ |
| —A— | H—C≡C— | —A | —C≡C—H |

TABLE C-continued

End groups

| Left-hand side | Right-hand side Used alone | | |
|---|---|---|---|
| —nA— | $C_nH_{2n+1}$—C≡C— | —An | —C≡C—$C_nH_{2n+1}$ |
| —NA— | N≡C—C≡C— | —AN | —C≡C—C≡N |
| | Used in combination with others | | |
| —...A...— | —C≡C— | —...A... | —C≡C— |
| —...V...— | —CH=CH— | —...V... | —CH=CH— |
| —...Z...— | —CO—O— | —...Z... | —CO—O— |
| —...ZI...— | —O—CO— | —...ZI... | —O—CO— |
| —...K...— | —CO— | —...K... | —CO— |
| —...W...— | —CF=CF— | —...W... | —CF=CF— | in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

The following illustrative structures are compounds, which are particularly preferably employed, having a terminal —NSC group:

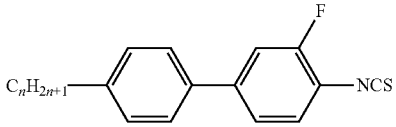

PG-n-S

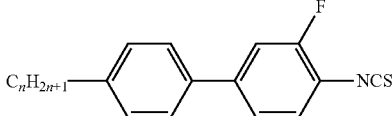

PU-n-S

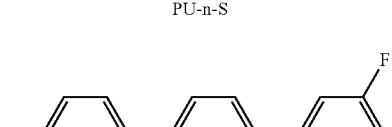

PPG-n-S

PGG-n-S

TABLE D-continued

Illustrative structures

The following illustrative structures are compounds, which are particularly preferably employed, having a terminal —NSC group:

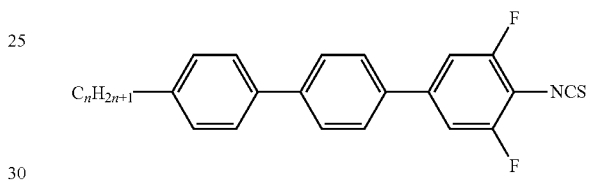

PPU-n-S

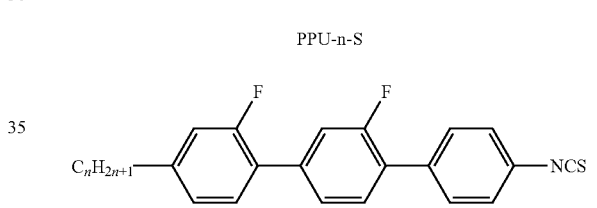

GGP-n-S

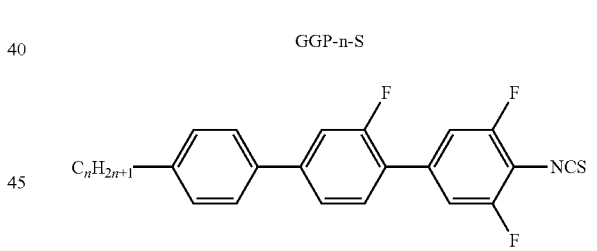

PGU-n-S

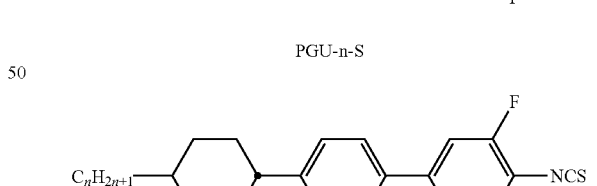

CPG-n-S

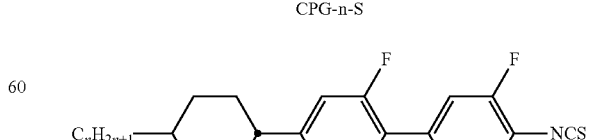

CGG-n-S

TABLE D-continued

Illustrative structures

The following illustrative structures are compounds, which are particularly preferably employed, having a terminal —NSC group:

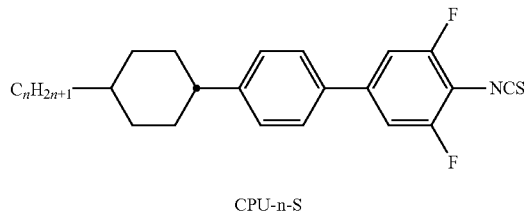

CPU-n-S

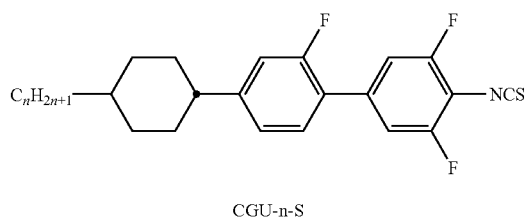

CGU-n-S

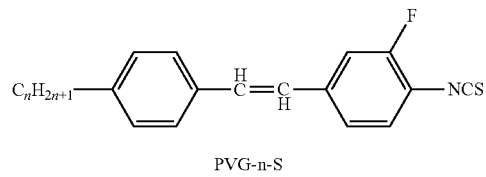

PVG-n-S

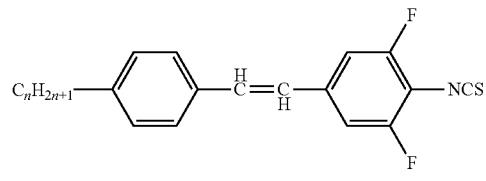

PVU-n-S

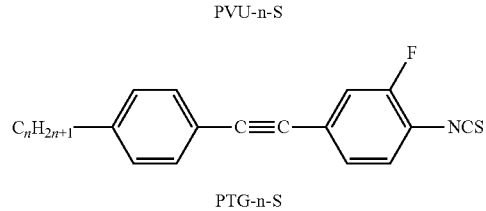

PTG-n-S

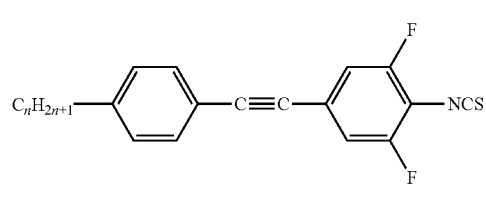

PTU-n-S

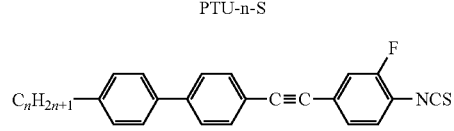

PPTG-n-S

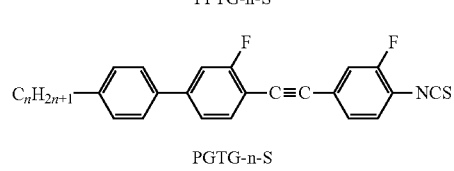

PGTG-n-S

TABLE D-continued

Illustrative structures

The following illustrative structures are compounds, which are particularly preferably employed, having a terminal —NSC group:

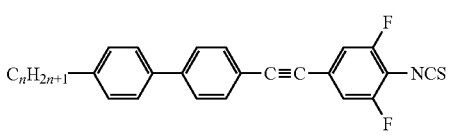

PPTU-n-S

The following illustrative structures are compounds, which are preferably additionally used in the media:

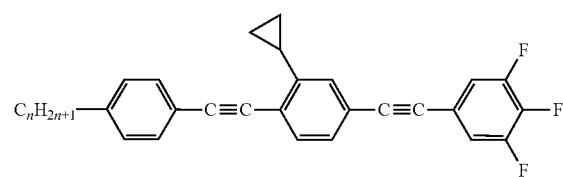

PTPI(c3)TU-n-F

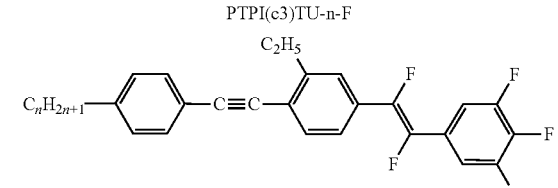

PTPI(2)WU-n-F

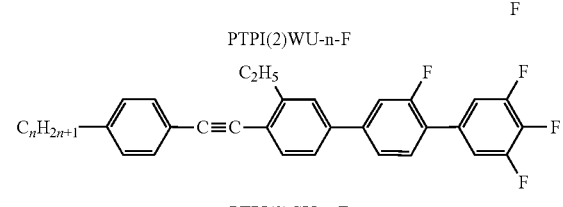

PTPI(2)GU-n-F

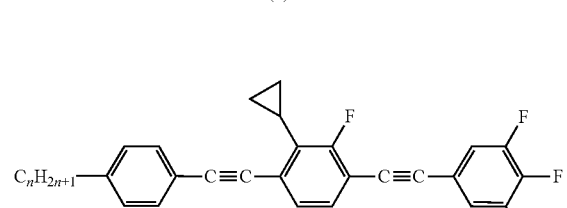

PTG(c3)TU-n-F

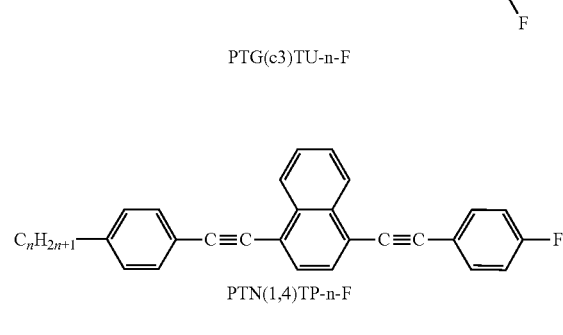

PTN(1,4)TP-n-F

The following illustrative structures are auxiliary compounds, which are optionally employed, having three 6-membered rings:

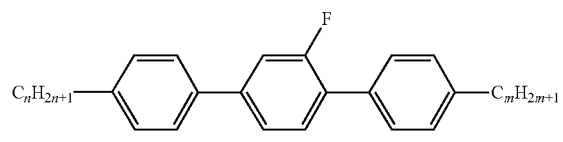

PGP-n-m

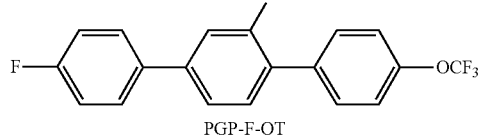

PGP-F-OT

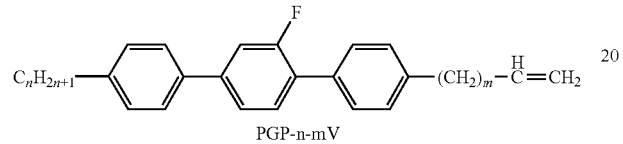

PGP-n-mV

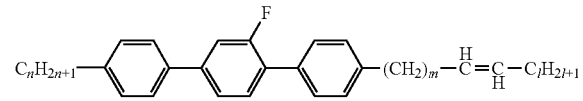

PGP-n-mVI

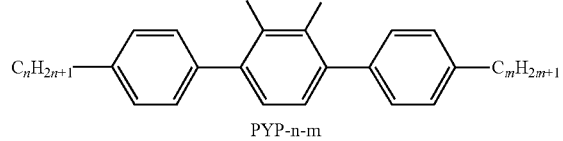

PYP-n-m

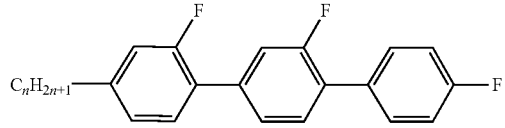

GGP-n-F

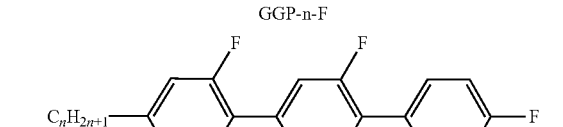

GGP-n-Cl

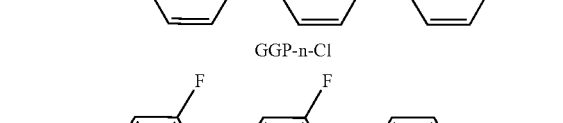

GGP-n-m

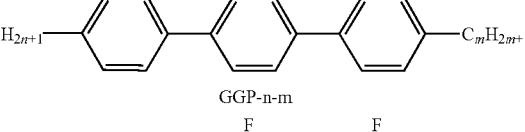

PGIGI-n-F

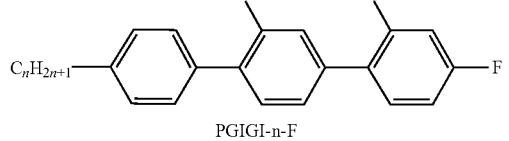

PGIGI-n-CL

-continued

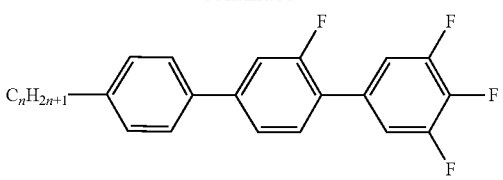

PGU-n-F

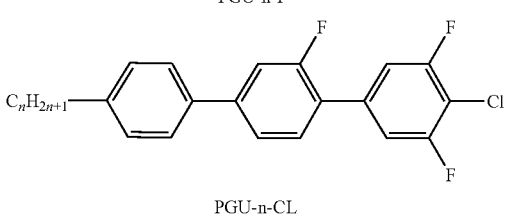

PGU-n-CL

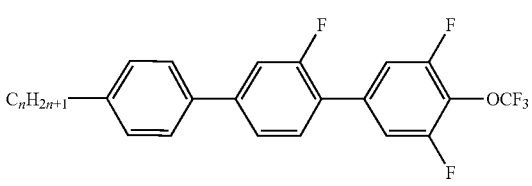

PGU-n-OT

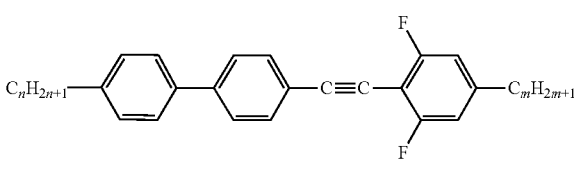

PPTUI-n-m

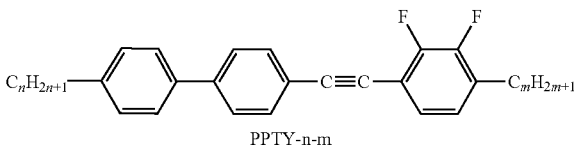

PPTY-n-m

The following illustrative structures are auxiliary compounds, which are optionally employed, having four 6-membered rings:

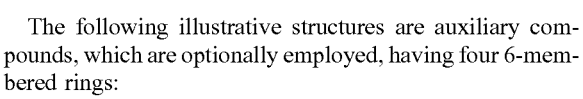

PGGP-n-m

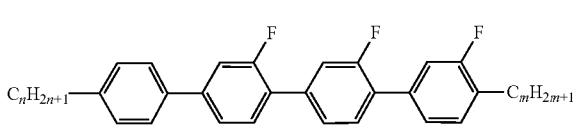

PGIGP-n-m

PGIGP-n-Om

PGIGP-nO-m

-continued
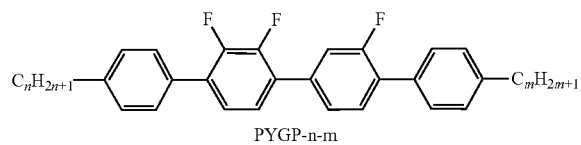
PYGP-n-m
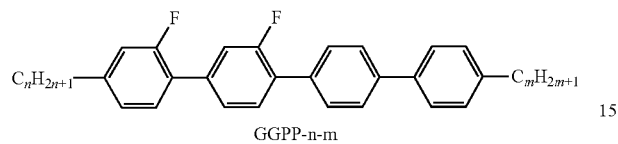
GGPP-n-m
-continued
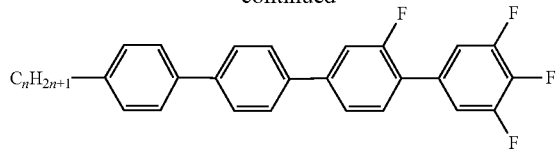
PPGU-n-F
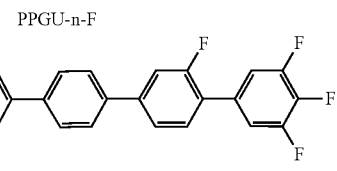
PPGU-Vn-F
Illustrative structures of dielectrically neutral compounds which may additionally be employed:
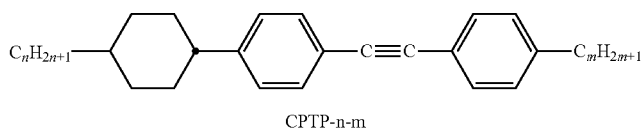
CPTP-n-m
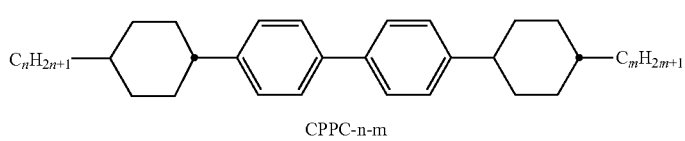
CPPC-n-m
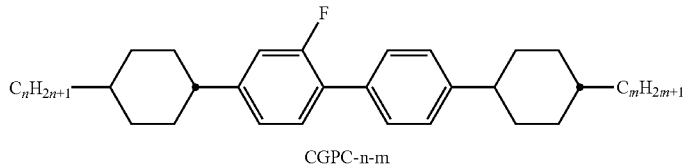
CGPC-n-m
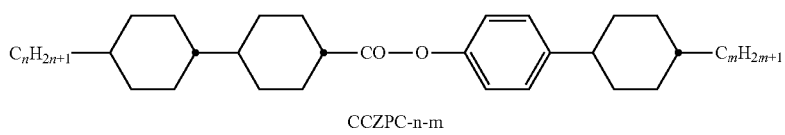
CCZPC-n-m
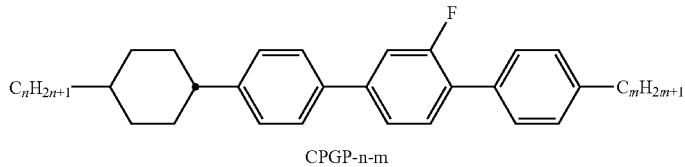
CPGP-n-m
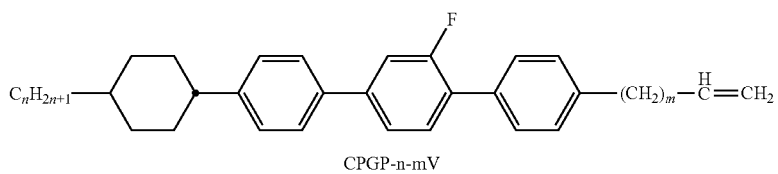
CPGP-n-mV
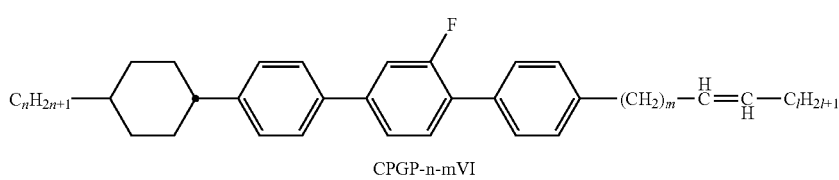
CPGP-n-mVI Illustrative structures of further compounds which may additionally be employed:
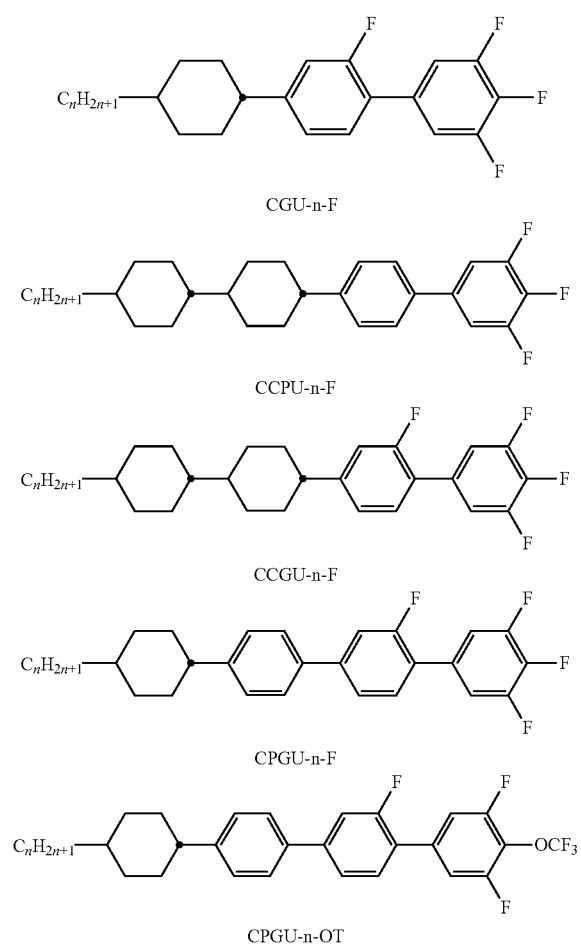
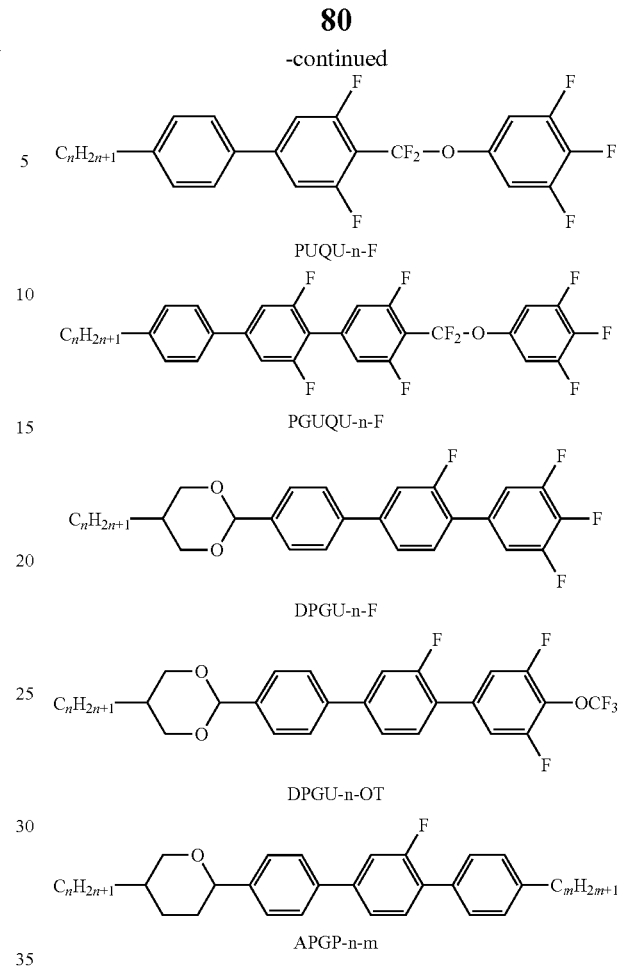
The following table, Table E, shows illustrative compounds, which can be and preferably are used as dichroic dyes in the mesogenic media in accordance with the present invention.
TABLE E
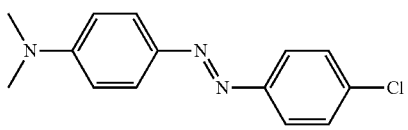 [SMILES: CN(C)c1ccc(/N=N/c2ccc(Cl)cc2)cc1]
AZO-1
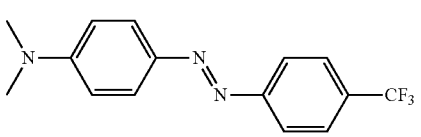 [SMILES: CN(C)c1ccc(/N=N/c2ccc(C(F)(F)F)cc2)cc1]
AZO-2
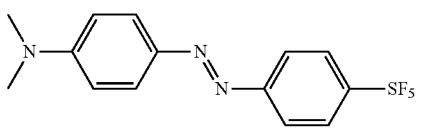
AZO-3

TABLE E-continued

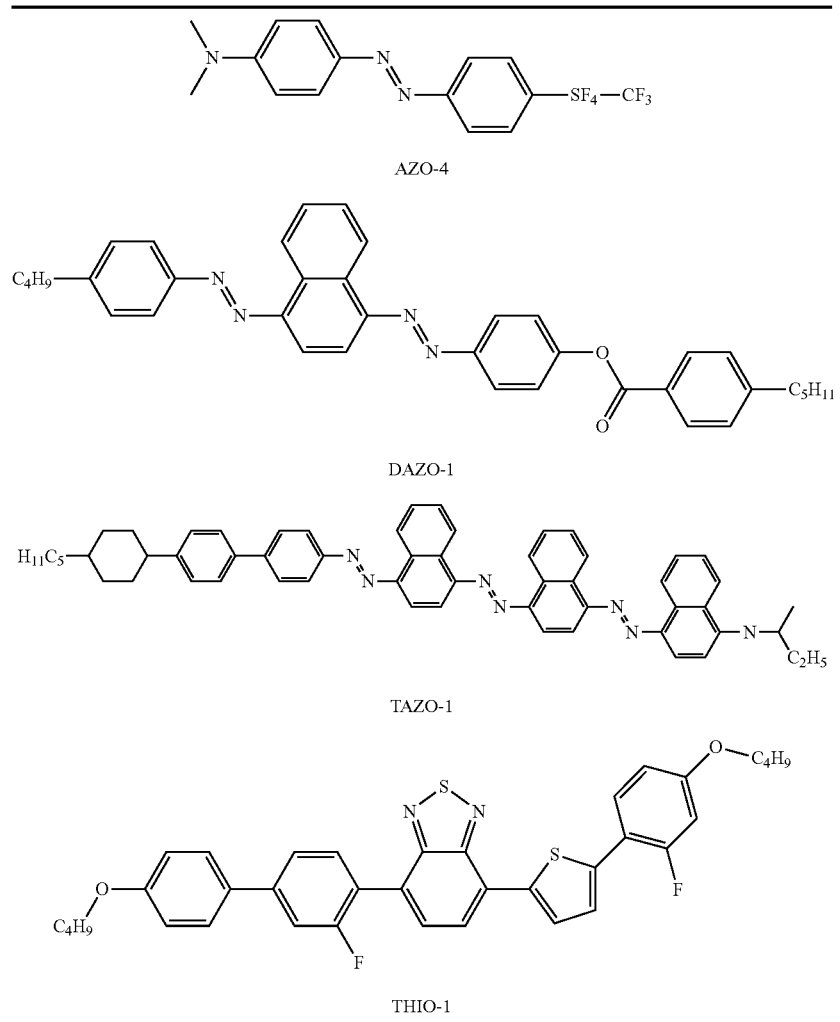

The mesogenic media in accordance with the present invention preferably comprise one, more preferably two, even more preferably three or more, compounds selected from the group consisting of the compounds from Table E. The one or more dichroic dyes are preferably used in a concentration in the range from 0.1% or more to 15% or less, more preferably from 0.5% or more to 10% or less, and most preferably from 1.0% or more to 8% or less.

The following table, Table F, shows illustrative compounds which can be used as stabiliser in the mesogenic media in accordance with the present invention. The total concentration of these and similar compounds in the media is preferably 5% or less.

TABLE F

TABLE F-continued

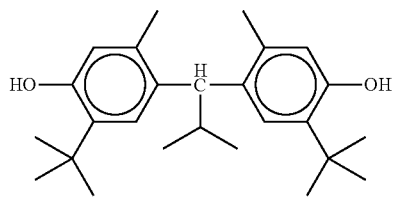

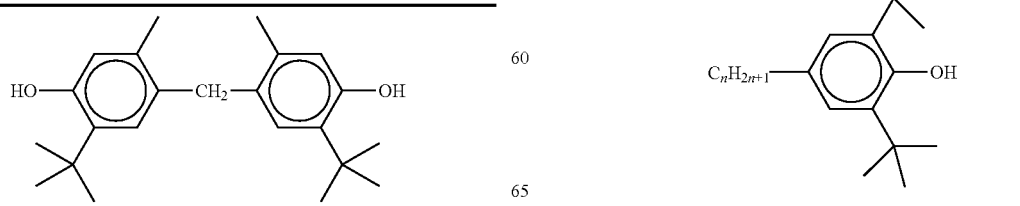

TABLE F-continued
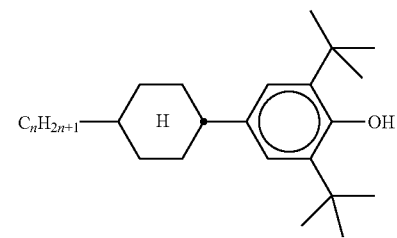
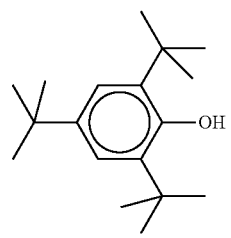
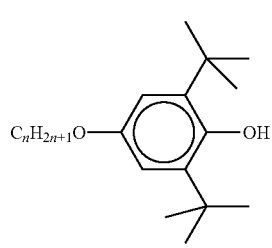
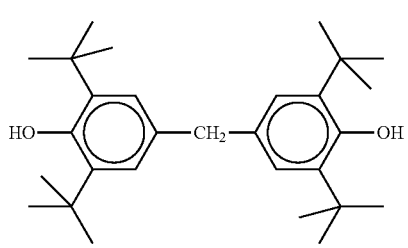
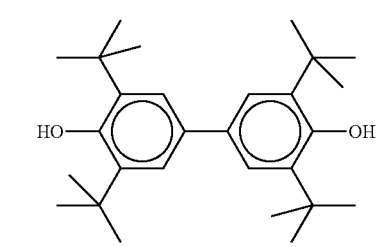
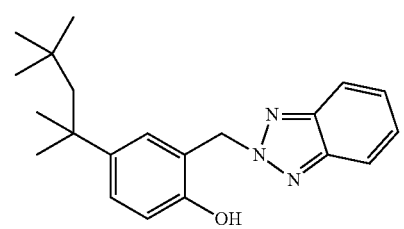 [SMILES: CC(C)(C)CC(C)(C)c1ccc(O)c(Cn2nc3ccccc3n2)c1]
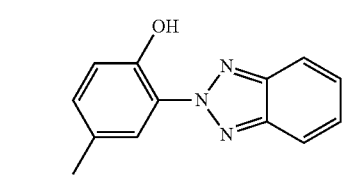 [SMILES: Cc1ccc(O)c(-n2nc3ccccc3n2)c1]
TABLE F-continued
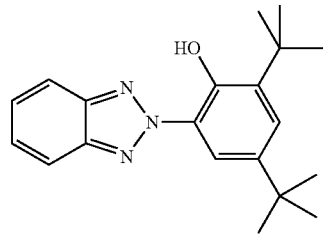 [SMILES: CC(C)(C)c1cc(-n2nc3ccccc3n2)c(O)c(C(C)(C)C)c1]
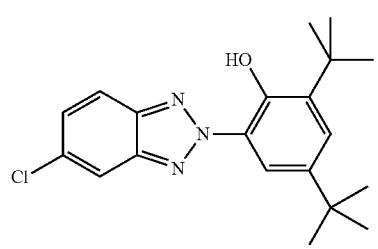 [SMILES: CC(C)(C)c1cc(-n2nc3ccc(Cl)cc3n2)c(O)c(C(C)(C)C)c1]
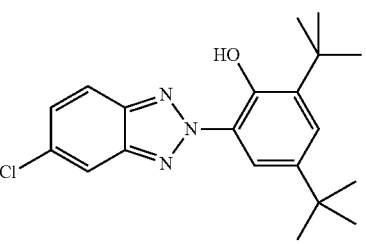
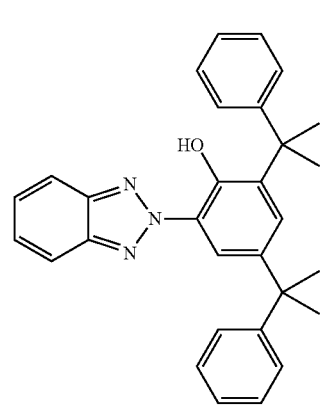 [SMILES: CC(C)(c1ccccc1)c1cc(-n2nc3ccccc3n2)c(O)c(C(C)(C)c2ccccc2)c1]
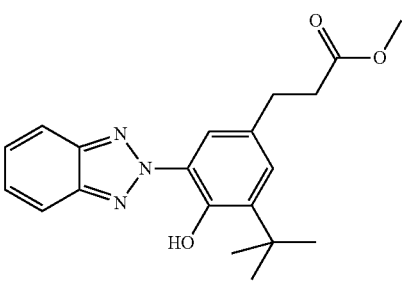 [SMILES: COC(=O)CCc1cc(-n2nc3ccccc3n2)c(O)c(C(C)(C)C)c1]
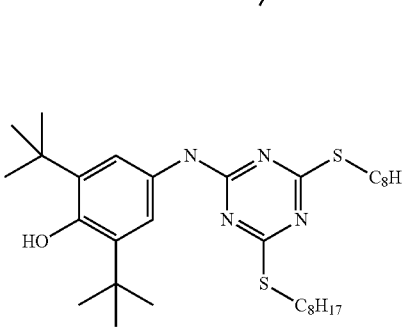

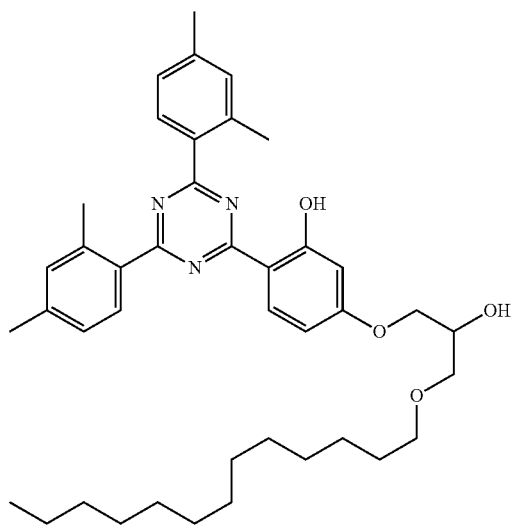 [SMILES: CCCCCCCCCCCCCOCC(O)COc1ccc(-c2nc(-c3ccc(C)cc3C)nc(-c3ccc(C)cc3C)n2)c(O)c1]
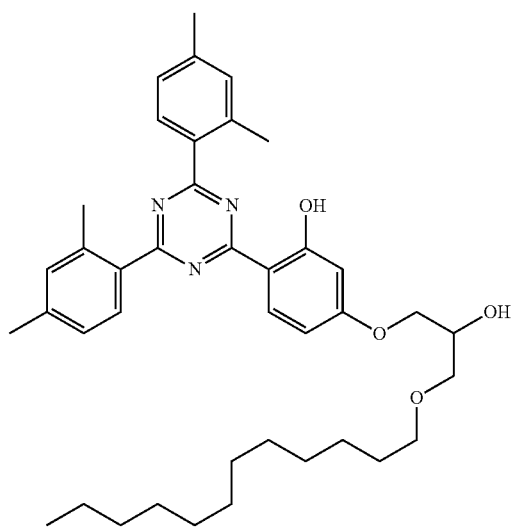 [SMILES: CCCCCCCCCCCCOCC(O)COc1ccc(-c2nc(-c3ccc(C)cc3C)nc(-c3ccc(C)cc3C)n2)c(O)c1]
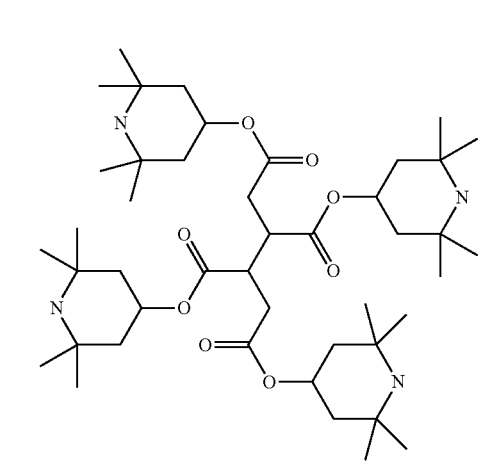
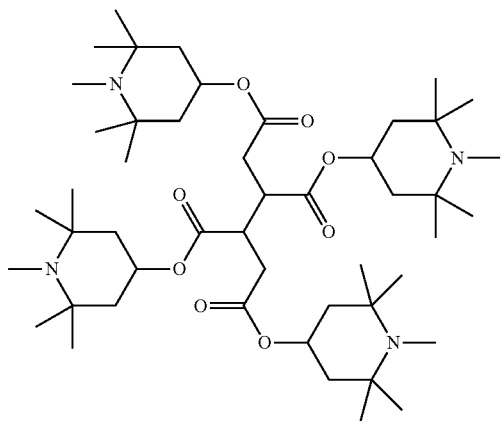
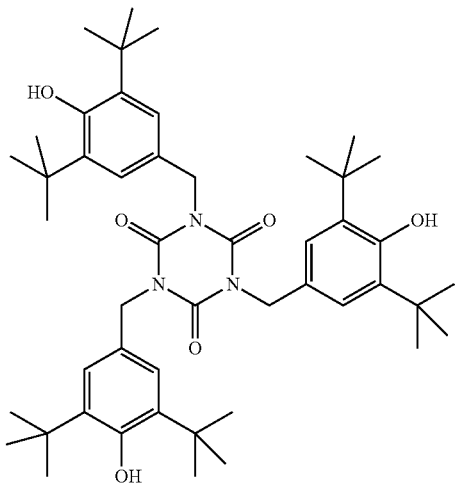 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
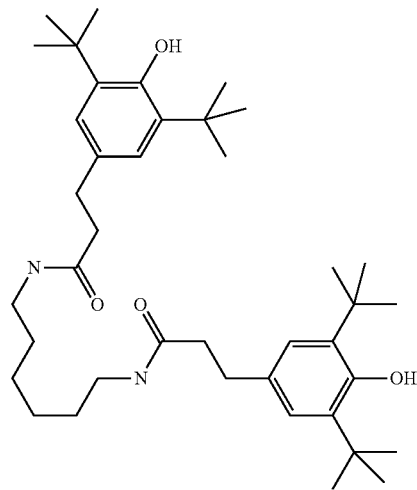 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE F-continued

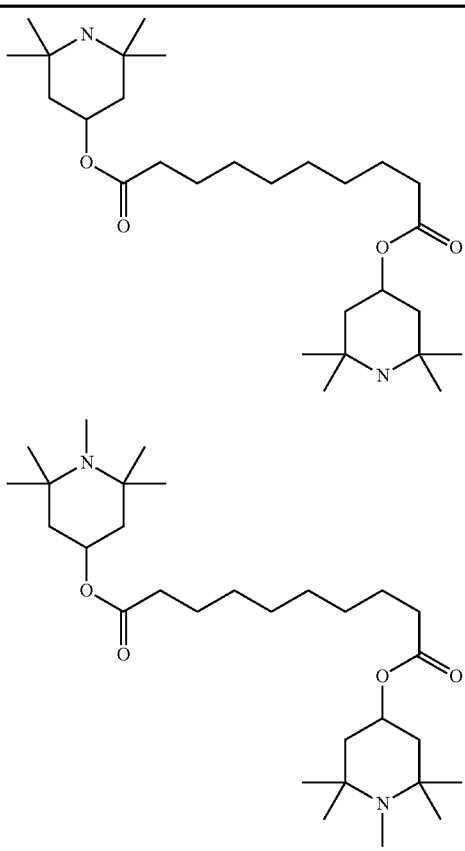

TABLE F-continued

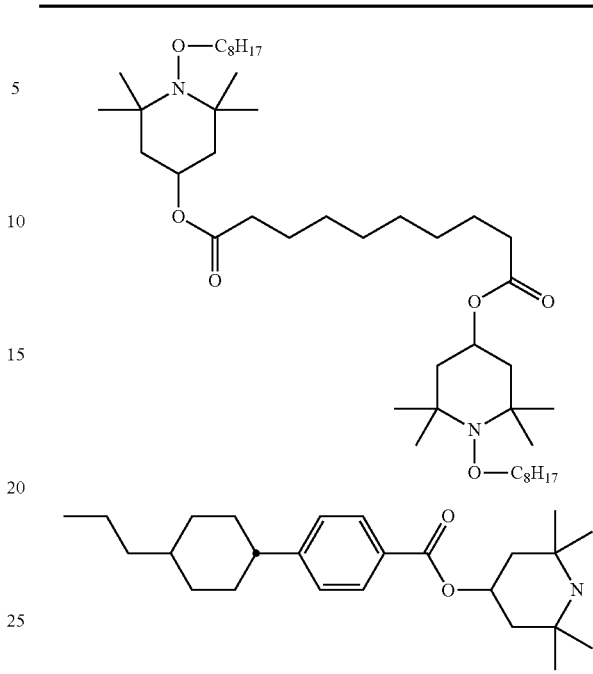

In a preferred embodiment of the present invention, the mesogenic media comprise one or more compounds selected from the group of the compounds from Table F.

The following table, Table G, shows illustrative compounds which can preferably be used as chiral dopants in the mesogenic media in accordance with the present invention.

TABLE G

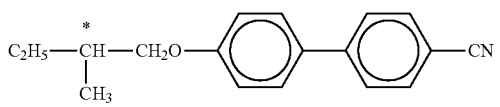

C 15

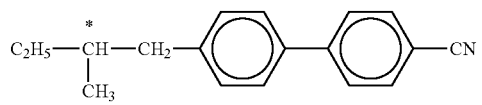

CB 15

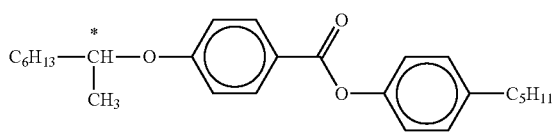

CM 21

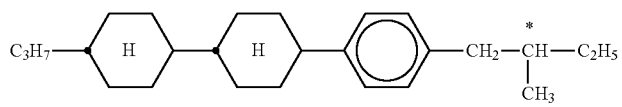

CM 44

TABLE G-continued
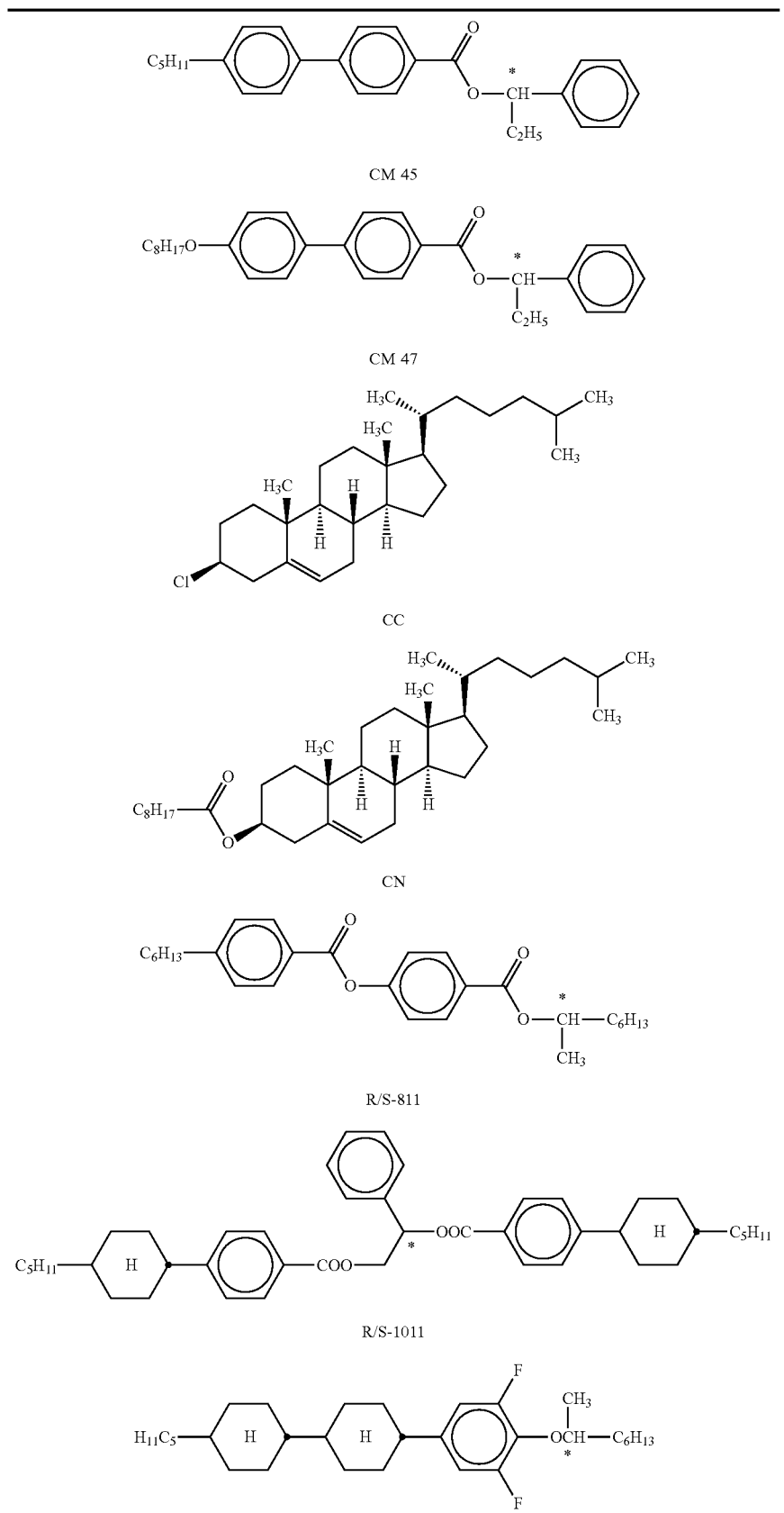
CM 45
CM 47
CC
CN
R/S-811
R/S-1011
R/S-2011

TABLE G-continued

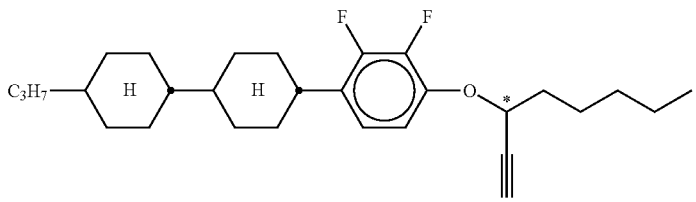

R/S-3011

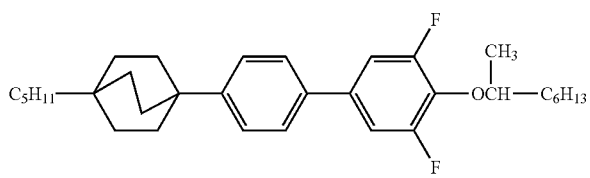

R/S-4011

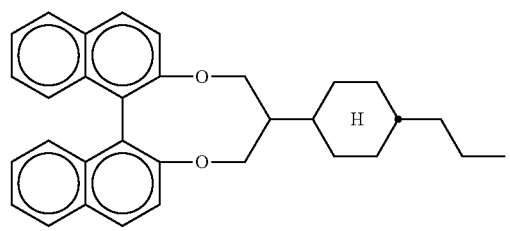

R/S-5011

In a preferred embodiment of the present invention, the mesogenic media comprise one or more compounds selected from the group of the compounds from Table G.

The mesogenic media in accordance with the present application preferably comprise two or more, preferably four or more, compounds selected from the group consisting of the compounds from the above tables.

The liquid-crystalline media in accordance with the present invention preferably comprise seven or more, preferably eight or more, compounds, preferably compounds having three or more, preferably four or more, different formulae, selected from the group of the compounds from Table D.

The following examples are merely illustrative of the present invention and they should not be considered as limiting the scope of the invention in any way. The examples and modifications or other equivalents thereof will become apparent to those skilled in the art in the light of the present disclosure.

EXAMPLES

Example 1

Base Mixture

A liquid-crystal mixture B-1 having the composition and properties as indicated in the following table is prepared and characterized with respect to its general physical properties and its applicability in microwave components at 19 GHz.

| Composition | | | | | |
|---|---|---|---|---|---|
| Compound No. | Abbreviation | Conc./mass-% | Physical Properties | | |
| 1 | PU-3-S | 18.0 | T(N, I)/° C. | = | 93 |
| 2 | PVG-4-S | 13.0 | $n_o$(20° C., 589.3 nm) | = | t.b.d. |
| 3 | PVG-5-S | 13.0 | $\Delta n$(20° C., 589.3 nm) | = | t.b.d. |
| 4 | PTU-3-S | 8.0 | $\varepsilon_\parallel$(20° C., 1 kHz) | = | 27.7 |
| 5 | PTU-5-S | 8.0 | $\varepsilon_\perp$(20° C., 1 kHz) | = | 5.0 |
| 6 | PGU-3-S | 20.0 | $\gamma_1$ (20° C.)/mPa · s | = | 225 |
| 7 | PPTU-4-S | 10.0 | tan $\delta_{\varepsilon\ r,\perp}$ (20° C., 19 GHz) | = | 0.0148 |
| 8 | PPTU-5-S | 10.0 | tan $\delta_{\varepsilon\ r,\parallel}$ (20° C., 19 GHz) | = | 0.0082 |
| Σ | | 100.0 | τ (20° C., 19 GHz) | = | 0.326 |
| | | | η (20° C., 19 GHz) | = | 22.0 |

Remark: t.b.d.: to be determined.

$k_{11}$=15.0 pN; $k_{33}$=15.4 V; $V_{10}$=0.86 V

This mixture is suitable for applications in the microwave range, in particular for phase shifters or LC based antenna elements in the micro wave (MW) region, and suitable response times.

Examples 1.1 to 1.3

The mixture B-1 is divided into three parts. To each one of these three parts a certain concentration of the dichroic dye TAZO-1, as shown in table E above, is added to obtain the mixtures M-1.1, M-1.2 and M-1.3.

To these three parts alternatively 1.0%, 3.0% and 5.0%, respectively, of TAZO-1 are added.

TABLE 1

Compositions of investigated mixtures

| Material | B-1 | TAZO-1 |
|---|---|---|
| Example Number | Mixture Composition Concentration/mass-% | |
| B-1 | 100.0 | 0.0 |
| M-1.1 | 99.0 | 1.0 |
| M-1.2 | 97.0 | 3.0 |
| M-1.3 | 95.0 | 5.0 |

The three resultant mixtures M-1.1 to M-1.3 each are filled into test cells with antiparallel rubbed glass substrates covered by PI AI3046. The test cells have a cell gap of 50 µm. The mixtures are investigated with respect to their general physical properties and to their performance in the microwave regime.

Example 2

To the mixture B-1 is added the dichroic dye AZO-1, as shown in table E above, in a concentration of 3.0%.

The resultant mixture M-2 is investigated with respect to its performance in microwave applications.

Example 3

To the mixture B-1 is added the dichroic dye AZO-2, as shown in table E above, in a concentration of 3.0%.

The resultant mixture M-3 is investigated with respect to its performance in microwave applications.

Example 4

To the mixture B-1 is added the dichroic dye AZO-3, as shown in table E above, in a concentration of 3.0%.

The resultant mixture M-4 is investigated with respect to its performance in microwave applications.

Example 5

To the mixture B-1 is added the dichroic dye THIO-1 (Merck KGaA, Darmstadt, Germany), as shown in table E above, in a concentration of 3.0%.

The resultant mixture M-5 is investigated with respect to its performance in microwave applications.

The following table shows a comparison for the microwave characteristics for mixtures B-1 and M-1.2, M-2, M-3, M-4 and M-5, wherein the latter mixtures each contain 3% of the respective dye as described above.

TABLE 2

Comparison of the microwave characteristics measure at 19 GHz

| Mixture | τ (20° C., 19 GHz) | tan $\delta_{\epsilon\, r,\perp}$ (20° C., 19 GHz) | η (20° C., 19 GHz) |
|---|---|---|---|
| B-1 | 0.326 | 0.0148 | 22.0 |
| M-1.2 | 0.335 | 0.0138 | 24.3 |
| M-2 | 0.331 | 0.0149 | 22.2 |
| M-3 | 0.331 | 0.0150 | 22.1 |
| M-4 | 0.325 | 0.0149 | 21.8 |
| M-5 | 0.327 | 0.0145 | 22.6 |

Surprisingly, it is found that the provision of the respective dichroic dyes can provide benefits in terms of increased tunability. At the same time the dielectric loss is kept at least at a comparable level or is even improved, such that the figure of merit η is at least comparable or even significantly improved. An increasing amount of dichroic dye can further improve the advantageous effects.

For comparison and as reference, the well known compound 4'-pentyl-4-cyanobiphenyl (also called 5CB or K15, Merck KGaA) gives tan $\delta_{\epsilon r,\perp}$=0.026 and η=4.3 at 20° C.

The following mixtures are also suitable for applications in the microwave range, in particular for phase shifters or LC based antenna elements in the MW region.

Example 6

Base Mixture

A liquid-crystal mixture B-6 having the composition and properties as indicated in the following table is prepared and characterized with respect to its general physical properties and its applicability in microwave components at 19 GHz.

| Compound No. | Abbreviation | Conc./ mass-% | Physical Properties | | |
|---|---|---|---|---|---|
| | Composition | | | | |
| 1 | PVG-3-S | 6.0 | T(N, I)/° C. | = | 112 |
| 2 | PVG-4-S | 16.0 | $n_o$(20° C., 589.3 nm) | = | 1.5454 |
| 3 | PVG-5-S | 6.0 | Δn(20° C., 589.3 nm) | = | t.b.d. |
| 4 | PTG-3-S | 10.0 | $\epsilon_{\parallel}$(20° C., 1 kHz) | = | 25.7 |
| 5 | PTG-5-S | 14.0 | $\epsilon_{\perp}$(20° C., 1 kHz) | = | 4.4 |
| 6 | PTU-3-S | 8.0 | $\gamma_1$ (20° C.)/mPa · s | = | 270 |
| 7 | PPTU-4-S | 8.0 | tan $\delta_{\epsilon\, r,\perp}$ (20° C., 19 GHz) | = | 0.0143 |
| 8 | PPTU-5-S | 16.0 | tan $\delta_{\epsilon\, r,\parallel}$ (20° C., 19 GHz) | = | 0.0038 |
| Σ | | 100.0 | τ (20° C., 19 GHz) | = | 0.252 |
| | | | η (20° C., 19 GHz) | = | 17.6 |

Remark: t.b.d.: to be determined.

The mixture B-6 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 7

Base Mixture

A liquid-crystal mixture B-7 having the composition and properties as indicated in the following table is prepared and characterized with respect to its general physical properties and its applicability in microwave components at 19 GHz.

| Compound No. | Abbreviation | Conc./ mass-% | Physical Properties | | |
|---|---|---|---|---|---|
| | Composition | | | | |
| 1 | PU-3-S | 16.0 | T(N, I)/° C. | = | 100 |
| 2 | PVG-4-S | 13.0 | $n_o$(20° C., 589.3 nm) | = | t.b.d. |
| 3 | PVG-5-S | 13.0 | Δn(20° C., 589.3 nm) | = | t.b.d. |
| 4 | PTU-3-S | 7.0 | $\epsilon_{\parallel}$(20° C., 1 kHz) | = | 28.2 |
| 5 | PTU-5-S | 7.0 | $\epsilon_{\perp}$(20° C., 1 kHz) | = | 5.0 |
| 6 | PGU-3-S | 24.0 | $\gamma_1$ (20° C.)/mPa · s | = | 245 |

-continued

| Composition | | | | |
|---|---|---|---|---|
| Compound No. | Abbreviation | Conc./ mass-% | Physical Properties | |
| 7 | PPTU-4-S | 10.0 | $\tan \delta_{\epsilon\, r,\perp}$ (20° C., 19 GHz) = | t.b.d. |
| 8 | PPTU-5-S | 10.0 | $\tan \delta_{\epsilon\, r,\parallel}$ (20° C., 19 GHz) = | t.b.d. |
| Σ | | 100.0 | τ (20° C., 19 GHz) = | t.b.d. |
| | | | η (20° C., 19 GHz) = | t.b.d. |

Remark: t.b.d.: to be determined.

$k_{11}$=15.8 pN; $k_{33}$=15.1 V; $V_{10}$=0.87 V

The mixture B-7 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 8

A liquid-crystal mixture B-8 having the composition and properties as indicated in the following table is prepared.

| Composition | | | | | |
|---|---|---|---|---|---|
| Compound No. | Abbreviation | Conc./ mass-% | Physical Properties | | |
| 1 | GGP-3-S | 8.0 | T(N, I)/° C. | = | 98 |
| 2 | PGG-3-S | 12.0 | $n_e$ (20° C., 589.3 nm) | = | t.b.d. |
| 3 | PGU-3-S | 12.0 | Δn (20° C., 589.3 nm) | = | t.b.d. |
| 4 | PVG-3-S | 6.0 | $\epsilon_{\parallel}$ (20° C., 1 kHz) | = | 26.7 |
| 5 | PVG-4-S | 18.0 | $\epsilon_{\perp}$ (20° C., 1 kHz) | = | 5.1 |
| 6 | PTG-3-S | 10.0 | $k_{11}$ (20° C.)/pN | | 17.7 |
| 7 | PTG-5-S | 18.0 | $k_{33}$ (20° C.)pN | | 15.7 |
| 8 | PTU-3-S | 10.0 | $V_0$ (20° C.)/V | | 0.96 |
| 9 | PPTU-4-S | 6.0 | $\gamma_1$ (20° C.)/mPa·s | = | 698 |
| Σ | | 100.0 | $\tan\delta_{\epsilon r,max}$(20° C., 19 GHz) | = | 0.0189 |
| | | | τ (20° C., 19 GHz) | = | 0.336 |
| | | | η (20° C., 19 GHz) | = | 17.9 |

Remark: t.b.d.: to be determined.

The mixture B-8 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Examples 9 to 13

Base Mixtures

To the liquid crystalline medium B-8 of Example 8 alternatively a certain concentration of a further single compound, one each, is added and the resultant base mixtures (B-9 to B-13) are investigated for their general physical properties and for their performance in the microwave regime.

| Composition | | | | |
|---|---|---|---|---|
| Example No. | Mixture No. | Compound Abbreviation | c(Comp.) /% | c(M-4) /% |
| 8 | B-8 | None | 0.0 | 100.0 |
| 9 | B-9 | PTPI(c3)TU-4-F | 5.0 | 95.0 |
| 10 | B-10 | PTPI(2)WU-6-F | 10.0 | 90.0 |
| 11 | B-11 | PTPI(2)GU-4-F | 10.0 | 90.0 |
| 12 | B-12 | PTG(c3)TU-4-F | 5.0 | 95.0 |
| 13 | B-13 | PTN(1,4)TP-3-F | 5.0 | 95.0 |

| Physical Properties I, General I (20° C. except T(N,I)) | | | | | |
|---|---|---|---|---|---|
| Example No. | Mixture No. | T(N, I)/ ° C. | Δn | $\epsilon_{\parallel}$ | Δε |
| 8 | B-8 | 98 | t.b.d. | 26.7 | 21.5 |
| 9 | B-9 | 98 | t.b.d. | 26.1 | 20.9 |
| 10 | B-10 | 90 | t.b.d. | 26.0 | 21.0 |
| 11 | B-11 | 102 | t.b.d. | 27.0 | 21.9 |
| 12 | B-12 | 93.9 | t.b.d. | 27.0 | 21.8 |
| 13 | B-13 | 99.5 | t.b.d. | 25.9 | 20.9 |

Remark: t.b.d.: to be determined.

| Physical Properties II, General II (20° C.) | | | | | |
|---|---|---|---|---|---|
| Example No. | Mixture No. | $\gamma_1$ | $k_{11}$/pN | $k_{33}$/pN | $V_0$/V |
| 8 | B-8 | 241 | 17.7 | 15.7 | 0.96 |
| 9 | B-9 | 254 | 15.1 | 14.6 | 0.90 |
| 10 | B-10 | 272 | 15.8 | 15.8 | 0.91 |
| 11 | B-11 | 319 | 16.0 | 16.9 | 0.90 |
| 12 | B-12 | 257 | 15.8 | 15.0 | 0.90 |
| 13 | B-13 | 273 | 18.2 | 15.9 | 0.99 |

| Physical Properties III, Microwave I (20° C., 19 GHz) | | | | | |
|---|---|---|---|---|---|
| Example No. | Mixture No. | $\epsilon_{r,\perp}$ | $\epsilon_{r,\parallel}$ | $\tan\delta_{\epsilon\, r,\parallel}$ | $\tan\delta_{\epsilon\, r,\perp}$ |
| 8 | B-8 | 3.74 | 2.49 | 0.0189 | 0.0091 |
| 9 | B-9 | 3.68 | 2.48 | 0.0177 | 0.0088 |
| 10 | B-10 | 3.67 | 2.49 | 0.0174 | 0.0084 |
| 11 | B-11 | 3.68 | 2.48 | 0.0170 | 0.0082 |
| 12 | B-12 | 3.70 | 2.49 | 0.0180 | 0.0088 |
| 13 | B-13 | 3.73 | 2.49 | 0.0175 | 0.0085 |

| Physical Properties IV, Microwave II (20° C., 19 GHz) | | | | |
|---|---|---|---|---|
| Example No. | Mixture No. | $\tan\delta_{\epsilon\, r,\perp}$ | $\tau_{\epsilon\, r}$ | η |
| 8 | B-8 | 0.0189 | 0.336 | 17.8 |
| 9 | B-9 | 0.0177 | 0.326 | 18.4 |
| 10 | B-10 | 0.0174 | 0.323 | 18.6 |
| 11 | B-11 | 0.0170 | 0.327 | 19.3 |
| 12 | B-12 | 0.0180 | 0.327 | 18.1 |
| 13 | B-13 | 0.0175 | 0.332 | 19.0 |

The mixtures B-9 to B-13 are respectively divided into seven parts. Respectively, to three of these seven parts is added respectively the dichroic dye TAZO-1, as shown in table E above, in a concentration of 1.0%, 3.0% and 5.0%.

To the other four parts is added respectively, AZO-1, AZO-2, AZO-3 or THIO-1, as shown in table E above, respectively in a concentration of 3.0%.

The resultant mixtures comprising the respective dichroic compounds in the respective concentrations show similarly improved properties as Examples 1.1-1.3 and Examples 2-5, in particular with regard to tunability and figure of merit.

Example 14

Base Mixture

A liquid-crystal mixture B-14 having the composition and properties as indicated in the following table is prepared and characterized with respect to its general physical properties and its applicability in microwave components at 19 GHz.

| Composition | | | | | |
|---|---|---|---|---|---|
| Compound No | Abbreviation | Conc./mass-% | Physical Properties | | |
| 1 | PU-3-S | 10.0 | T(N, I)/° C. | = | 126.5 |
| 2 | PTU-3-S | 10.0 | $n_o$(20° C., 589.3 nm) | = | t.b.d. |
| 3 | PTU-5-S | 10.0 | $\Delta n$(20° C., 589.3 nm) | = | t.b.d. |
| 4 | CGU-2-S | 10.0 | $\varepsilon_\parallel$(20° C., 1 kHz) | = | 27.1 |
| 5 | CGU-3-S | 10.0 | $\varepsilon_\perp$(20° C., 1 kHz) | = | 4.5 |
| 6 | CGU-4-S | 10.0 | $\gamma_1$ (20° C.)/mPa · s | = | 299 |
| 7 | CGU-5-S | 10.0 | $k_1$ (20° C.)/pN | = | 14.8 |
| 8 | PGU-3-S | 16.0 | $k_3/k_1$ (20° C.) | = | 1.43 |
| 9 | PPTU-4-S | 7.0 | $V_0$ (20° C.)/V | = | 0.86 |
| 10 | PPTU-5-S | 7.0 | $\varepsilon_{r,\perp}$ (20° C., 19 GHz) | = | 2.36 |
| Σ | | 100.0 | $\varepsilon_{r,\parallel}$ (20° C., 19 GHz) | = | 3.44 |
| | | | $\varepsilon_{r,\parallel}$ (20° C., 19 GHz) | = | 0.0116 |
| | | | tan $\delta_{\varepsilon\ r,\parallel}$ (20° C., 19 GHz) | = | 0.0064 |
| | | | τ (20° C., 19 GHz) | = | 0.315 |
| | | | η (20° C., 19 GHz) | = | 27.2 |

Remark: t.b.d.: to be determined.

The mixture B-14 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 15

Base Mixture

A liquid-crystal mixture B-15 having the composition and properties as indicated in the following table is prepared and characterized with respect to its general physical properties and its applicability in microwave components at 19 GHz.

| Composition | | | | | |
|---|---|---|---|---|---|
| Compound No | Abbreviation | Conc./mass-% | Physical Properties | | |
| 1 | PU-3-S | 10.0 | T(N, I)/° C. | = | 123 |
| 2 | PTU-3-S | 10.0 | $n_o$(20° C., 589.3 nm) | = | t.b.d. |
| 3 | PTU-5-S | 10.0 | $\Delta n$(20° C., 589.3 nm) | = | t.b.d. |
| 4 | CGU-2-S | 20.0 | $\varepsilon_\parallel$(20° C., 1 kHz) | = | 26.9 |
| 5 | CGU-4-S | 20.0 | $\varepsilon_\perp$(20° C., 1 kHz) | = | 4.7 |
| 6 | PGU-3-S | 16.0 | $\gamma_1$ (20° C.)/mPa · s | = | 287 |
| 7 | PPTU-4-S | 7.0 | $k_1$ (20° C.)/pN | = | 14.0 |
| 8 | PPTU-5-S | 7.0 | $k_3/k_1$ (20° C.) | = | 1.39 |
| Σ | | 100.0 | $V_0$ (20° C.)/V | = | 0.84 |
| | | | $\varepsilon_{r,\perp}$ (20° C., 19 GHz) | = | 2.36 |
| | | | $\varepsilon_{r,\parallel}$ (20° C., 19 GHz) | = | 3.42 |
| | | | tan $\delta_{\varepsilon\ r,\perp}$ (20° C., 19 GHz) | = | 0.0116 |
| | | | tan $\delta_{\varepsilon\ r,\parallel}$ (20° C., 19 GHz) | = | 0.0066 |
| | | | τ (20° C., 19 GHz) | = | 0.310 |
| | | | η (20° C., 19 GHz) | = | 26.7 |

Remark: t.b.d.: to be determined.

The mixture B-15 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 16

A liquid-crystal Base Mixture B-16 having the composition and properties as indicated in the following table is prepared and characterized with respect to its general physical properties and its applicability in microwave components at 19 GHz.

| Composition | | | | | |
|---|---|---|---|---|---|
| Compound No | Abbreviation | Conc./mass-% | Physical Properties | | |
| 1 | PU-3-S | 14.0 | T(N, I)/° C. | = | t.b.d. |
| 2 | PTU-3-S | 14.0 | $n_o$(20° C., 589.3 nm) | = | t.b.d. |
| 3 | CGU-2-S | 20.0 | $\Delta n$(20° C., 589.3 nm) | = | t.b.d. |
| 4 | CGU-4-S | 20.0 | $\varepsilon_\parallel$(20° C., 1 kHz) | = | t.b.d. |
| 5 | PGU-3-S | 18.0 | $\varepsilon_\perp$(20° C., 1 kHz) | = | t.b.d. |
| 6 | PPTU-4-S | 7.0 | $\gamma_1$ (20° C.)/mPa · s | = | t.b.d. |
| 7 | PPTU-5-S | 7.0 | $k_1$ (20° C.)/pN | = | t.b.d. |
| Σ | | 100.0 | $k_3/k_1$ (20° C.) | = | t.b.d. |
| | | | $V_0$ (20° C.)/V | = | t.b.d. |
| | | | $\varepsilon_{r,\perp}$ (20° C., 19 GHz) | = | t.b.d. |
| | | | $\varepsilon_{r,\parallel}$ (20° C., 19 GHz) | = | t.b.d. |
| | | | tan $\delta_{\varepsilon\ r,\perp}$ (20° C., 19 GHz) | = | t.b.d. |
| | | | tan $\delta_{\varepsilon\ r,\parallel}$ (20° C., 19 GHz) | = | t.b.d. |
| | | | τ (20° C., 19 GHz) | = | t.b.d. |
| | | | η (20° C., 19 GHz) | = | t.b.d. |

Remark: t.b.d.: to be determined.

The mixture B-16 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 17

Base Mixture

A liquid-crystal mixture B-17 having the composition and properties as indicated in the following table is prepared and characterized with respect to its general physical properties and its applicability in microwave components at 19 GHz.

| Composition | | | | | |
|---|---|---|---|---|---|
| Compound No | Abbreviation | Conc./mass-% | Physical Properties | | |
| 1 | PU-3-S | 8.0 | $T(N, I)/°C$ | = | 121.5 |
| 2 | PVG-4-S | 8.0 | $n_o(20°C., 589.3\ nm)$ | = | t.b.d. |
| 3 | PVG-5-S | 8.0 | $\Delta n(20°C., 589.3\ nm)$ | = | t.b.d. |
| 4 | PTU-3-S | 8.0 | $\varepsilon_\parallel(20°C., 1\ kHz)$ | = | 26.2 |
| 5 | PTU-5-S | 8.0 | $\varepsilon_\perp(20°C., 1\ kHz)$ | = | 4.6 |
| 6 | CGU-3-S | 10.0 | $\gamma_1(20°C.)/mPa \cdot s$ | = | 298 |
| 7 | CGU-4-S | 10.0 | $k_1(20°C.)/pN$ | = | 16.0 |
| 8 | CGU-5-S | 10.0 | $k_3/k_1(20°C.)$ | = | 1.31 |
| 9 | PGU-3-S | 16.0 | $V_0(20°C.)/V$ | = | 0.91 |
| 9 | PPTU-4-S | 7.0 | $\varepsilon_{r,\perp}(20°C., 19\ GHz)$ | = | 2.36 |
| 11 | PPTU-5-S | 7.0 | $\varepsilon_{r,\parallel}(20°C., 19\ GHz)$ | = | 3.48 |
| Σ | | 100.0 | $\tan\delta_{\varepsilon\ r,\perp}(20°C., 19\ GHz)$ | = | 0.0121 |
| | | | $\tan\delta_{\varepsilon\ r,\parallel}(20°C., 19\ GHz)$ | | 0.0067 |
| | | | $\tau(20°C., 19\ GHz)$ | = | 0.321 |
| | | | $\eta(20°C., 19\ GHz)$ | = | 26.5 |

Remark: t.b.d.: to be determined.

The mixture B-17 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 18

Base Mixture

A liquid-crystal mixture B-18 having the composition and properties as indicated in the following table is prepared and characterized with respect to its general physical properties and its applicability in microwave components at 19 GHz.

| Composition | | | | | |
|---|---|---|---|---|---|
| Compound No | Abbreviation | Conc./mass-% | Physical Properties | | |
| 1 | PU-3-S | 8.0 | $T(N, I)/°C$ | = | 124 |
| 2 | PVG-4-S | 8.0 | $n_o(20°C., 589.3\ nm)$ | = | t.b.d. |
| 3 | PVG-5-S | 8.0 | $\Delta n(20°C., 589.3\ nm)$ | = | t.b.d. |
| 4 | PTU-3-S | 8.0 | $\varepsilon_\parallel(20°C., 1\ kHz)$ | = | 26.2 |
| 5 | PTU-5-S | 8.0 | $\varepsilon_\perp(20°C., 1\ kHz)$ | = | 4.6 |
| 6 | CGU-4-S | 15.0 | $\gamma_1(20°C.)/mPa \cdot s$ | = | 311 |
| 7 | CGU-5-S | 15.0 | $k_1(20°C.)/pN$ | = | 16.2 |
| 8 | PGU-3-S | 16.0 | $k_3/k_1(20°C.)$ | = | 1.28 |
| 9 | PPTU-4-S | 7.0 | $V_0(20°C.)/V$ | = | 0.91 |
| 10 | PPTU-5-S | 7.0 | $\varepsilon_{r,\perp}(20°C., 19\ GHz)$ | = | 2.37 |
| Σ | | 100.0 | $\varepsilon_{r,\parallel}(20°C., 19\ GHz)$ | = | 3.48 |
| | | | $\tan\delta_{\varepsilon\ r,\perp}(20°C., 19\ GHz)$ | = | 0.0120 |
| | | | $\tan\delta_{\varepsilon\ r,\parallel}(20°C., 19\ GHz)$ | = | 0.0066 |
| | | | $\tau(20°C., 19\ GHz)$ | = | 0.318 |
| | | | $\eta(20°C., 19\ GHz)$ | = | 26.2 |

Remark: t.b.d.: to be determined.

The mixture B-18 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 19

Base Mixture

A liquid-crystal mixture B-19 having the composition and properties as indicated in the following table is prepared and characterized with respect to its general physical properties and its applicability in microwave components at 19 GHz.

| Composition | | | | | |
|---|---|---|---|---|---|
| Compound No | Abbreviation | Conc./mass-% | Physical Properties | | |
| 1 | PU-3-S | 10.0 | $T(N, I)/°C$ | = | 126.5 |
| 2 | PTU-3-S | 10.0 | $n_o(20°C., 589.3\ nm)$ | = | t.b.d. |
| 3 | PTU-5-S | 10.0 | $\Delta n(20°C., 589.3\ nm)$ | = | t.b.d. |
| 4 | CGU-2-S | 14.0 | $\varepsilon_\parallel(20°C., 1\ kHz)$ | = | 27.4 |
| 5 | CGU-3-S | 13.0 | $\varepsilon_\perp(20°C., 1\ kHz)$ | = | 4.6 |
| 6 | CGU-4-S | 13.0 | $\gamma_1(20°C.)/mPa \cdot s$ | = | 297 |
| 7 | PGU-3-S | 16.0 | $k_1(20°C.)/$ | = | 14.5 |
| 8 | PPTU-4-S | 7.0 | $k_3/k_1(20°C.)$ | = | 1.45 |
| 9 | PPTU-5-S | 7.0 | $V_0(20°C.)/V$ | = | 0.84 |
| Σ | | 100.0 | $\varepsilon_{r,\perp}(20°C., 19\ GHz)$ | = | 2.36 |
| | | | $\varepsilon_{r,\parallel}(20°C., 19\ GHz)$ | = | 3.44 |
| | | | $\tan\delta_{\varepsilon\ r,\perp}(20°C., 19\ GHz)$ | = | 0.0115 |
| | | | $\tan\delta_{\varepsilon\ r,\parallel}(20°C., 19\ GHz)$ | = | 0.0065 |
| | | | $\tau(20°C., 19\ GHz)$ | = | 0.313 |
| | | | $\eta(20°C., 19\ GHz)$ | = | 27.2 |

Remark: t.b.d.: to be determined.

The mixture B-19 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 20

Base Mixture

A liquid-crystal mixture B-20 having the composition and properties as indicated in the following table is prepared and characterized with respect to its general physical properties and its applicability in microwave components at 19 GHz.

| Composition | | | | | |
|---|---|---|---|---|---|
| Compound No | Abbreviation | Conc./ mass-% | Physical Properties | | |
| 1 | PVG-4-S | 16.0 | $T(N, I)/°C$ | = | 115.5 |
| 2 | PVG-5-S | 16.0 | $n_o(20° C., 589.3\ nm)$ | = | t.b.d. |
| 3 | PTU-3-S | 14.0 | $\Delta n(20° C., 589.3\ nm)$ | = | t.b.d. |
| 4 | PTU-5-S | 10.0 | $\varepsilon_\parallel(20° C., 1\ kHz)$ | = | 27.0 |
| 5 | PTG-5-S | 14.0 | $\varepsilon_\perp(20° C., 1\ kHz)$ | = | 4.5 |
| 6 | PGU-3-S | 14.0 | $\gamma_1 (20° C.)/mPa \cdot s$ | = | 304 |
| 7 | PPTU-4-S | 15.0 | $k_1 (20° C.)/pN/$ | = | t.b.d. |
| 8 | PPTU-5-S | 15.0 | $k_3/k_1 (20° C.)$ | = | t.b.d. |
| $\Sigma$ | | 100.0 | $V_0 (20° C.)/V$ | = | 1.07 |
| | | | $\varepsilon_{r,\perp} (20° C., 19\ GHz)$ | = | t.b.d. |
| | | | $\varepsilon_{r,\parallel} (20° C., 19\ GHz)$ | = | t.b.d. |
| | | | $\tan\delta_{\varepsilon\ r,\perp} (20° C., 19\ GHz)$ | = | t.b.d. |
| | | | $\tan\delta_{\varepsilon\ r,\parallel} (20° C., 19\ GHz)$ | = | t.b.d. |
| | | | $\tau (20° C., 19\ GHz)$ | = | t.b.d. |
| | | | $\eta (20° C., 19\ GHz)$ | = | t.b.d. |

Remark: t.b.d.: to be determined.

The mixture B-20 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 21

Base Mixture

A liquid-crystal mixture B-21 having the composition and properties as indicated in the following table is prepared and characterized with respect to its general physical properties and its applicability in microwave components at 19 GHz.

| Composition | | | | | |
|---|---|---|---|---|---|
| Compound No | Abbreviation | Conc./ mass-% | Physical Properties | | |
| 1 | PU-3-S | 20.0 | $T(N, I)/°C$ | = | 116.5 |
| 2 | PVG-4-S | 16.0 | $n_o(20° C., 589.3\ nm)$ | = | t.b.d. |
| 3 | PVG-5-S | 16.0 | $\Delta n(20° C., 589.3\ nm)$ | = | t.b.d. |
| 4 | PGU-3-S | 16.0 | $\varepsilon_\parallel(20° C., 1\ kHz)$ | = | 27.7 |
| 5 | PPTU-4-S | 16.0 | $\varepsilon_\perp(20° C., 1\ kHz)$ | = | 4.6 |
| 6 | PPTU-5-S | 16.0 | $\gamma_1 (20° C.)/mPa \cdot s$ | = | 292 |
| $\Sigma$ | | 100.0 | $k_1 (20° C.)/pN$ | = | t.b.d. |
| | | | $k_3/k_1 (20° C.)$ | = | t.b.d. |
| | | | $V_0 (20° C.)/V$ | = | 1.05 |
| | | | $\varepsilon_{r,\perp} (20° C., 19\ GHz)$ | = | t.b.d. |
| | | | $\varepsilon_{r,\parallel} (20° C., 19\ GHz)$ | = | t.b.d. |
| | | | $\tan\delta_{\varepsilon\ r,\perp} (20° C., 19\ GHz)$ | = | t.b.d. |
| | | | $\tan\delta_{\varepsilon\ r,\parallel} (20° C., 19\ GHz)$ | = | t.b.d. |
| | | | $\tau (20° C., 19\ GHz)$ | = | t.b.d. |
| | | | $\eta (20° C., 19\ GHz)$ | = | t.b.d. |

Remark: t.b.d.: to be determined.

The mixture B-21 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 22

Base Mixture

A liquid-crystal mixture B-22 having the composition and properties as indicated in the following table is prepared and characterized with respect to its general physical properties and its applicability in microwave components at 19 GHz.

| Composition | | | | | |
|---|---|---|---|---|---|
| Compound No | Abbreviation | Conc./ mass-% | Physical Properties | | |
| 1 | PU-3-S | 16.0 | $T(N, I)/°C$ | = | 95 |
| 2 | PVG-4-S | 14.0 | $n_o(20° C., 589.3\ nm)$ | = | t.b.d. |
| 3 | PVG-5-S | 14.0 | $\Delta n(20° C., 589.3\ nm)$ | = | t.b.d. |
| 4 | PTU-3-S | 8.0 | $\varepsilon_\parallel(20° C., 1\ kHz)$ | = | 27.4 |
| 5 | PTU-5-S | 8.0 | $\varepsilon_\perp(20° C., 1\ kHz)$ | = | 5.0 |
| 6 | PGU-3-S | 14.0 | $\gamma_1 (20° C.)/mPa \cdot s$ | = | 234 |
| 7 | PPTU-4-S | 10.0 | $k_1 (20° C.)/pN$ | = | 15.6 |
| 8 | PPTU-5-S | 10.0 | $k_3/k_1 (20° C.)$ | = | 1.00 |
| $\Sigma$ | | 100.0 | $V_0 (20° C.)/V$ | = | 0.88 |
| | | | $\varepsilon_{r,\perp} (20° C., 19\ GHz)$ | = | 2.56 |
| | | | $\varepsilon_{r,\parallel} (20° C., 19\ GHz)$ | = | 3.68 |
| | | | $\tan\delta_{\varepsilon\ r,\perp} (20° C., 19\ GHz)$ | = | 0.0075 |
| | | | $\tan\delta_{\varepsilon\ r,\parallel} (20° C., 19\ GHz)$ | = | 0.0136 |
| | | | $\tau (20° C., 19\ GHz)$ | = | 0.306 |
| | | | $\eta (20° C., 19\ GHz)$ | = | 22.5 |

Remark: t.b.d.: to be determined.

The mixture B-22 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 23

A liquid-crystal mixture B-23 having the composition and properties as indicated in the following table is prepared and characterized with respect to its general physical properties and its applicability in microwave components at 19 GHz.

| Composition | | | Physical Properties | | |
|---|---|---|---|---|---|
| Compound No | Abbreviation | Conc./mass-% | | | |
| 1 | PU-3-S | 20.0 | T(N, I)/° C. | = | 96 |
| 2 | PVG-4-S | 15.0 | $n_o$(20° C., 589.3 nm) | = | t.b.d. |
| 3 | PVG-5-S | 15.0 | $\Delta n$(20° C., 589.3 nm) | = | t.b.d. |
| 4 | PTU-3-S | 10.0 | $\varepsilon_\|$(20° C., 1 kHz) | = | 27.8 |
| 5 | PGU-3-S | 14.0 | $\varepsilon_\perp$(20° C., 1 kHz) | = | 5.0 |
| 6 | PPTU-4-S | 10.0 | $\gamma_1$(20° C.)/mPa·s | = | 230 |
| 7 | PPTU-5-S | 10.0 | $k_1$(20° C.)/pN | = | 15.6 |
| Σ | | 100.0 | $k_3/k_1$(20° C.) | = | 1.00 |
| | | | $V_0$(20° C.)/V | = | 0.88 |
| | | | $\varepsilon_{r,\perp}$(20° C., 19 GHz) | = | 2.48 |
| | | | $\varepsilon_{r,\|}$(20° C., 19 GHz) | = | 3.67 |
| | | | $\tan\delta_{\varepsilon_{r,\perp}}$(20° C., 19 GHz) | = | 0.0083 |
| | | | $\tan\delta_{\varepsilon_{r,\|}}$(20° C., 19 GHz) | = | 0.0152 |
| | | | $\tau$(20° C., 19 GHz) | = | 0.324 |
| | | | $\eta$(20° C., 19 GHz) | = | 21.0 |

Remark: t.b.d.: to be determined.

The mixture B-23 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 24

Base Mixture

A liquid-crystal mixture B-24 having the composition and properties as indicated in the following table is prepared and characterized with respect to its general physical properties and its applicability in microwave components at 19 GHz.

| Composition | | | Physical Properties | | |
|---|---|---|---|---|---|
| Compound No | Abbreviation | Conc./mass-% | | | |
| 1 | PU-3-S | 10.0 | T(N, I)/° C. | = | 125 |
| 2 | PTU-3-S | 10.0 | $n_o$(20° C., 589.3 nm) | = | t.b.d. |
| 3 | PTU-5-S | 10.0 | $\Delta n$(20° C., 589.3 nm) | = | t.b.d. |
| 4 | CPU-2-S | 20.0 | $\varepsilon_\|$(20° C., 1 kHz) | = | 27.2 |
| 5 | CPU-5-S | 20.0 | $\varepsilon_\perp$(20° C., 1 kHz) | = | 4.6 |
| 6 | PGU-3-S | 16.0 | $\gamma_1$(20° C.)/mPa·s | = | 310 |
| 7 | PPTU-4-S | 7.0 | $k_1$(20° C.)/pN | = | 14.1 |
| 8 | PPTU-5-S | 7.0 | $k_3/k_1$(20° C.) | = | 1.44 |
| Σ | | 100.0 | $V_0$(20° C.)/V | = | 0.85 |
| | | | $\varepsilon_{r,\perp}$(20° C., 19 GHz) | = | t.b.d. |
| | | | $\varepsilon_{r,\|}$(20° C., 19 GHz) | = | t.b.d. |
| | | | $\tan\delta_{\varepsilon_{r,\perp}}$(20° C., 19 GHz) | = | t.b.d. |
| | | | $\tan\delta_{\varepsilon_{r,\|}}$(20° C., 19 GHz) | = | t.b.d. |
| | | | $\tau$(20° C., 19 GHz) | = | t.b.d. |
| | | | $\eta$(20° C., 19 GHz) | = | t.b.d. |

Remark: t.b.d.: to be determined.

The mixture B-24 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 25

Base Mixture

A liquid-crystal mixture B-25 having the composition and properties as indicated in the following table is prepared and characterized with respect to its general physical properties and its applicability in microwave components at 19 GHz.

| Composition | | | Physical Properties | | |
|---|---|---|---|---|---|
| Compound No | Abbreviation | Conc./mass-% | | | |
| 1 | PU-3-S | 10.0 | T(N, I)/° C. | = | 124 |
| 2 | PTU-3-S | 10.0 | $n_o$(20° C., 589.3 nm) | = | t.b.d. |
| 3 | PTU-5-S | 10.0 | $\Delta n$(20° C., 589.3 nm) | = | t.b.d. |
| 4 | CPU-2-S | 20.0 | $\varepsilon_\|$(20° C., 1 kHz) | = | 27.8 |
| 5 | CPU-3-S | 20.0 | $\varepsilon_\perp$(20° C., 1 kHz) | = | 4.6 |
| 6 | PGU-3-S | 16.0 | $\gamma_1$(20° C.)/mPa·s | = | 301 |
| 7 | PPTU-4-S | 7.0 | $k_1$(20° C.)/pN | = | 14.1 |
| 8 | PPTU-5-S | 7.0 | $k_3/k_1$(20° C.) | = | 1.44 |
| Σ | | 100.0 | $V_0$(20° C.)/V | = | 0.85 |
| | | | $\varepsilon_{r,\perp}$(20° C., 19 GHz) | = | t.b.d. |
| | | | $\varepsilon_{r,\|}$(20° C., 19 GHz) | = | t.b.d. |
| | | | $\tan\delta_{\varepsilon_{r,\perp}}$(20° C., 19 GHz) | = | t.b.d. |
| | | | $\tan\delta_{\varepsilon_{r,\|}}$(20° C., 19 GHz) | = | t.b.d. |
| | | | $\tau$(20° C., 19 GHz) | = | t.b.d. |
| | | | $\eta$(20° C., 19 GHz) | = | t.b.d. |

Remark: t.b.d.: to be determined.

The mixture B-25 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 26

A liquid-crystal Base Mixture B-26 having the composition and properties as indicated in the following table is prepared and characterized with respect to its general physical properties and its applicability in microwave components at 19 GHz.

| Composition | | | Physical Properties | | |
|---|---|---|---|---|---|
| Compound No | Abbreviation | Conc./mass-% | | | |
| 1 | PU-3-S | 10.0 | T(N, I)/° C. | = | 127 |
| 2 | PTU-3-S | 10.0 | $n_o$(20° C., 589.3 nm) | = | t.b.d. |
| 3 | PTU-5-S | 10.0 | $\Delta n$(20° C., 589.3 nm) | = | t.b.d. |
| 4 | PGU-3-S | 16.0 | $\varepsilon_\|$(20° C., 1 kHz) | = | 27.1 |

-continued

| Composition | | | | |
|---|---|---|---|---|
| Compound No | Abbreviation | Conc./ mass-% | Physical Properties | |
| 5 | PPTU-4-S | 7.0 | $\varepsilon_\perp$ (20° C., 1 kHz) = | 4.5 |
| 6 | PPTU-5-S | 7.0 | $\gamma_1$ (20° C.)/mPa·s = | 299 |
| 7 | CPU-2-S | 10.0 | $k_1$ (20° C.)/pN = | 14.8 |
| 8 | CPU-3-S | 10.0 | $k_3/k_1$ (20° C.) = | 1.43 |
| 9 | CPU-4-S | 10.0 | $V_0$ (20° C.)/V = | 0.86 |
| 10 | CPU-5-S | 10.0 | $\varepsilon_{r,\perp}$ (20° C., 19 GHz) = | 2.35 |
| Σ | | 100.0 | $\varepsilon_{r,\parallel}$ (20° C., 19 GHz) = | 3.44 |
| | | | $\tan \delta_{\varepsilon_{r,\perp}}$ (20° C., 19 GHz) = | 0.0116 |
| | | | $\tan \delta_{\varepsilon_{r,\parallel}}$ (20° C., 19 GHz) = | 0.064 |
| | | | $\tau$ (20° C., 19 GHz) = | 0.315 |
| | | | $\eta$ (20° C., 19 GHz) = | 27.2 |

Remark: t.b.d.: to be determined.

The mixture B-26 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 27

Base Mixture

A liquid-crystal mixture B-27 having the composition and properties as indicated in the following table is prepared and characterized with respect to its general physical properties and its applicability in microwave components at 19 GHz.

| Composition | | | | |
|---|---|---|---|---|
| Compound No | Abbreviation | Conc./ mass-% | Physical Properties | |
| 1 | PU-3-S | 8.0 | T(N, I)/° C. = | 122 |
| 2 | PVG-4-S | 8.0 | $n_o$(20° C., 589.3 nm) = | t.b.d. |
| 3 | PVG-5-S | 8.0 | $\Delta n$(20° C., 589.3 nm) = | t.b.d. |
| 4 | PTU-3-S | 8.0 | $\varepsilon_\parallel$(20° C., 1 kHz) = | 26.2 |
| 5 | PTU-5-S | 8.0 | $\varepsilon_\perp$(20° C., 1 kHz) = | 4.6 |
| 6 | PGU-3-S | 16.0 | $\gamma_1$ (20° C.)/mPa·s = | 298 |
| 7 | PPTU-4-S | 7.0 | $k_1$ (20° C.)/pN = | 16.0 |
| 8 | PPTU-5-S | 7.0 | $k_3/k_1$ (20° C.) = | 1.31 |
| 9 | CPU-3-S | 10.0 | $V_0$ (20° C.)/V = | 0.91 |
| 10 | CPU-4-S | 10.0 | $\varepsilon_{r,\perp}$ (20° C., 19 GHz) = | 2.36 |
| 11 | CPU-5-S | 10.0 | $\varepsilon_{r,\parallel}$ (20° C., 19 GHz) = | 3.48 |
| Σ | | 100.0 | $\tan \delta_{\varepsilon_{r,\perp}}$ (20° C., 19 GHz) = | 0.0121 |
| | | | $\tan \delta_{\varepsilon_{r,\parallel}}$ (20° C., 19 GHz) = | 0.0067 |
| | | | $\tau$ (20° C., 19 GHz) = | 0.321 |
| | | | $\eta$ (20° C., 19 GHz) = | 26.5 |

Remark: t.b.d.: to be determined.

The mixture B-27 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Example 28

Base Mixture

A liquid-crystal mixture B-28 having the composition and properties as indicated in the following table is prepared and characterized with respect to its general physical properties and its applicability in microwave components at 19 GHz.

| Composition | | | | |
|---|---|---|---|---|
| Compound No | Abbreviation | Conc./ mass-% | Physical Properties | |
| 1 | PU-3-S | 8.0 | T(N, I)/° C. = | 124 |
| 2 | PVG-4-S | 8.0 | $n_o$(20° C., 589.3 nm) = | t.b.d. |
| 3 | PVG-5-S | 8.0 | $\Delta n$(20° C., 589.3 nm) = | t.b.d. |
| 4 | PTU-3-S | 8.0 | $\varepsilon_\parallel$(20° C., 1 kHz) = | 26.2 |
| 5 | PTU-5-S | 8.0 | $\varepsilon_\perp$(20° C., 1 kHz) = | 4.6 |
| 6 | PGU-3-S | 16.0 | $\gamma_1$ (20° C.)/mPa·s = | 311 |
| 7 | PPTU-4-S | 7.0 | $k_1$ (20° C.)/pN = | 16.2 |
| 8 | PPTU-5-S | 7.0 | $k_3/k_1$ (20° C.) = | 1.28 |
| 9 | CPU-4-S | 15.0 | $V_0$ (20° C.)/V = | 0.91 |
| 10 | CPU-5-S | 15.0 | $\varepsilon_{r,\perp}$ (20° C., 19 GHz) = | 2.37 |
| Σ | | 100.0 | $\varepsilon_{r,\parallel}$ (20° C., 19 GHz) = | 3.48 |
| | | | $\tan \delta_{\varepsilon_{r,\perp}}$ (20° C., 19 GHz) = | 0.0120 |
| | | | $\tan \delta_{\varepsilon_{r,\parallel}}$ (20° C., 19 GHz) = | 0.0066 |
| | | | $\tau$ (20° C., 19 GHz) = | 0.318 |
| | | | $\eta$ (20° C., 19 GHz) = | 26.5 |

Remark: t.b.d.: to be determined.

The mixture B-28 is divided into seven parts. To three of these seven parts is added respectively the dichroic dye TAZO-1, as shown in table E above, in a concentration of 1.0%, 3.0% and 5.0%. To the other four parts is added respectively AZO-1, AZO-2, AZO-3 or THIO-1, as shown in table E above, respectively in a concentration of 3.0%.

The resultant mixtures show similarly improved properties as Examples 1.1-1.3 and Examples 2-5, in particular with regard to tunability and figure of merit.

Alternatively to the dichroic dyes used in the Examples described above, fluorescent dichroic dyes may be used. These allow easy detection of any leakage of modulation medium from the respective microwave components.

In addition to providing one or more pleochroic compounds, to the above mixtures one or more chiral compounds can be added in order to achieve an improved performance for most applications.

The invention claimed is:

1. A liquid-crystalline medium in a microwave component, comprising one or more pleochroic compounds that are azo dyes or thiadiazol dyes, one or more compounds of formula I,

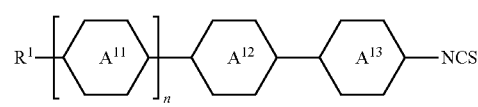

I in which
$R^1$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
n denotes 0 or 1, and

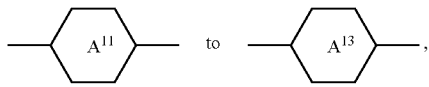

independently of one another, denote

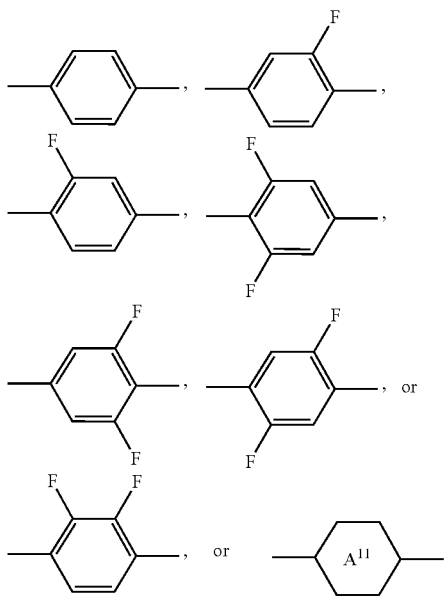

alternatively denotes

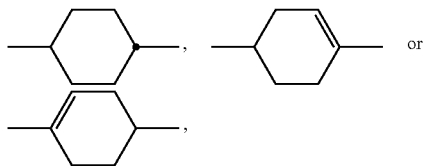

and
one or more compounds of formula III

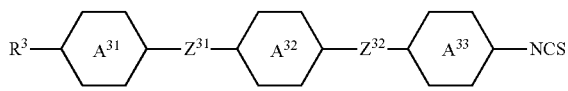

III in which
$R^3$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
one of $Z^{31}$ and $Z^{32}$ denotes trans-CH=CH—, trans-CF=CF— or —C≡C—, and the other one denotes trans-CH=CH—, trans-CF=CF— or a single bond, and

independently of one another, denote

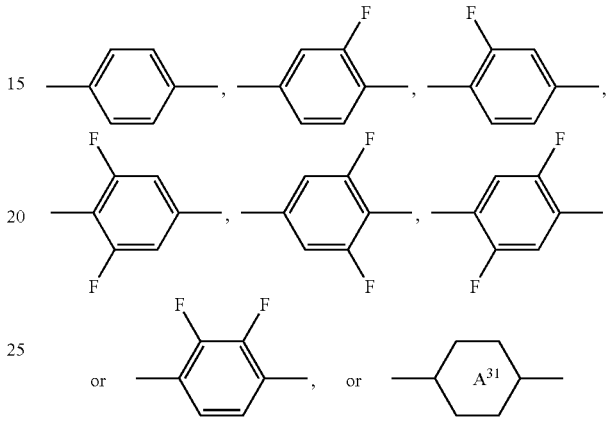

alternatively denotes

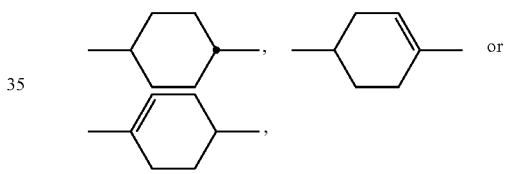

and optionally
one or more polymerisable mesogenic compounds
wherein said liquid-crystalline medium is in a microwave component.

2. The liquid-crystalline medium according to claim 1, which comprises from 0.5% to 10% of one or more pleochroic dyes that are azo dyes or thiadiazol dyes.

3. The liquid-crystalline medium according to claim 1, which comprises one or more compounds of formula P wherein $$P^a\text{-}(Sp^a)_{s1}\text{-}(A^1\text{-}Z^1)_{n1}\text{-}A^2\text{-}Q\text{-}A^3\text{-}(Z^4\text{-}A^4)_{n2}\text{-}(Sp^b)_{s2}\text{-}P^b \qquad P$$

wherein
$P^a$, $P^b$ each, independently of one another, are a polymerisable group,
$Sp^a$, $Sp^b$ each, independently of one another, denote a spacer group,
s1, s2 each, independently of one another, denote 0 or 1,
n1, n2 each, independently of one another, denote 0 or 1,
Q denotes a single bond, —CF$_2$O—, —OCF$_2$—, —CH$_2$O—, —OCH$_2$—, —(CO)O—, —O(CO)—, —(CH$_2$)$_4$—, —CH$_2$—CH$_2$—, —CF$_2$—CF$_2$—, —CF$_2$—CH$_2$—, —CH$_2$—CF$_2$—, —CH=CH—, —CF=CF—, —CF=CH—, —CH=CF—, —(CH$_2$)$_3$O—, —O(CH$_2$)$_3$—, —C≡C—, —O—, —CH$_2$—, —(CH$_2$)$_3$—, —CF$_2$—,
$Z^1$, $Z^4$ denote, independently of one another, a single bond, —CF$_2$O—, —OCF$_2$—, —CH$_2$O—, —OCH$_2$—, —(CO)O—, —O(CO)—, —(CH$_2$)$_4$—, —CH$_2$—CH$_2$—, —CF$_2$—CF$_2$—, —CF$_2$—CH$_2$—, —CH$_2$—CF$_2$—, —CH═CH—, —CF═CF—, —CF═CH—, —CH═CF—, —(CH$_2$)$_3$O—, —O(CH$_2$)$_3$—, —C≡C—, —O—, —CH$_2$—, —(CH$_2$)$_3$—, —CF$_2$—,
wherein $Z^1$ and Q or respectively $Z^4$ and Q do not simultaneously denote a group selected from —CF$_2$O— and —OCF$_2$—, $A^1, A^2, A^3, A^4$ each, independently of one another, denote a diradical
a) the group consisting of trans-1,4-cyclohexylene, 1,4-cyclohexenylene and 1,4'-bicyclohexylene, in which, in addition, one or more non-adjacent CH$_2$ groups may be replaced by —O— and/or —S— and in which, in addition, one or more H atoms may be replaced by F,
b) the group consisting of 1,4-phenylene and 1,3-phenylene, in which, in addition, one or two CH groups may be replaced by N and in which, in addition, one or more H atoms may be replaced by L,
c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
d) the group consisting of saturated, partially unsaturated or fully unsaturated, and optionally substituted, polycyclic radicals having 5 to 20 cyclic C atoms, one or more of which, in addition, may be replaced by a heteroatom
or $A^3$ alternatively may be a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, if branched 3 to 12 C atoms, $R^{03}, R^{04}$ each, independently of one another, denote H, F or straight-chain alkyl having 1 to 12 C atoms or branched alkyl having 3 to 12 C atoms, in which, in addition, one or more H atoms may be replaced by F, and which optionally further comprises a polymerisation initiator.

4. The liquid-crystalline medium according to claim 1, which further comprises one or more compounds of formula II

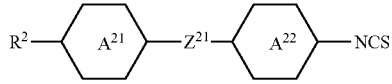

in which $R^2$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, $Z^{21}$ denoted trans-CH═CH—, trans-CF═CF— or —C≡C—, and

independently of one another, denote

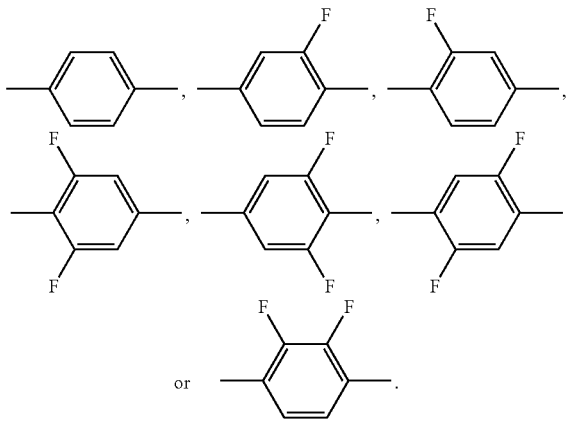

5. The liquid-crystalline medium according to claim 1, which comprises one or more compounds of formulae I-1, I-2, III-1, III-2, III-4 or III-5

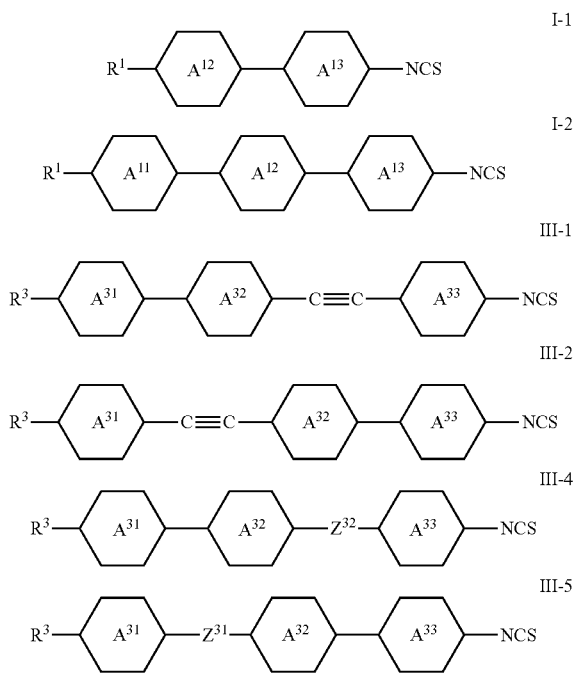

wherein $R^1, R^3, A^{11}, A^{12}, A^{13}, A^{31}, A^{32}, A^{33}, Z^{31}$ and $Z^{32}$ each have the respective meanings as set forth in claim 1.

6. The liquid-crystalline medium according to claim 1, which further comprises one or more chiral compounds.

7. A composite system, comprising
a liquid-crystalline medium according to claim 1, and a polymerized mesogenic compound.

8. A component for high-frequency technology, which comprises the liquid-crystalline medium according to claim 1.

9. The component according to claim 8, which is a phase shifter or a LC based antenna element operable in the microwave range.

10. A method which comprises adding a liquid-crystalline medium according to claim 1 into a component for high-frequency technology.

11. A process for the preparation of a liquid-crystalline medium, comprising mixing a liquid-crystalline medium according to claim 1 with one or more polymerisable compounds and one or more pleochroic compounds and optionally with one or more further compounds and/or with one or more additives.

12. A method for improving the tunability of a liquid-crystalline medium comprising adding one or more pleochroic compounds into said liquid-crystalline medium according to claim 1.

13. A microwave antenna array, comprising one or more components according to claim 8.

14. The liquid-crystalline medium according to claim 3, wherein Q is —CF$_2$O—.

15. The liquid-crystalline medium according to claim 3, wherein A$^1$, A$^2$, A$^3$, A$^4$ each, independently of one another, denote a saturated, partially unsaturated or fully unsaturated, and optionally substituted, polycyclic radicals having 5 to 20 cyclic C atoms, one or more of which, in addition, may be replaced by a bicyclo[1.1.1]pentane-1,3-diyl, bicyclo[2.2.2]octane-1,4-diyl, spiro[3.3]heptane-2,6-diyl,

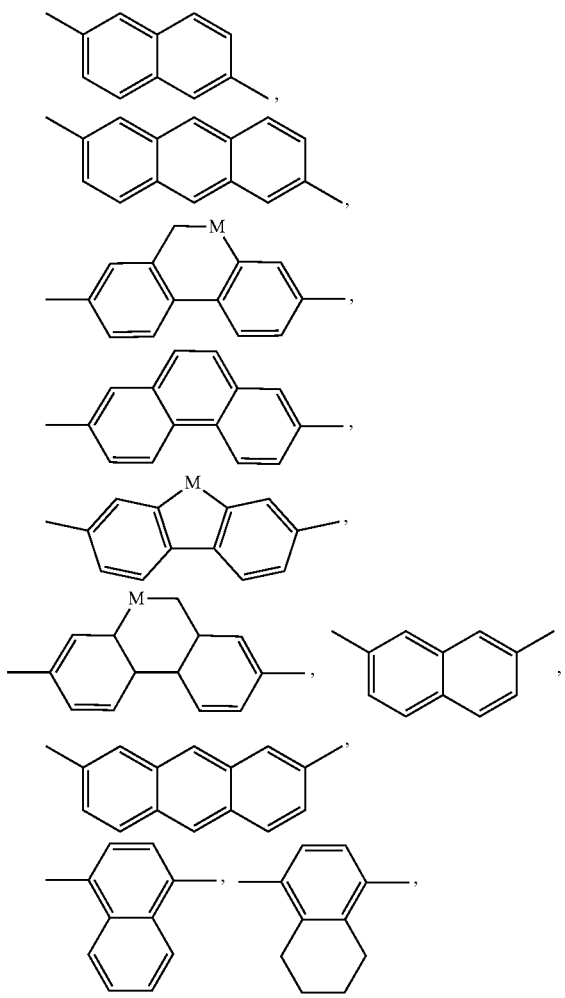

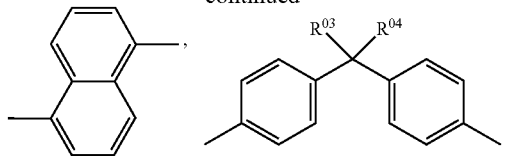

wherein, in addition, one or more H atoms in these radicals may be replaced by L, and/or one or more double bonds may be replaced by single bonds, and/or one or more CH groups may be replaced by N, M denotes —O—, —S—, —CH$_2$—, —CHY$^1$— or —CY$^1$Y$^2$—, and Y$^1$ and Y$^2$ each, independently of one another, have one of the meanings indicated above for R$^{03}$, or denote Cl or CN, and one of the groups Y$^1$ and Y$^2$ alternatively denotes —OCF$_3$, H, F, Cl, CN or CF$_3$.

16. The liquid-crystalline medium according to claim 15, wherein at least one of the groups Y$^1$ or Y$^2$ denotes H, F, Cl, CN or CF$_3$.

17. The liquid-crystalline medium according to claim 4, which further comprises a compound-of formulae II-1 to II-3

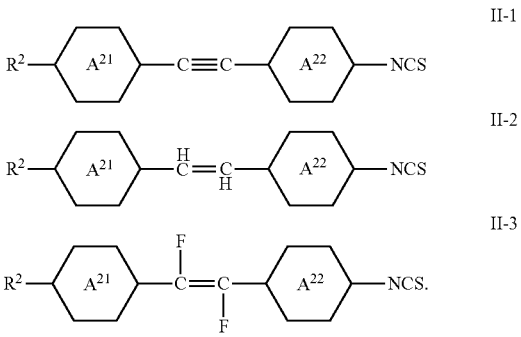

wherein

R$^2$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms and

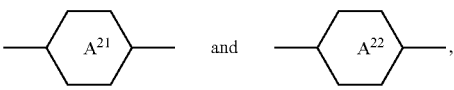

independently of one another, denote

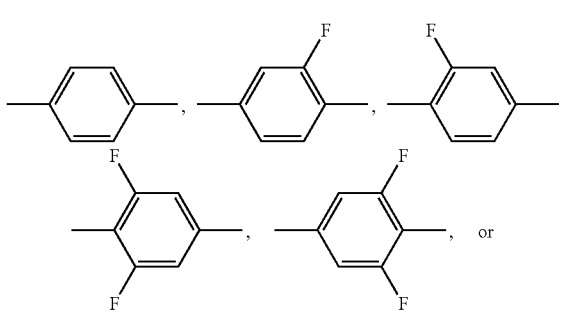

-continued

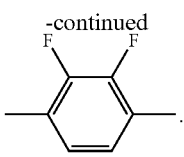

18. The liquid-crystalline medium according to claim 1, which further comprises a compound of formula III-3

in which
R³ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
and

independently of one another, denote

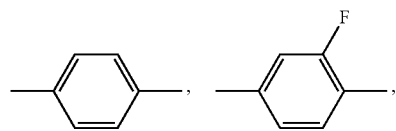

-continued

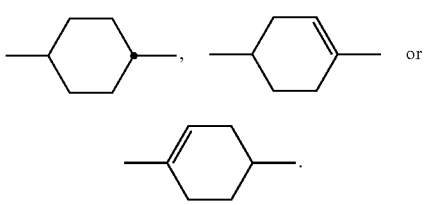

alternatively denotes

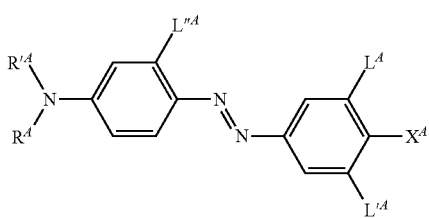

19. A liquid-crystalline medium according to claim 2 wherein said one or more pleochroic dyes is an azo dye of formulae A or D

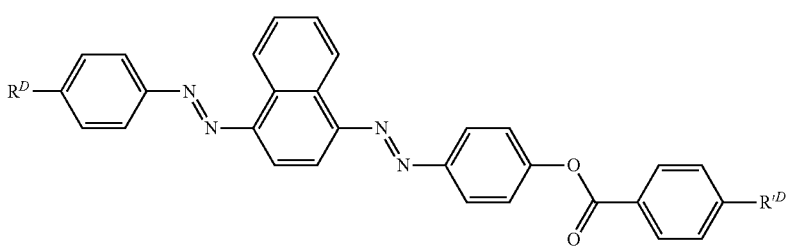

wherein
X$^A$ is a polar group, F, Cl, CN, CF$_3$, OCF$_3$, SF$_5$ or SF$_4$CF$_3$
L$^A$, L$'^A$ and L$''^A$ are independently of each other H, F, Cl or CN,
R$^A$ and R$'^A$ are independently of each other alkyl having 1 to 6 C atoms, and
R$^D$ and R$'^D$ are independently of each other alkyl having 1 to 6 C atoms.

20. A liquid-crystalline medium according to claim 2 wherein said one or more pleochroic dye is a thiadiazol dye of formula T

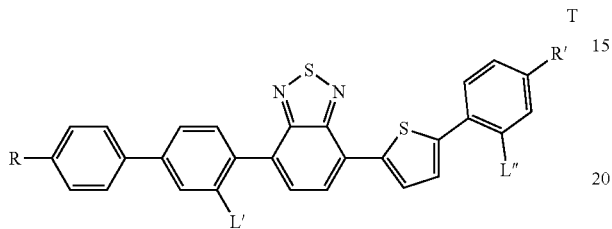

wherein
R and R' are independently of each other alkoxy having 1 to 6 C atoms and
L' and L" are independently of each other H, F or Cl.

* * * * *